(12) United States Patent
Miura et al.

(10) Patent No.: US 9,534,551 B2
(45) Date of Patent: Jan. 3, 2017

(54) WORKING MACHINE

(75) Inventors: Keisuke Miura, Sakai (JP); Hiroaki Nakagawa, Sakai (JP); Ryosuke Kinugawa, Sakai (JP); Atsushi Matsumoto, Sakai (JP); Teruo Kunizawa, Sakai (JP); Ikuhiro Uotani, Sakai (JP); Masaru Soejima, Sakai (JP); Satoshi Tajima, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 541 days.

(21) Appl. No.: 13/613,592

(22) Filed: Sep. 13, 2012

(65) Prior Publication Data

US 2013/0074481 A1    Mar. 28, 2013

(30) Foreign Application Priority Data

Sep. 27, 2011  (JP) .................................. 2011-210777
Sep. 27, 2011  (JP) ........... 2011-210778 Dec. 1, 2011
(JP) ........ 2011-263474   Dec. 1, 2011
(JP) ........ 2011-263475

(51) Int. Cl.
*F01N 3/00*    (2006.01)
*F02D 41/02*   (2006.01)
(Continued)

(52) U.S. Cl.
CPC ............. *F02D 41/029* (2013.01); *F01N 9/002* (2013.01); *F01N 3/023* (2013.01);
(Continued)

(58) Field of Classification Search
CPC .. F01N 9/002; F01N 2900/1606; F01N 3/023; F02D 31/001; F02D 2200/604
(Continued)

(56) References Cited

U.S. PATENT DOCUMENTS 7,086,220 B2 *   8/2006   Imai et al. ...................... 60/274
7,104,050 B2 *   9/2006   Sato et al. ...................... 60/295
(Continued)

FOREIGN PATENT DOCUMENTS

JP          63-65114 A      3/1988
JP          2000-63100 A    2/2000
(Continued)

OTHER PUBLICATIONS

Enlgish Translation of JP 2010270699 to Ezawa Masanori et al. (Orginial prodided by Applicant IDS).*

*Primary Examiner* — Audrey K Bradley
*Assistant Examiner* — Anthony Ayala Delgado
(74) *Attorney, Agent, or Firm* — Birch, Stewart, Kolasch & Birch, LLP

(57) ABSTRACT

In a backhoe comprising: a diesel engine able to increase a speed due to an accelerating operation; an exhaust gas cleaning device having a DPF for catching a particulate matter included in an exhaust gas exhausted from the diesel engine; and a filter regeneration means to combust and remove the particulate matter deposited in the DPF of the exhaust gas cleaning device, the filter regeneration means requires to increase the speed of the diesel engine during an automatic regeneration for automatically combusting and removing the particulate matter deposited in the DPF. In this manner, a working machine able to require an operator to increase the speed of the diesel engine at appropriate timing, in order to increase a temperature of the exhaust gas to a temperature required for regeneration of the DPF can be provided.

23 Claims, 23 Drawing Sheets

(51) Int. Cl.
 *F01N 9/00* (2006.01)
 *F01N 3/023* (2006.01)
 *F02D 31/00* (2006.01)
 *F02D 41/22* (2006.01)

(52) U.S. Cl.
 CPC .... *F01N 2900/1606* (2013.01); *F02D 31/001* (2013.01); *F02D 2041/228* (2013.01); *F02D 2200/021* (2013.01); *F02D 2200/0812* (2013.01); *F02D 2200/604* (2013.01); *Y02T 10/47* (2013.01)

(58) Field of Classification Search
 USPC .................................. 60/295, 297, 299, 277
 See application file for complete search history.

(56) References Cited

U.S. PATENT DOCUMENTS

| | | | |
|---|---|---|---|
| 2003/0106308 A1* | 6/2003 | Gabe et al. | 60/295 |
| 2004/0172935 A1* | 9/2004 | Otake et al. | 60/295 |
| 2005/0050883 A1* | 3/2005 | Nishimura | 60/286 |
| 2006/0000201 A1* | 1/2006 | Iizuka et al. | 60/286 |
| 2007/0130919 A1* | 6/2007 | Lee | 60/286 |
| 2008/0307771 A1* | 12/2008 | Barton et al. | 60/274 |
| 2009/0198402 A1* | 8/2009 | Quigley et al. | 701/29 |
| 2010/0089035 A1* | 4/2010 | Kamiya et al. | 60/277 |
| 2010/0170227 A1* | 7/2010 | Tsukada et al. | 60/286 |
| 2012/0144811 A1 | 6/2012 | Yamada et al. | |
| 2012/0325093 A1 | 12/2012 | Shiomi et al. | |

FOREIGN PATENT DOCUMENTS

| | | |
|---|---|---|
| JP | 2005-113752 A | 4/2005 |
| JP | 2005-337062 A | 12/2005 |
| JP | 2010-77954 A | 4/2010 |
| JP | 2010-127253 A | 6/2010 |
| JP | 2010-229984 A | 10/2010 |
| JP | 2010-270611 A | 12/2010 |
| JP | 2010-270699 A | 12/2010 |
| JP | 2011-43091 A | 3/2011 |
| JP | 2011-185178 A | 9/2011 |

* cited by examiner

WORKING MACHINE

TECHNICAL FIELD

The present invention relates to a working machine such as a backhoe, a wheel loader, and a tractor, having a diesel particulate filter (DPF).

BACKGROUND ART

To improve and solve a recent environment problem, an exhaust gas regulation to a diesel engine is tightened. Also in a working machine such as a construction machine and an agricultural machine, techniques for decreasing the particle matter (the particulate matter) included in an exhaust gas are variously developed to deal with the strict exhaust gas regulation.

In general, an exhaust gas cleaning device to catch the particulate matter included in the exhaust gas is provided to the diesel engine. The exhaust gas cleaning device lets the exhaust gas pass through an internally-provided Diesel Particulate Filter (DPF) to catch the particulate matter. Since the caught particulate matter is gradually deposited in the DPF of the exhaust gas cleaning device, the DPF has to be regenerated by arbitrarily removing the particulate matter so that the DPF is not clogged to increase an air resistance of the exhaust system.

As a technique related to the regeneration of the above-mentioned DPF, there is an exhaust gas cleaning filter regeneration device disclosed in Japanese Unexamined Patent Publications JP-A 2005-337062.

The exhaust gas control filter regeneration device disclosed in Japanese Unexamined Patent Publications JP-A 2005-337062 is a device that regenerates an exhaust gas cleaning filter provided in an exhaust flow path of an engine to drive a hydraulic pump for supplying an operating oil to a working hydraulic device via a hydraulic circuit, comprising: a load oil path connected to the hydraulic circuit; a filter regeneration load for applying a load to the hydraulic pump, the filter regeneration load being arranged in the load oil path; an oil path opening-closing means to supply the operating oil from the hydraulic pump to the load oil path and to the filter regeneration load at regeneration of the exhaust gas cleaning filter; and a hydraulic operation means to operate a fuel injection amount regulation lever of the engine, the hydraulic operation means being arranged in the load oil path and being operated by a pressure of the operating oil from the hydraulic pump at the regeneration of the exhaust gas cleaning filter, wherein the load of the hydraulic pump is increased to increase the load of the engine by supplying the operating oil from the hydraulic pump to the load oil path and to the filter regeneration load due to the oil path opening-closing means at the regeneration of the exhaust gas cleaning filter, and the fuel injection amount regulation lever is operated by the hydraulic operation means.

In addition, as the above-mentioned technique related to the regeneration of the DPF, there is a working vehicle disclosed in Japanese Unexamined Patent Publications JP-A 2010-77954.

The working vehicle disclosed in Japanese Unexamined Patent Publications JP-A 2010-77954 has a configuration that, upon detection of a differential pressure equal to or larger than a pressure of a predetermined value in a pressure sensor at a moment immediately before stopping an engine, automatically starts up an electric power source of the working vehicle to inform an operator of the detection even after the stopping the engine, and when the operator selects a regeneration mode with use of a selection switch, automatically starts the engine to regenerate the DPF at an idling engine speed, and the working vehicle automatically stops the engine and the electric power source after the differential pressure in the pressure sensor becomes a predetermined value or less.

Moreover, as the above-mentioned technique related to the regeneration of the DPF, there are techniques disclosed in Japanese Unexamined Patent Publications JP-A 2010-127253 and Japanese Unexamined Patent Publications JP-A 2010-270611.

Japanese Unexamined Patent Publications JP-A 2010-127253 is a technique for performing close of an intake throttle (close of an intake valve and an exhausting valve) and the post injection at the regeneration process of the DPF, and automatically stops the engine upon completion of the regeneration.

Japanese Unexamined Patent Publications JP-A 2010-270611 is a technique for regenerating the DPF without stopping the engine at the clogging of the DPF through judgment of the clogging of the DPF on the basis of a working state of the engine during the operation of a construction machine.

SUMMARY OF INVENTION

Technical Problem

Japanese Unexamined Patent Publications JP-A 2005-337062 is the technique intending to, when it is determined that the regeneration of the DPF is required, regenerate the DPF by: increasing the load of the engine with prevention of an engine speed variation; and consequently increasing a temperature of an exhaust gas.

However, in only slightly increasing the engine load as in Japanese Unexamined Patent Publications JP-A 2005-337062, a problem that the temperature cannot be increased to a temperature enough to regenerate the DPF will often occur. And thus, not only a problem that the DPF cannot be regenerated, but also a problem that fuel consumption is unnecessarily increased will occur.

Accordingly, the present invention intends to provide a working machine able to require an operator to increase a speed (a revolution speed) of a diesel engine at an adequate time, for the purpose of increasing the temperature of exhaust gas to a required temperature for regeneration of the DPF.

Additionally, in the regeneration of the DPF whose deposition amount of the particulate matter is a predetermined amount or more, the technique of Japanese Unexamined Patent Publications JP-A 2010-77954 supposes a condition where a movement of the working vehicle is stopped and then the engine is stopped once. As mentioned above, since Japanese Unexamined Patent Publications JP-A 2010-77954 discloses the technique of the DPF regeneration supposing the stopping of engine, the working cannot be continued in the regeneration of the DPF in the technique of Japanese Unexamined Patent Publications JP-A 2010-77954. That is, in order to regenerate the DPF, the movement of the working vehicle has to be purposely stopped even in the working due to the working vehicle, and accordingly the working vehicle is very hard to be conveniently used.

Moreover, in the technique of Japanese Unexamined Patent Publications JP-A 2010-77954, since the DPF is regenerated at a very low engine speed, that is, at an idling engine speed, not only the regeneration of the DPF requires a long time, but also the DPF may not be regenerated sufficiently.

Accordingly, the present invention intends to provide the working machine able to regenerate the DPF efficiently and sufficiently even in traveling and operating.

Further, Japanese Unexamined Patent Publications JP-A 2010-127253 and Japanese Unexamined Patent Publications JP-A 2010-270611 are also techniques to regenerate the DPF by operating the engine; however, the techniques focus only on the decreasing of the deposition in the DPF (a PM deposition amount) in a regeneration process (a regeneration operation) of the DPF. That is, in the techniques, the process to decrease the PM deposition amount is positively performed once due to the regeneration operation of the DPF; however, in a current condition, a process to prevent the PM deposition amount from increasing is not considered originally.

Then, the present invention intends to provide the working machine able to decrease the deposition amount (the PM deposition amount) by efficiently regenerating the filter such as the DPF, and further to suppress the increasing of the deposition amount (the PM deposition amount) of the particulate matter deposited in the DPF.

In addition, the present invention intends to provide the working machine able to suppress the increasing of the deposition amount (the PM deposition amount) of the particulate matter deposited in the DPF even under a condition where an operator does not get on the working machine (under a condition where the operator gets off the working machine).

Solution to Problem

To achieve the above-mentioned purpose, the present invention provides the following means.

Specifically, a working machine according to a first aspect of the present invention comprises: a diesel engine able to increase a speed due to an accelerating operation; an exhaust gas cleaning device having a filter for catching a particulate matter included in an exhaust gas exhausted from the diesel engine; and a filter regeneration means to combust and remove the particulate matter deposited in the filter of the exhaust gas cleaning device, wherein the filter regeneration means requires to increase the speed of the diesel engine during an automatic regeneration for automatically combusting and removing the particulate matter deposited in the filter.

The working machine according to a second aspect of the present invention, wherein the filter regeneration means requires to increase the speed of the diesel engine under a state where the automatic regeneration is performed and when a temperature indicator related to the diesel engine is a first temperature or less.

The working machine according to a third aspect of the present invention, wherein the filter regeneration means stops the requirement under a state where the requiring is made and when the temperature indicator related to the diesel engine is a second temperature or more higher than the first temperature for a predetermined time or more.

The working machine according to a fourth aspect of the present invention, wherein the filter regeneration means requires to increase the speed of the diesel engine under a state where the automatic regeneration is performed and when a deposition amount of the particulate matter becomes a first deposition amount or more.

The working machine according to a fifth aspect of the present invention, wherein the filter regeneration means stops the requirement under a state where the requiring is made and when the deposition amount of the particulate matter becomes a second deposition amount or less smaller than the first deposition amount.

The working machine according to sixth and seventh aspects of the present invention, wherein the temperature indicator is at least one of an intake temperature, exhaust temperature, and coolant temperature of the diesel engine.

To achieve the purpose, the present invention provides the following means.

Specifically, as a technical means to solve the problems in the present invention, a working machine according to an eighth aspect of the present invention, comprises: a diesel engine able to increase a speed due to an accelerating operation; an exhaust gas cleaning device having a filter for catching a particulate matter included in an exhaust gas exhausted from the diesel engine; and a filter regeneration means to combust and remove the particulate matter deposited in the filter of the exhaust gas cleaning device, wherein the filter regeneration means includes: a first regeneration control mode for performing an automatic regeneration for automatically combusting and removing the particulate matter deposited in the filter when a deposition amount of the particulate matter deposited in the filter is equal to a predetermined value or more; and a second regeneration control mode for requiring to increase a speed of the diesel engine to a predetermined speed or more when the automatic regeneration is performed.

Here, the working machine according to a ninth aspect of the present invention, wherein the first regeneration control mode preferably performs the automatic regeneration when the deposition amount of the particulate matter becomes the first deposition amount threshold or more, and the second regeneration control mode preferably requires to increase the speed of the diesel engine to a predetermined speed or more when the deposition amount of the particulate matter is not less than a warning clearing threshold value lower than the first deposition amount threshold value within a predetermined time from the starting of the automatic regeneration due to the first regeneration control mode.

Additionally, the working machine according to a tenth aspect of the present invention, the first regeneration control mode preferably performs the automatic regeneration when the deposition amount of the particulate matter becomes a first deposition amount threshold value or more, and the second regeneration control mode preferably requires to increase the speed of the diesel engine to a predetermined speed or more when the deposition amount of the particulate matter becomes a second deposition amount threshold value or more higher than the first deposition amount threshold value.

Moreover, the working machine according to eleventh and twelfth aspects of the present invention, preferably comprises a third regeneration control mode for ordering the diesel engine to limit an output within a predetermined range when the deposition amount of the particulate matter becomes a third deposition amount threshold value or more higher than the second deposition amount threshold value at a step the requirement is made.

To achieve the purpose, the present invention provides the following means.

Specifically, as a technical means to solve the problems in the present invention, a working machine according to a thirteenth aspect of the present invention, comprises: an exhaust gas cleaning device having a filter for catching a particulate matter included in an exhaust gas exhausted from a diesel engine; a filter regeneration means to combust and remove the particulate matter deposited in the filter of the exhaust gas cleaning device; and a boarding confirmation means to confirm boarding, including: a regeneration permission means to permit a regenerating operation to combust and remove the particulate matter due to the filter regeneration means under a state where the engine is in operation and the boarding confirmation means confirms the boarding; and a deposition suppression means to suppress increasing of the deposition amount of the particulate matter deposited in the filter by stopping the engine under a state where the engine is in operation and the boarding confirmation means cannot confirm the boarding.

The working machine according to a fourteenth aspect of the present invention, the deposition suppression means preferably stops the engine when the state where the engine is in operation and the boarding is not confirmed is continued for a predetermined time.

The working machine according to a fifteenth aspect of the present invention, the deposition suppression means preferably stops the engine when the deposition amount is in an increasing tendency under the state where the engine is in operation and the boarding is not confirmed.

The working machine according to a sixteenth aspect of the present invention, the filter regeneration means preferably has an automatic regeneration mode for automatically performs the regenerating operation when the deposition amount of the particulate matter deposited in the filter is a predetermined value or more.

The working machine according to a seventeenth aspect of the present invention, the filter regeneration means preferably includes an output limitation mode for limiting an output of the diesel engine at the step where the automatic regeneration mode is performed and when the deposition amount is in the increasing tendency more than that before the automatic regeneration mode.

The working machine according to an eighteenth aspect of the present invention, the filter regeneration means preferably includes a regenerating operation help mode for informing to increase the speed of the diesel engine as help of the regenerating operation.

The working machine according to a nineteenth aspect of the present invention is preferably configured so as to restart the engine after the engine is stopped by the deposition suppression means.

To achieve the purpose, the present invention provides the following means.

Specifically, according to a working machine of a twentieth aspect of the present invention, a technical means to solve the problems in the present invention comprises: an exhaust gas cleaning device having a filter for catching a particulate matter included in an exhaust gas exhausted from a diesel engine; a filter regeneration means to combust and remove the particulate matter deposited in the filter of the exhaust gas cleaning device; and a boarding confirmation means to confirm boarding or getting-off, including: an engine speed control means to automatically decrease the speed of the engine when the engine is in operation under a state where the getting-off is confirmed by the boarding confirmation means and when the deposition amount of the particulate matter deposited in the filter is a predetermined value or more.

The working machine according to a twenty-first aspect of the present invention, wherein the engine speed control means decreases the engine speed to zero when the engine speed under the state of getting-off is an idling engine speed and the deposition amount is a predetermined value or more.

The working machine according to a twenty-second aspect of the present invention, wherein the engine speed control means gradually decreases the engine speed to an idling engine speed and finally to zero when the engine speed under the state of getting-off is an idling engine speed or more and the deposition amount is a predetermined value or more.

The working machine according to a twenty-third aspect of the present invention, includes an output limitation means to limit an output of the engine with the increasing and decreasing of the speed of the engine allowed when the engine is in operation under a state where the boarding is confirmed by the boarding confirmation means and the deposition amount of the particulate matter deposited in the filter is a predetermined value or more.

The working machine according to a twenty-fourth aspect of the present invention, includes an information means to inform to decrease the speed of the engine when the speed of the engine is decreased by the engine speed control means.

Advantageous Effects of Invention

According to a first aspect of the present invention, during a period of an automatic regeneration performed without any relation to an operation by an operator, it is possible to request the operator to increase a speed of a diesel engine. When the operator increases the speed of the engine in accordance with the request, an exhaust temperature of the diesel engine is increased, and accordingly it is possible to promote combustion of the particulate matter in the filter, thereby helping the automatic regeneration.

According to a second aspect of the present invention, when a temperature indicator related to the diesel engine is low, that is, when an effect of the automatic regeneration cannot be expected sufficiently, it is possible to request the operator to increase the speed of the diesel engine. When the operator increases the speed of the engine in accordance with the request, the temperature indicator of the diesel engine is increased, and accordingly it is possible to promote combustion of the particulate matter in the filter, and thus to help the automatic regeneration.

According to a third aspect of the present invention, when it is supposed that the automatic regeneration (the combustion of the particulate matter) progresses after the temperature indicator of the diesel engine, that is, the ground of calculation of the PM deposition amount maintains a predetermined or more temperature for a certain time, it is possible to stop the request to increase the speed of the diesel engine. Accordingly, the operation to increase the speed of the diesel engine can be finished at an appropriate time when the automatic regeneration progresses.

According to a fourth aspect of the present invention, when the PM deposition amount is large in a period when the automatic regeneration is performed, the operator is requested to increase the speed of the diesel engine. Accordingly, at a time when an effect of the automatic regeneration does not appear sufficiently, it is possible to request the increasing of the speed of the diesel engine at adequate timing. When the operator increases the speed of the diesel engine in accordance with the request, the exhaust temperature of the diesel engine is increased, and accordingly it is possible to promote combustion of the particulate matter in the filter, thereby helping the automatic regeneration.

According to a fifth aspect of the present invention, when the PM deposition amount becomes smaller than that at the time when the request to increase the speed of the diesel engine starts, the request to increase the speed of the diesel engine is stopped. Accordingly, the request to increase of speed can be stopped adequately at the time when the PM deposition amount is reduced certainly after the automatic regeneration progresses.

According to sixth and seventh aspects of the present invention, it is possible to request the increasing of the speed with use of the temperature indicator related to the calculation of the PM deposition amount, and to request and stop the increasing of speed of the diesel engine at adequate timing simply and accurately in accordance with the increasing and decreasing of the PM deposition amount.

According to an eighth aspect of the present invention, the DPF can be regenerated without stopping the working machine. On this occasion, since the operator is prompted by a warning to increase the engine speed, the operator noticing the warning can increase the engine speed arbitrarily even in the working. As the result, the temperature of the DPF is increased by the further increasing of the exhaust temperature according to the increasing of the engine speed, and thus the particulate matter is combusted. In this manner, the decreasing of the deposition amount of the particulate matter progresses, and the regeneration of the DPF can be efficiently performed.

According to a ninth aspect of the present invention, by observing a decreasing tendency of the deposition amount (whether or not the deposition amount is less than a warning clearing threshold value) after a predetermined time from the start of the automatic regeneration, a necessity of the increasing of engine speed is judged (it is judged whether or not to prompt the operator to regenerate the DPF). In this manner, the DPF can be regenerated in an early stage (a stage where the deposition amount is not so large).

According to a tenth aspect of the present invention, after the start of the automatic regeneration, by observing an increasing tendency of the deposition amount (whether or not the deposition amount is a second deposition amount threshold value or more), the necessity of the increasing of engine speed is judged (it is judged whether or not to prompt the operator to regenerate the DPF). In this manner, only in a case where the deposition amount is increased to some extent (in the case of the second deposition amount threshold value or more), the DPF can be regenerated by the increasing of the engine speed. As the result, fuel consumption due to the regeneration of the DPF can be suppressed, suppressing that the deposition amount becomes larger than the second deposition amount.

According to eleventh and twelfth aspects of the present invention, in a case where the deposition amount is a third deposition amount threshold value or more higher than the second deposition amount threshold value, it is possible to limit the output of the diesel engine, and thus to suppress the increasing of the particulate matter after exceeding the third deposition amount threshold value. Accordingly, since the warning that requires the increasing of speed of the diesel engine is continued, suppressing the output of the engine, it is possible to let the operator increase the speed of the engine before the deposition amount becomes excessive.

According to a thirteenth aspect of the present invention, the deposition amount (the PM deposition amount) can be decreased by efficiently performing the regeneration of the filter such as the DPF, and further the increasing of the deposition amount (the PM deposition amount) of the particulate matter deposited in the DPF also can be suppressed.

According to a fourteenth aspect of the present invention, for example, the increasing of the PM deposition amount can be suppressed (prevented) under a condition where the operator gets off the working machine for a long time, leaving the engine running, (to take a rest and to temporarily stop the working (under a condition where the getting-on cannot be confirmed).

According to a fifteenth aspect of the present invention, for example, while the operator gets off the working machine, only in a case where the PM deposition amount is on the increase tendency, the increasing of the PM deposition amount can be suppressed by stopping the engine.

According to a sixteenth aspect of the present invention, the PM deposition amount can be decreased by automatically combusting the particulate matter.

According to a seventeenth aspect of the present invention, the considerable increasing of the PM deposition amount can be suppressed.

According to an eighteenth aspect of the present invention, when the engine speed is manually increased by prompting the operator to increase the speed of the engine, the exhaust temperature is increased, and thereby the regeneration of the DPF can be promoted.

According to a nineteenth aspect of the present invention, even when the engine is forcibly stopped, the engine can be started again, and the working can be temporarily performed.

According to a twentieth aspect of the present invention, for example, the increasing of the PM deposition amount can be suppressed under a condition where the operator gets off the working machine for a long time, leaving the engine running, to take a rest and to temporarily stop the working.

According to twenty-first and twenty-second aspects of the present invention, the increasing of the PM deposition amount due to the idling engine speed can be certainly suppressed.

According to a twenty-third aspect of the present invention, under the condition where the operator gets on the working machine, the increasing of the PM deposition amount can be suppressed by limiting the output of the engine.

According to a twenty-fourth aspect of the present invention, it is possible to inform the operator apart from the working machine of the increasing of the PM deposition amount.

DESCRIPTION OF EMBODIMENTS

Referring to drawings, embodiments of the present invention will be explained below.

(First Embodiment)

A working machine of the present invention has a Diesel Particulate Filter (DPF), and has a means to combust and remove the particulate matter deposited in the DPF. A construction machine such as a backhoe and a Compact Track Loader (CTL), and an agricultural machine such as a tractor exist as the above-mentioned working machine; however, the backhoe will be explained as one example of the working machine in the present embodiment.

Figure 23:
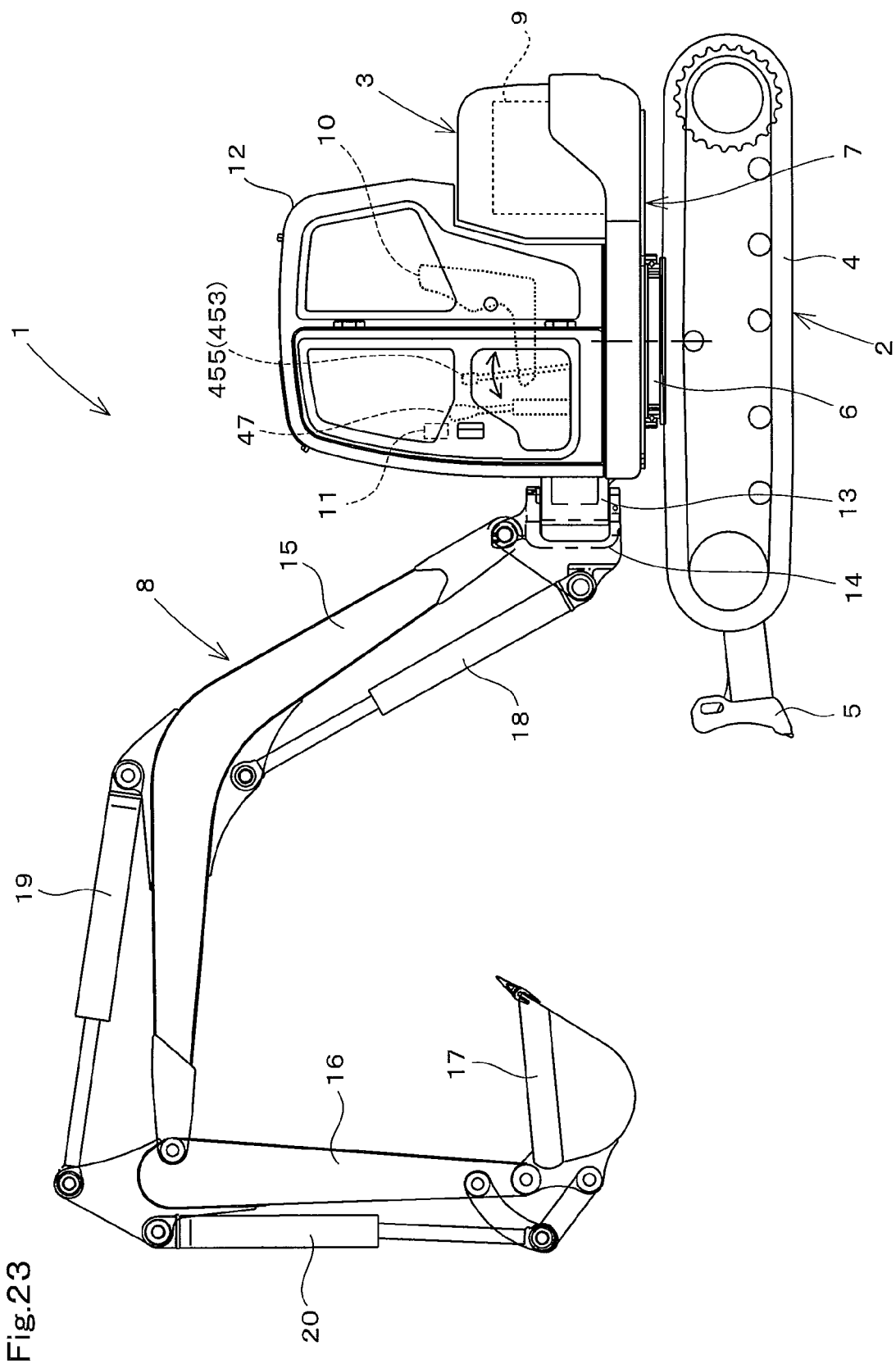
FIG. 23 is an overall side view of the backhoe.

FIG. 23 is a side surface view showing a schematic configuration of a backhoe 1. As shown in FIG. 23, the backhoe 1 includes a traveling device 2 in a lower portion and a turning body 3 in an upper portion.

The traveling device 2 is a crawler traveling device having a pair of right and left traveling bodies 4 each including a rubber covering belt. In addition, to the traveling device 2, a hydraulic motor M for making the crawler travel with use of a hydraulic pressure obtained from a hydraulic pump operated by an output of the diesel engine 9 is provided, and a dozer 5 is provided in a front portion.

The turning body 3 includes: a turning pedestal 7 supported on the traveling device 2 turnably toward the right and left directions around a turning axis along the vertical direction via a turning bearing 6; and a working device 8 (an excavation device) provided in the front portion of the turning pedestal 7. On the turning pedestal 7, the diesel engine 9, a radiator, an operator's seat 10, a fuel tank, an operating oil tank, a control valve for controlling an operating oil from the operating oil tank, and the like are provided. In a periphery of the operator's seat 10, a display device 11 for displaying various pieces of information related to the backhoe 1 is provided. The operator's seat 10 is surrounded by a cabin 12 provided on the turning pedestal 7.

The working device 8 includes: a swing bracket 14 supported to be freely oscillated in the right and left directions by a support bracket 13 provided to the front portion of the turning pedestal 7; and a boom 15 supported by the swing bracket 14 at a base portion side so as to be freely oscillated in the vertical directions. An arm 16 is supported at a leading end side of the boom 15 so as to be freely oscillated forward and backward, and a bucket 17 is provided to a leading end side of the arm 16 so that the shoveling and dumping operations can be realized.

The swing bracket 14 is oscillated by extension and contraction of a swing cylinder provided in the turning pedestal 7. The boom 15 is oscillated by extension and contraction of a boom cylinder 18 provided between the boom 15 and the swing bracket 14. The arm 16 is oscillated by extension and contraction of the arm cylinder 19 provided between the arm 16 and the boom 15. The bucket 17 is used for the shoveling and dumping operations by extension and contraction of the bucket cylinder 20 provided between the bucket 17 and the arm 16.

Each of the cylinders, that is, the swing cylinder, the boom cylinder 18, the arm cylinder 19, and the bucket cylinder 20 are configured so as to be extended and contracted by the operating oil whose flow rate is controlled by a control valve.

Here, referring to FIG. 1, the display device 11 provided around the operator's seat 10 will be explained.

Figure 1:
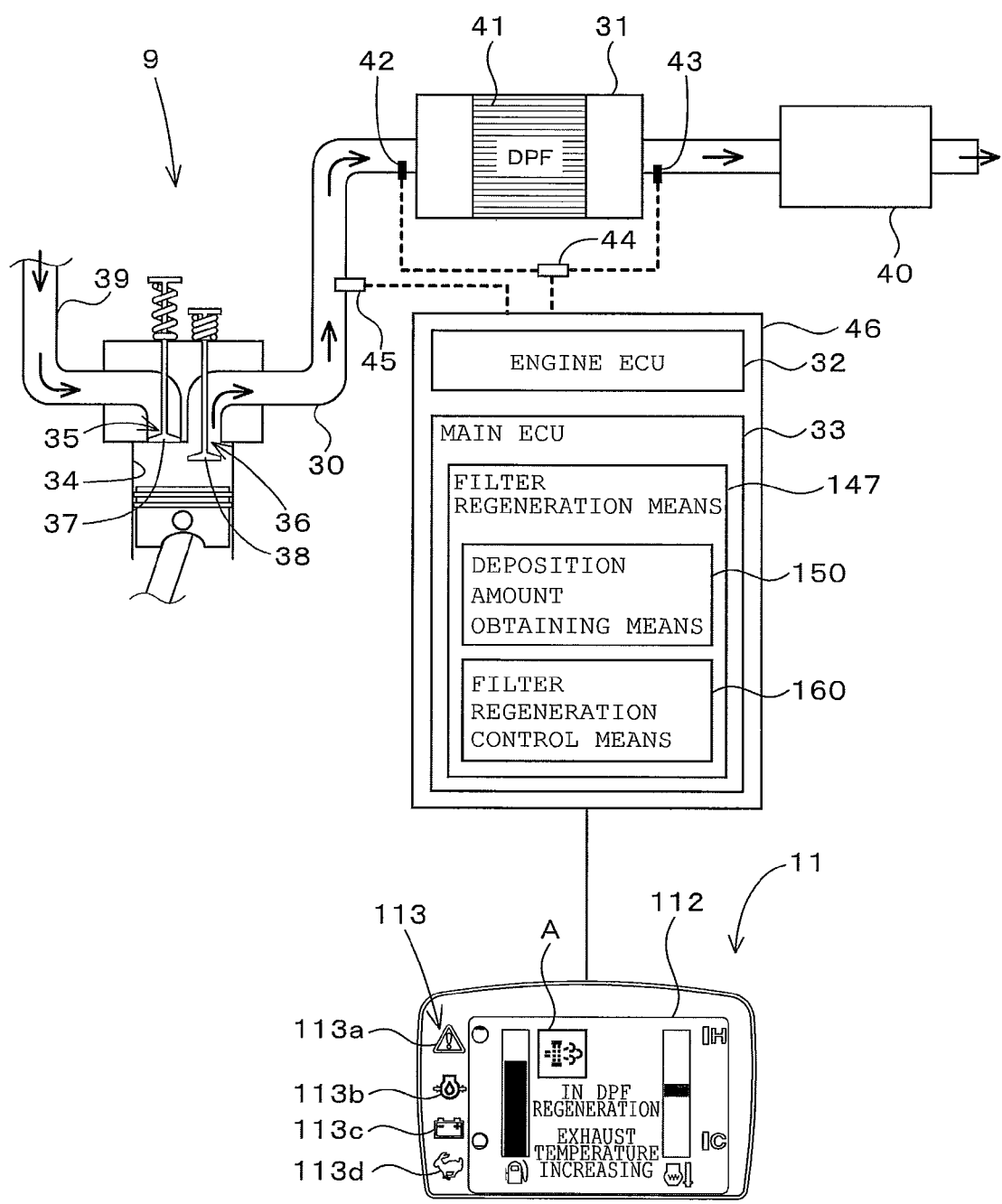
FIG. 1 is a diagram showing configurations of an exhaust gas cleaning device, a control part, and a display device provided to an exhaust system of a diesel engine included in a backhoe according to embodiments of the present invention.

As shown in FIG. 1, the display device 11 includes a liquid crystal panel 112 and an LED display part 113. The liquid crystal panel 112 can freely display a character and a graphic sign due to the liquid crystal display, and can freely change the character and the graphic sign to be displayed. For example, in FIG. 1, to a left side of the liquid crystal panel 112, a fuel indicator indicating a remaining amount of fuel with use of a bar-graphical gauge is displayed; a length of the gauge, that is, the length of the bar graph corresponds to the remaining amount of fuel. In addition, to a right side of the liquid crystal panel, a water temperature indicator indicating a water temperature of a coolant water is displayed, a cursor indicating a present water temperature moves upward and downward in accordance with the water temperature.

Moreover, in FIG. 1, in a center portion of the liquid crystal display 112, an icon A showing that the automatic regeneration of the DPF is during execution, and the character information calling for attention of the regeneration of the DPF, for example, "In DPF regeneration", "Exhaust temperature increasing" and the like are displayed. A type of information displayed on the liquid crystal panel 112 and the display mode such as the graphical sign and character each are arbitrarily selected.

An LED display part 113 displays detection information detected by sensors connected to a control part 46 (the engine ECU 32 and the main ECU 33) described later with use of the lighting, extinguishing, and flashing of the LED element. Specifically, as the LED display part 113, a warning LED display part 113a showing that some warning is being issued, a hydraulic pressure LED display part 113b showing a warning related to the engine hydraulic pressure, a battery LED display part 113c showing a warning related to a charging state of the battery, a speed LED display part 113d showing a warning of speed, and an exhaust LED display part showing a warning related to the exhaust temperature are included. The LED display parts 113 can freely change the display mode not only by using the lighting, extinguishing, and flashing, but also by changing a lighting time, a extinguishing time, a flashing interval, and brightness of the lighting.

As described above, in FIG. 1, the display device 11 having the liquid crystal panel 112 is shown; however, when being able to display the above-mentioned information, the display device 11 is not limited to the display device employing the liquid crystal panel 112.

In addition, FIG. 1 is a diagram showing structures of the diesel engine 9 and of the exhaust system of the diesel engine 9. Firstly, the exhaust system of the diesel engine 9 will be explained. Meanwhile, the diesel engine 9 is generally a multicylinder engine having a plurality of cylinders; however, in FIG. 1, a configuration of a cylinder 34, one of the cylinders, is shown and will be explained.

As shown in FIG. 1, the diesel engine 9 supplies a motive power to the respective types of devices, for example, a hydraulic pressure motor M and a hydraulic pressure pump mounted on the backhoe 1. In an upper portion of the cylinder 34 of the diesel engine 9, an intake port 35 that is an opening for introducing air into the cylinder is formed, and an exhaust port 36 that is an opening for exhausting a gas after the combustion (a combustion gas) from the cylinder 34 is formed. Moreover, in the upper portion of the cylinder 34, an intake valve 37 for opening and closing the intake port 35, and an exhaust valve 38 for opening and closing the exhaust port 36 are provided.

To the intake port 35, a tubular intake manifold 39 serving as a flow path of the air introduced to the cylinder 34 is connected. In addition, to the exhaust port 36, a tubular exhaust manifold 30 serving as a flow path of the combustion gas exhausted from the cylinder 34 is connected. A silencer 40 for reducing an exhaust sound is provided to an end portion of the exhaust manifold 30, and the combustion gas is exhausted to the environment through the silencer 40.

In the exhaust manifold 30, an exhaust gas cleaning device 31 is provided between the exhaust port 36 and the silencer 40. The exhaust gas cleaning device 31 cleans the combustion gas, and catch the particulate matter (PM) included in the passing combustion gas. That is, the combustion gas including the particulate matter exhausted from the cylinder 34 via the exhaust port 36 passes through the exhaust manifold 30 as the exhaust gas, is cleaned by the exhaust gas cleaning device 31, and reaches the silencer 40.

The exhaust gas cleaning device 31 internally includes the diesel particulate filter (DPF) 41. The DPF 41 is a filter for catching the particulate matter PM included in the combustion gas, and, for example, is made of the ceramic or metal to be formed so that the cross-section can have a honey comb structure. That is, many straw-shaped polygonal through holes, for example, the hexagonal column through holes, are adjacent each other along a longitudinal direction from one end of the DPF 41 to the other end, and in each of the through holes, porous partitions are arranged at a predetermined interval along the longitudinal direction of the DPF 41. The DPF 41 having the above-mentioned honey comb structure is configured so that the position of the partition formed in the through hole along the longitudinal direction of the DPF 41 can be different from a position of a partition formed in the adjacent through holes.

The exhaust gas entering from one end side of the DPF 41 flows toward the other end side of the DPF 41, passing the porous partition formed in the through holes. The particulate matter included in the exhaust gas is caught by the DPF 41 to be deposited by adhering to the porous partition and adhering to the porous inner wall. That is, since having the structure clogging when an amount of the deposited particulate matter becomes large, the DPF 41 has to be arbitrarily cleaned so that the deposition amount of the particulate matter (the PM deposition amount) cannot be so large.

In the present embodiment, the cleaning of the DPF 41 is called "Regeneration of DPF", and an operation for the regeneration is called "Regenerating operation of DPF". In the regeneration of the DPF 41, the deposited particulate matter is combusted to be gasified by increasing the temperature of the DPF 41 to a predetermined temperature or more, and is exhausted to the environment together with the exhaust gas.

The exhaust gas cleaning device 31 has an oxidation catalyst for oxidizing the fuel in the particulate matter and the nitrogen oxide in the combustion gas and the like, not shown in the drawings, other than the DPF 41.

To an inlet side of the exhaust gas cleaning device 31, an inlet side pressure sensor 42 for detecting an exhaust pressure in the vicinity of the inlet of the exhaust gas cleaning device 31 is provided, and to an outlet side, an outlet side pressure sensor 43 for detecting an exhaust pressure in the vicinity of the outlet. The inlet side pressure sensor 42 and the outlet side pressure sensor 43 are common pressure sensors, for example, composed of a piezoelectric element. The inlet side pressure sensor 42 and the outlet side pressure sensor 43 are connected to the differential pressure sensor 44 explained next.

The differential pressure sensor 44 detects a difference of the exhaust pressures of the inlet side and outlet side of the exhaust gas cleaning device 31, that is, the differential pressure on the basis of the exhaust pressure detected by the inlet side pressure sensor 42 and of the exhaust pressure detected by the outlet side pressure sensor 43. Generally, in a case where the DPF 41 has no deposition of the particulate matter and is not clogged, since a pressure loss due to the DPF 41 is very small, a difference between the exhaust pressures detected by the inlet side pressure sensor 42 and the outlet side pressure sensor 43, and the differential pressure detected by the differential pressure sensor 44 is a small value. However, as the particulate matter is deposited in the DPF 41 and a volume of the clogging becomes large, the pressure loss due to the DPF 41 becomes large, and accordingly the differential pressure detected by the differential pressure sensor 44 becomes large. Since the magnitude of the differential pressure corresponds to the volume of the clogging of the DPF 41, the magnitude of the differential pressure can be converted into the volume of the clogging of the DPF 41, that is, the PM deposition amount in the DPF 41.

As shown in FIG. 1, to the exhaust manifold 30 connecting the diesel engine 9 to the exhaust gas cleaning device 31, an exhaust temperature sensor 45 for detecting a temperature of the combustion gas exhausted from the diesel engine 9 toward the exhaust gas cleaning device 31 (the exhaust temperature) is provided. The exhaust temperature sensor 45 is composed of, for example, a thermistor. The differential pressure detected by the differential pressure sensor 44 and the exhaust temperature detected by the exhaust temperature sensor 45, mentioned above, are sent to the control part 46, and the control part 46 performs a control for regeneration of the DPF. Meanwhile, the control for the regeneration of the DPF will be described later.

The control part 46 controls the backhoe 1, other than the control for the regeneration of the DPF, is configured by one or a plurality of control units (ECU), and, for example, has an engine ECU 32 for controlling the diesel engine 9 and a main ECU 33 for controlling entire operations of the backhoe 1. The engine ECU 32 and the main ECU 33 are configured, for example, by a CPU.

The engine ECU 32 obtains information from sensors arranged in some places of the diesel engine 9 and a power transmission system, calculates a suitable fuel injection amount and injection timing, ignition timing, an idling engine speed, and the like according to a state of the diesel engine 9, and outputs a control command to the diesel engine 9 and the like. For example, when an accelerator (an acceleration lever) provided around the operator's seat 10 is operated (by performing an accelerating operation), the engine ECU detects an operation amount (an opening degree) of the accelerator to increase and decrease the fuel injection amount. When the acceleration operation is performed in this manner, the speed of the diesel engine 9 can be increased and decreased.

As an sensor supplying the information to the engine ECU 32, an accelerator opening sensor for detecting an acceleration opening (an operation amount of the acceleration lever), the differential pressure sensor 44 for detecting the differential pressure of the exhaust gas cleaning device 31, the exhaust temperature sensor 45 for detecting the exhaust temperature, an air flow meter for detecting an intake air amount, a crank position sensor for detecting the engine speed, the water temperature sensor for detecting a water temperature of the coolant water, a throttle position sensor for detecting an opening of a valve, and the like are included. Other than these sensors, a cam position sensor for detecting a crank position, an oxygen concentration sensor for detecting an oxygen concentration of the intake air, and the like are included.

The main ECU 33 controls various types of device (the traveling device, the working device, and the like) provided to the backhoe 1 in combination with the engine ECU 32. For example, the main ECU 33 executes: the flow rate control for supplying a predetermined operation oil to the respective cylinder such as the swing cylinder, the boom cylinder 18, the arm cylinder 19, the bucket cylinder 20, and the like; and the AI control.

The flow rate control is executed on the basis of an operation amount of the operation member (the operation lever) 47 provided around the operator's seat 10, and specifically, when a left-side operation amount is inputted by swinging the operation lever 47 from a neutral position to one direction (the left side), an electric current of a predetermined value (an operation signal) is outputted to a solenoid of an electromagnetic proportional valve corresponding to the operated actuator (the swing cylinder, the boom cylinder 18, the arm cylinder 19, and the bucket cylinder 20). Then, the electromagnetic proportional valve is opened in accordance with the current value, a pilot pressure of the control valve corresponding to the operated actuator is controlled, and the actuator moves to the one side. When a right-side operation amount is inputted by swinging the operation lever 47 from a neutral position to the opposite direction to the above-described direction, the actuator is moved to the opposite side to the left-side swinging. In this manner, the backhoe 1 can work by operating the operation lever.

In addition, the AI control is a control for setting the engine speed so that, when the operation lever 47 is not operated, the engine speed can be the idling engine speed and so that, when the operation lever 47 is operated, the engine speed can correspond to the opening of acceleration.

Specifically, in the AI control, when an on-signal of the idle switch is inputted by shifting the operation lever 47 to the neutral position, an idle signal to set the engine speed to the idling engine speed is outputted to the auto idle motor regardless of an operation amount of the acceleration lever, and thereby driving the auto idle motor and setting the engine speed to the idling engine speed. Additionally, when an off-signal of the idle switch is inputted by swinging the operation lever 47 from back to front or from left side to right side, the engine speed based on the acceleration lever is outputted to the auto idle motor on the basis of the signal of the accelerator position, the auto idle motor is driven to operate a governor lever, and thus the engine speed is set to a speed corresponding to the acceleration lever.

As described above, the diesel engine 9 is controlled by the engine ECU 32, and various types of device such as the working device are controlled by the main ECU 33, and thereby the backhoe 1 can be operated. Meanwhile, the controls due to the engine ECU 32 and due to the main ECU 33 are obviously not limited to the above-described control.

In addition, the main ECU 33 also controls the entire operation of the backhoe 1 including the display device 11 displaying an operation state of the backhoe 1, for example, a meter and monitor provided around the operator's seat 10. The main ECU 33 in the present embodiment has a filter regeneration means 147 to regenerate the DPF 41 of the exhaust gas cleaning device 31. The filter regeneration means 147 is realized by a computer program executed by the main ECU 33.

Here, the display device 11, the engine ECU 32, and the main ECU 33 are connected each other via a vehicle communication network N such as the Controller Area network (CAN communication), and are able to mutually send and receive data. Meanwhile, if the vehicle communication network is able to send and receive the data between the display device 11, the engine ECU 32, and the main ECU 33, the standard of the network is not specifically limited. For example, the FlexRay and also other network may be employed.

As shown in FIG. 1, the filter regeneration means 147 includes: a deposition amount obtaining means 150 to obtain the deposition amount (the PM deposition amount) of the particular matter deposited in the DPF 41; and a filter regeneration control means 160 to regenerated the DPF 41 on the basis of the PM deposition amount obtained by the deposition amount obtaining means 150.

The deposition amount obtaining means 150 obtains, from the engine ECU 32, the information such as: the differential pressure of the exhaust gas cleaning device 31 (the value detected by the differential pressure sensor 44), the exhaust temperature detected by the exhaust temperature sensor 45, the water temperature of the coolant water, the oxygen concentration of the intake air and the temperature, the injection amount of fuel, and the like, and then calculates and obtains the deposition amount of the particulate matter (the PM deposition amount) deposited in the DPF 41.

The filter regeneration control means 160 divides the regeneration operation to regenerate the DPF 41 into a plurality of modes to separately performs the modes, and performs the regeneration operation of two modes, a first regeneration control mode and a second regeneration control mode. That is, the filter regeneration control means 160 performs the first regeneration control mode and the second regeneration control mode on the basis of the PM deposition amount obtained by the deposition amount obtaining means 150, and thereby regenerating the DPF 41.

Here, the first regeneration control mode is a mode for performing the automatic regeneration of the DPF 41, and as the operation of the automatic regeneration, the intake throttle of the diesel engine 9 is closed, and thus the exhaust temperature is increased due to the closing of the intake throttle, for example.

In addition, the second regeneration control mode is a mode for issuing a piece of information (a warning) requiring the operator to increase the speed of the diesel engine 9. The increasing of speed of the engine 9 means that the speed of the engine is increased at least to the idling engine speed or more, and preferably the engine speed is increased to be one and a half larger than the idling engine speed, for example.

Figure 3:
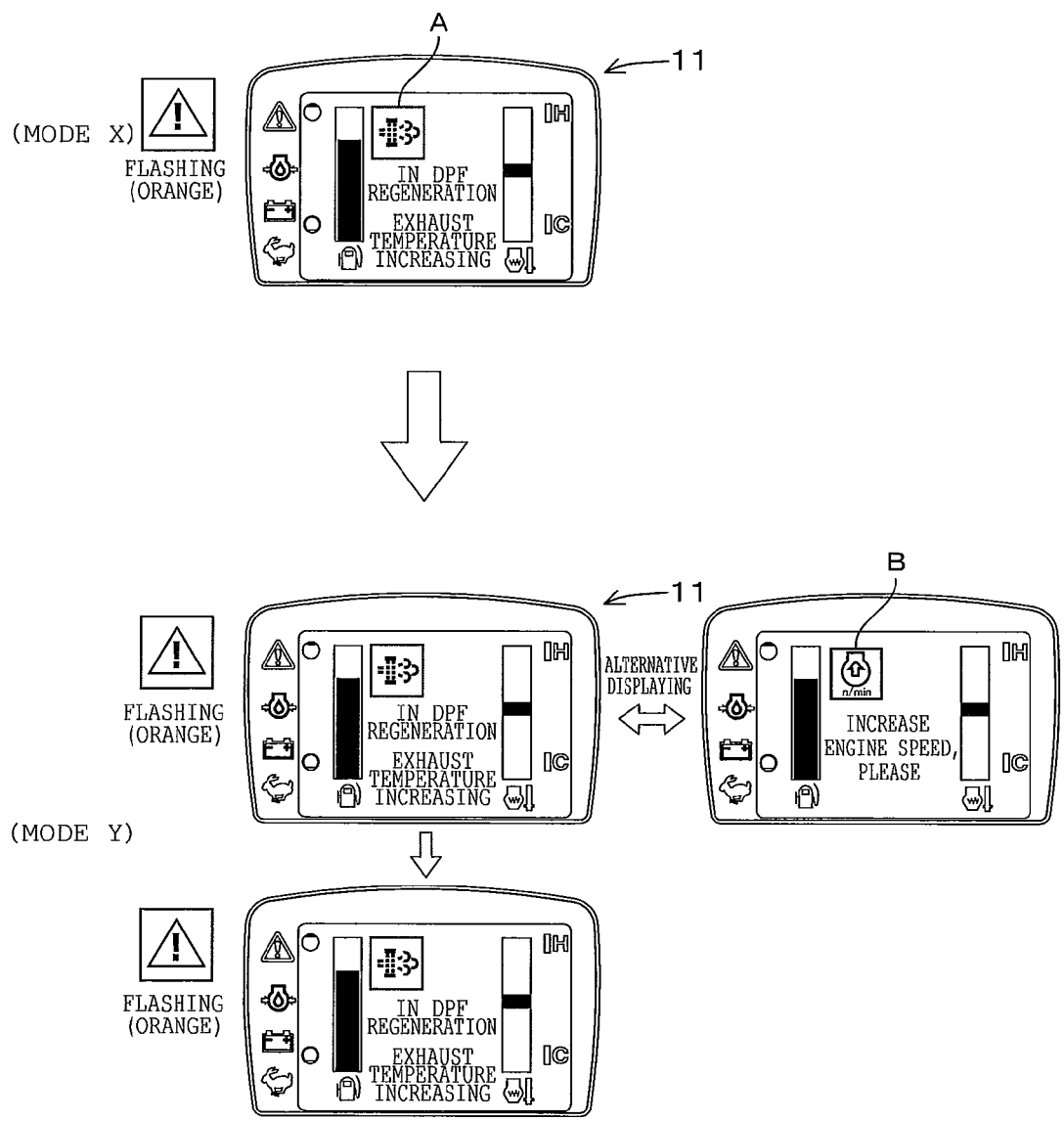
FIG. 3 is a diagram showing display modes of the display device in the first embodiment of the present invention.

Specifically, as shown by the display mode Y in FIG. 3, in the second regeneration control mode 52, the display device 11 displays an icon B to require the operator to increase the engine speed (for example, increasing to 1800 rpm or more), and the display device 11 emits an intermittent information sound (a warning sound). On this occasion, when the operator operates the accelerator in accordance with the displayed icon B and with the emitted warning sound to increase the engine speed to a predetermined speed or more (for example, 1800 rpm or more), the exhaust temperature is further increased, the combustion of the particular matter deposited in the DPF 41 is promoted to decrease the PM deposition amount.

The filter regeneration control means 160 has a threshold value TH based on the PM deposition amount as a standard for determination of performing the first regeneration control mode. The threshold value TH is a value for starting the automatic regeneration as described above, and is set to an approximately 50% to 60% value, for example, to the maximum amount (a catching limitation value) of the particulate matter that the DPF 41 can catch. For example, when the normal operation of the backhoe 1 (the operation of the operation lever and the like) is continued without performing the regeneration operation of the DPF 41 under a state where the PM deposition amount exceeds 60% of the catching limitation value, the PM deposition amount is further increased. In this case, even when the automatic regeneration of the DPF 41 is started later, the increasing of the exhaust temperature and the like takes a long time, and thus it may become difficult to progress the decreasing of the PM deposition amount in the DPF 41 through the automatic regeneration. Accordingly, at the timing when the PM deposition amount becomes the threshold value TH or more, the filter regeneration control means 160 starts the automatic regeneration in the first regeneration control mode.

Specifically, the filter regeneration control means 160 compares the PM deposition amount calculated by the deposition amount obtaining means 150 to the threshold value TH, and determines whether or not to perform the first regeneration control mode. Concretely, when the calculated present PM deposition amount is smaller than the threshold value TH, the first regeneration control mode is not performed, and when the present PM deposition amount is the threshold value TH or more, the first regeneration control mode is performed.

Figure 2:
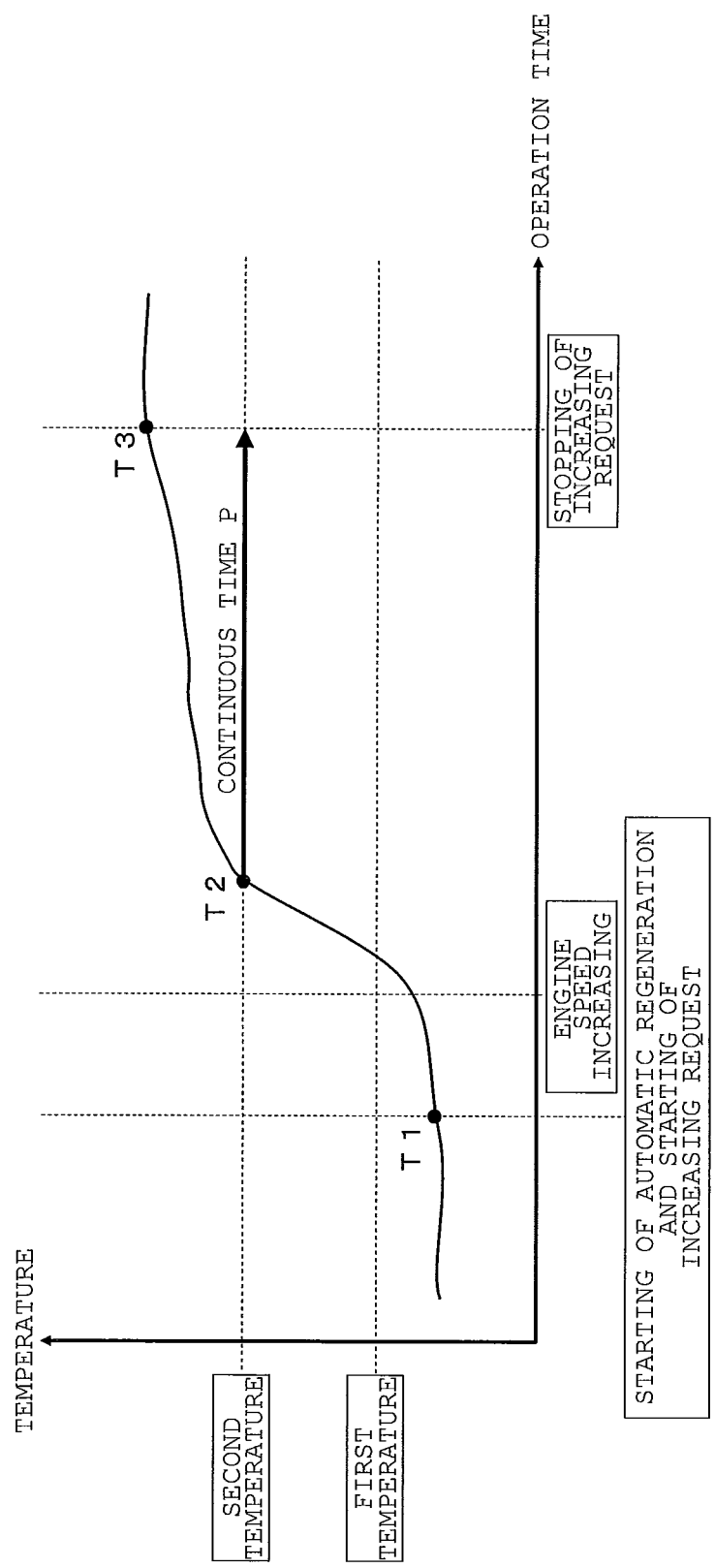
FIG. 2 is a graph showing one example of a temporal change of an exhaust gas temperature with respect to an operation time in a first embodiment of the present invention.

FIG. 2 is a graph showing one example of the temperature change of the exhaust gas with respect to an operation time of the backhoe 1, that is, the temporal change of the exhaust gas temperature (the exhaust temperature). Using FIG. 2, the regeneration operation of the DPF 41 performed by the filter regeneration means 147 will be explained in detail.

When the diesel engine 9 of the backhoe 1 starts, the deposition amount obtaining means 150 continuously calculates and obtains the PM deposition amount of the DPF 41. Firstly, when the deposition amount obtaining means 150 calculates the PM deposition amount, the filter regeneration control means 160 compares the calculated PM deposition amount with the threshold value TH.

As the result of the comparison, when the calculated PM deposition amount is less than the threshold value TH, the filter regeneration control means 160 judges that the regeneration of the DPF 41 is not required, and accordingly not performing the first regeneration control mode and the second regeneration control mode (not starting the regeneration of the DPF 41).

On the contrary, when the calculated PM deposition amount is the threshold value TH or more, that is, at the time T1 in the graph of FIG. 2, the filter regeneration control means 160 judges that the regeneration of the DPF 41 is required, and accordingly performing the first regeneration control mode firstly (starting the regeneration of the DPF 41).

The filter regeneration control means 160 outputs a command to start the automatic regeneration to the engine ECU 32 and the like to performing the regeneration of the DPF 41 by performing the first regeneration control mode. As the operation of the automatic regeneration, the intake throttle of the diesel engine 9 is closed, for example, and the exhaust temperature is increased due to the closing of the intake throttle, as described above. The filter regeneration control means 160 starts the automatic regeneration of the DPF 41 in this manner, and thereby combusting and removing the particulate matter deposited in the DPF 41.

As shown in the display mode X of FIG. 3, the filter regeneration control means 160 further displays, to the display device 11, the icon A showing that the automatic regeneration is performed, and emits the sequential warning sound.

As described above, the automatic regeneration is a regeneration operation that does not require a particular operation to the operator operating the backhoe 1, and is an operation that increases the temperature of the DPF 41 to try to combust the deposited particulate matter automatically by the backhoe 1 itself, that is, from the operator's viewpoint.

Next, when the temperature indicator related to the diesel engine 9 is less than a first temperature after the starting of the automatic regeneration, the filter regeneration control means 160 performs the second regeneration control mode. Here, the temperature indicator is a temperature able to evaluate a combustion state related whether the particulate matter is combusted in the regeneration of the DPF 41 or not, and is the intake temperature, the exhaust temperature, the coolant water temperature, and the like of the diesel engine 9.

For example, in a case where the temperature indicator is the exhaust temperature of the diesel engine 9, when the exhaust temperature is in a high state, it can be considered that the particulate matter deposited in the DPF 41 is easily combusted and accordingly that the regeneration of the DPF 41 due to the automatic regeneration easily progresses. On the contrary, when the exhaust temperature is in a low state, it can be considered that the particulate matter deposited in the DPF 41 is hard to be combusted and accordingly that the regeneration of the DPF 41 due to the automatic regeneration is hard to progress.

In the present invention, a degree of the combustion of the particulate matter deposited in the DPF 41 (ease of the progress of regeneration of the DPF 41) is evaluated by the temperature indicator such as the exhaust temperature of the diesel engine 9. That is, when the exhaust temperature is in a temperature range (less than the first temperature) at which the regeneration of the DPF 41 is hard to progress, the second regeneration control mode is performed to help and promote the automatic regeneration of the DPF 41. Accordingly, since the temperature indicator is used for evaluating the ease of progress of the regeneration of the DPF 41, the numerical value of the first temperature is varied on the basis of the employed temperature indicator. As described above, In the case where the temperature indicator is the exhaust temperature of the diesel engine 9, the first temperature is, for example, 250° C., and in the case where the temperature indicator is the coolant water temperature, the first temperature, for example, 70° C.

The first temperature is a value serving as a standard for judging whether or not the regeneration of the DPF 41 due to the automatic regeneration progresses efficiently, and it is preferable to be set in consideration of the temperature increasing due to the second regeneration control mode described later. For example, the first temperature is set to be 50% or less of a target value of the exhaust temperature of the diesel engine 9 in the regeneration of the DPF 41. In the present embodiment, the target value of the exhaust temperature is set to 580° C. or more in the regeneration of the DPF 41, and the first temperature is set to 250° C. that is approximately 43% of the target value.

Next, the second regeneration control mode for helping and promoting the automatic regeneration of the DPF 41 will be explained, exemplifying the case where the exhaust temperature of the diesel engine 9 is employed as the temperature indicator.

In the second regeneration control mode, a warning that requires the increasing of the speed of the diesel engine 9 is issued in a period when the automatic regeneration due to the first regeneration control mode is performed.

Specifically, as shown in the display mode Y of FIG. 3, the filter regeneration control means 160 displays the icon B requiring the increasing of the engine speed alternately with the icon A on the display device 11, and emits the intermittent warning sound. In a case where the operator performs the accelerating operation in accordance with the display and the warning sound to increase the engine speed to a predetermined speed or more (a speed higher than the idling engine speed, for example, 1800 rpm or more), the exhaust temperature is further increased, the combustion of the particulate matter deposited in the DPF 41 is promoted, and thus the PM deposition amount is decreased.

Here, when the exhaust temperature is smoothly increased, and becomes the second temperature (for example, 580° C.) or more higher than the first temperature (250° C.) serving as a standard for determining whether or not to perform the second regeneration control mode, and continues to be the second temperature or more for a predetermined time, i.e., a continuous time P (for example, 10 minutes), that is, when the exhaust temperature is continuously the second temperature or more from the time T2 to the time T3 in the graph of FIG. 2, the filter regeneration control means 160 determines that the particulate matter deposited in the DPF 41 is combusted and decreased, stops the second regeneration control mode, that is, the requirement for the increasing of speed of the diesel engine 9, and terminates the display of the icon B on the display device 11.

Here, as described above, the second temperature is a target value of the exhaust temperature in the regeneration of the DPF 41, and is a temperature at which the particular matter deposited in the DPF 41 can be supposed to be almost certainly combusted. That is, when the exhaust temperature is maintained to the second temperature or more, the particulate matter deposited in the DPF 41 is supposed to be certainly combusted and decreased, and accordingly, in the case where the exhaust temperature is continuously in the state higher than the second temperature or more, the second regeneration control mode for helping and promoting the automatic regeneration of the DPF 41 is stopped. Meanwhile, if the time (the continuous time) P for which the exhaust temperature is the second temperature or more is long, a large amount of the particulate matter is supposed to be combusted, and if the continuous time of the second temperature is short, the amount of the combusted particular matter is supposed to be small, and accordingly the amount of the particulate matter combusted during the continuous time of the second temperature is varied. Because of this, in the present invention, the combusted amount of the particulate matter is calculated on the basis of the continuous time of the second temperature or more.

When the exhaust temperature exceeds 500° C. and reaches approximately 580° C., the amount of particulate matter combusted per minute is almost stabilized to be a constant value. Accordingly, it can be said that the predetermined continuous time P of the second temperature is a time when the particulate matter deposited in the DPF 41 is stably combusted at a constant rate per time.

For this reason, in the present embodiment, for example, when the second temperature (580° C.) is maintained for the predetermined continuous time P (10 minutes), the filter regeneration control means 160 judges that approximately 80% of the particulate matter deposited in the DPF 41 is decreased.

Here, even when the second regeneration control mode is finished, the filter regeneration control means 160 does not necessarily finish the first regeneration control mode immediately. It is judged on the basis of the PM deposition amount as the standard whether the first regeneration control mode is performed or finished. Thus, immediately after the second regeneration control mode is finished, the filter regeneration control means 160 terminates the display of the icon B on the display device 11, and returns to the display of only the icon A as the display mode X of FIG. 3.

After that, when the temperature indicator related to the diesel engine 9 becomes less than the first temperature during a period when the automatic regeneration due to the first regeneration control mode is performed, the filter regeneration control means 160 performs the second regeneration control mode again.

Meanwhile, as described above, it is better to employ, as the temperature indicator, any one of the intake temperature, the exhaust temperature, and the coolant water temperature of the diesel engine 9.

For example, in the case where the exhaust temperature is chosen as the temperature indicator, it is required to set only one standard temperature (for example, 250° C.) with respect to the exhaust temperature; however, in a case where two or more temperatures, for example, the exhaust temperature and the coolant water temperature are chosen, a standard temperature to the exhaust temperature and a standard to the coolant water temperature (for example, 70° C.) are set respectively. And additionally, when both of the exhaust temperature and the coolant water temperature are less than the standard temperatures set to each of the temperatures, the second regeneration control mode may be performed. In addition, when any one of the exhaust temperature and the coolant water temperature is less than the standard temperature, the second regeneration control mode may be performed.

Referring to FIG. 2 and FIG. 3, the "Regenerating operation of DPF" due to the filter regeneration means 147 will be summarized.

When the operator starts the diesel engine 9 of the backhoe 1, the deposition amount obtaining means 150 of the filter regeneration means 147 obtains, from the engine ECU 32, the information such as the differential pressure of the exhaust gas cleaning device 31, the exhaust temperature, the coolant water temperature, the oxygen concentration and temperature of the intake air, the fuel injection amount, and the like, and calculates and obtains the deposition amount (the PM deposition amount) of the particulate matter deposited in the DPF 41.

When the backhoe 1 continues the operation in a low load for a long time, the PM deposition amount calculated by the deposition amount obtaining means 150 is increased as time passes, and thus becomes the threshold value TH or more at the time T1 in the graph of FIG. 2 showing the temporal change of the exhaust gas temperature. On this occasion, the filter regeneration control means 160 judges that the DPF 41 needs to be regenerated, and firstly performs the first regeneration control mode to start the automatic regeneration of the DPF 41.

Since the operator does not notice the start of the automatic regeneration, the filter regeneration control means 160 displays the icon A shown in the display mode X of FIG. 3 on the display device 11, and emits the sequential warning sound, thereby informing the operator that the automatic regeneration is presently performed.

On this occasion, the filter regeneration control means 160 compares the exhaust temperature, one of the temperature indicators related to the diesel engine 9, with the first temperature. When the exhaust temperature is less than the first temperature, the filter regeneration control means 160 performs the second regeneration control mode, in order to further increase the exhaust temperature to help and promote the automatic regeneration of the DPF 41.

As shown in the display mode Y of FIG. 3, by performing the second regeneration control mode, the filter regeneration control means 160 makes the display device 11 display the icon B requiring the increasing of the speeds alternately with the icon A, and also makes the display device 11 emits a different warning sound from the warning emitted when the icon A is displayed in the first regeneration control mode. The operator recognizes due to the display of the icon B and the warning sound that the speed of the diesel engine 9 needs to be increased, and increases the speed of the engine by operating the accelerator lever at arbitrary timing such as an interval of the working.

On this occasion, the filter regeneration control means 160 continuously or intermittently judges whether or not the exhaust temperature obtained by the deposition amount obtaining means 150 becomes the second temperature or more. As shown in FIG. 2, when the engine speed is increased, the exhaust temperature starts to be increased in accordance with the increasing, and when the exhaust temperature becomes the second temperature or more at the time T2, the filter regeneration control means 160 starts to count the continuous time P when the exhaust temperature is continuously the second temperature or more.

That is, the filter regeneration control means 160 performs both of the judgment regarding whether or not the exhaust temperature becomes the second temperature or more at the time T2 and of the counting of the continuous time P. Even in the case where the exhaust temperature becomes the second temperature or more once and the counting of the continuous time P is started, if the exhaust temperature becomes less than the second temperature, the counting of the continuous time P is stopped, and the continuous time P is reset by being returned to zero. If the exhaust temperature becomes the second temperature or more again, the counting of the continuous time P is started again.

when the continuous time P counted in this manner becomes, for example, 10 minutes, that is, at the time T3 in FIG. 2, the filter regeneration control means 160 stops the second regeneration control mode, and stops the display of the icon B on the display device 11 and the warning sound (stops the increasing requirement). In this manner, the display device 11 returns to the state of continuously displaying the icon A showing the display mode X of FIG. 3, emits only the warning sound related to the icon A, and accordingly the operator judges that it is not required to increase the engine speed and puts the acceleration lever back to the idling position.

After that, when the PM deposition amount calculated by the deposition amount obtaining means 150 becomes less than the predetermined value, the filter regeneration control means 160 stops the automatic regeneration according to the first regeneration control mode. However, when the temperature indicator related to the diesel engine 9 falls below the first temperature in the period when the automatic regeneration according to the first regeneration control mode is performed, the filter regeneration control means 160 performs the second regeneration control mode again.

In the present embodiment, it has been explained that at least one of three temperatures, the intake temperature, the exhaust temperature, and the coolant water temperature of the diesel engine 9 is employed as the temperature indicator related to the diesel engine 9. As described above, these temperature are continuously obtained by the deposition amount obtaining means 150 (the engine ECU and the like), and are the temperature indicators directly related to the calculation of the PM deposition amount. Accordingly, using the above-mentioned related temperature indicators, the increasing of speed of the diesel engine can be easily and accurately required and stopped at appropriate timing in synchronization with the increasing and decreasing of the PM deposition amount only by monitoring the temporal changes of the temperature indicators.

According to the present embodiment, since the increasing of the engine speed is promoted by emitting the warning to the operator, the operator noticing the warning can increase the exhaust temperature by arbitrarily increasing the speed of the diesel engine 9 even in the working. As a result of the increase of the exhaust temperature, the temperature of the DPF 41 increased by the automatic regeneration such as the closing of the intake throttle is further increased, and thus the particulate matter deposited in the DPF 41 is combusted. As described above, according to the present embodiment, since the operator can be demanded to perform the operation for helping (backing up) the automatic regeneration (the increasing of the engine speed), the decreasing of the PM deposition amount can be promoted, and the regeneration of the DPF 41 can be efficiently performed.

In addition, since the operator can perform the increasing of the engine speed, that is, the back-up operation of the automatic regeneration due to the acceleration operation even in the working such as the traveling of the backhoe 1 and the operating of the operation lever, it is not required only for the regeneration of the DPF 41 to stop the backhoe 1 to interrupt the working as in the conventional way.

For example, there is a case of making the backhoe 1 travel in order to move in a work place and to evacuate from the work place. In that case, the operator operates the operation level provided around the operator's seat 10 to make the backhoe 1 travel. Since such traveling is often performed intermittently and repeatedly in the working, the engine speed is increased to increase the exhaust temperature by manually performing the accelerating operation at arbitrary timing of the operator in an idle time, that is, an interval between the repeated traveling.

In addition, the operator moves the working device by operating other operation lever than the lever used for the traveling of the backhoe 1 in the work place, and performs, for example, the excavation operation. Normally, since the working performed in the work place includes a plurality of sequential working units, the operator manually performs the accelerating operation at arbitrary timing in the idle time between the finishing of one working unit and the starting of the next working unit, and can increase the engine speed to increase the exhaust temperature.

In addition, the diesel engine 9 of the backhoe 1, different from a vehicle (an automobile) such as a passenger car and an autotrack, generally supply a motive force to the various devices, for example, the hydraulic motor, the hydraulic pump, and the like mounted on the backhoe 1, and accordingly the engine speed can be increased even in the working and traveling. Consequently, the operator can increase the engine speed not only the interval between the working and the traveling but also at arbitrary timing.

That is, according to the present embodiment, since the necessity of increasing the engine speed to further promote the regeneration of the DPF 41 is informed by the warning, the operator can increase the engine speed arbitrarily by the accelerating operation without interrupting the traveling and working to increase the exhaust temperature. In this manner, a problem that the engine speed has to be increased after the backhoe 1 is stopped at a safe place only to regenerate the DPF 41 as in the conventional way and the traveling and working cannot be performed during the regeneration does not occur.

In addition, according to the present embodiment, when the exhaust temperature is less than the first temperature after the PM deposition amount becomes the threshold value or more and the automatic regeneration is started, the increasing of the engine speed is required to promote the combustion of the DPF 41 due to the automatic regeneration. In addition to this, when the exhaust temperature maintains the second temperature or more for the predetermined continuous time P, the requiring of the engine speed increasing is stopped. In this manner, the increasing of the engine speed at inadequate timing can be avoided, and consequently deterioration of the fuel consumption according to the increasing of the engine speed can be prevented.

(Second Embodiment)

In a second embodiment, a judgment standard of the starting and stopping of the second regeneration control mode by the filter regeneration control means 160 is different from the standard of the above-described first embodiment.

The filter regeneration control means 160 according to the present embodiment judges the starting and stopping of the second regeneration control mode on the basis of the PM deposition amount calculated by the deposition amount obtaining means 150. Since the configurations and effects other than this point is almost the same with those of the first embodiment, only the different points from those of the first embodiment will be explained, referring to FIG. 4.

In the first embodiment, the filter regeneration control means 160 starts and stops the second regeneration control mode on the basis of the exhaust temperature as the standard; however, the filter regeneration control means 160 according to the present embodiment starts and stops the second regeneration control mode on the basis of the PM deposition amount as the standard.

At first, when the diesel engine 9 starts, the filter regeneration control means 160 continuously or intermittently obtains the PM deposition amount from the deposition amount obtaining means 150, and compares the obtained PM deposition amount with the second deposition amount. When the PM deposition amount becomes the second deposition amount or more, the filter regeneration control means 160 starts the first regeneration control mode.

Figure 4:
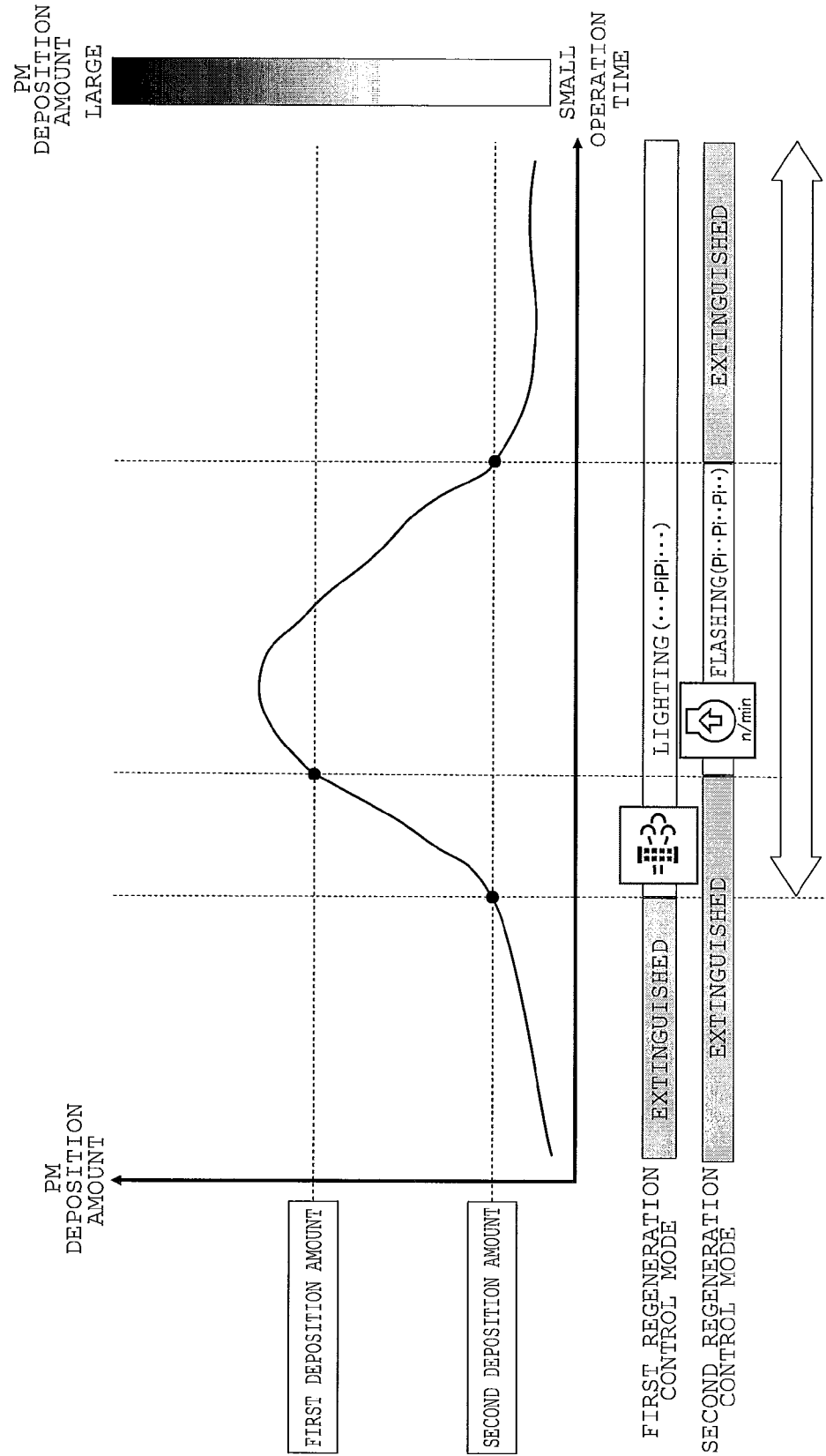
FIG. 4 is a graph showing one example of change of a deposition amount of particulate matter (a PM deposition amount) with respect to the operation time in a second embodiment of the present invention.

Even after the first regeneration control mode starts, the PM deposition amount calculated by the deposition amount obtaining means 150 is increased as time passes under a state where the working in a low load by the backhoe 1 continues for a long time and the exhaust temperature is not increased, and as shown in a graph of FIG. 4, the PM deposition amount sometimes becomes the first deposition amount or more larger than the second deposition amount. That is, there is a case where the PM deposition amount is not decreased so much by the automatic regeneration of the first regeneration control mode but is increased to the first deposition amount or mode. The first deposition amount is a value set to, for example, an approximately 60% to 70% of the maximum amount of the particulate matter that the DPF 41 is able to catch. The state where the PM deposition amount exceeds the first deposition amount is a step at which the PM deposition amount has to be decreased as soon as possible by improving the efficiency of the automatic regeneration due to the first regeneration control mode. For this reason, when the PM deposition amount becomes the first deposition amount or more, the second regeneration control mode is performed to help and promote the automatic regeneration of the DPF 41.

In the case where the operator performs the accelerating operation in accordance with the display and the warning sound of the display device 11 due to the second regeneration control mode to increase the engine speed to a predetermined speed or more, the exhaust temperature is further increased, and the combustion of the particulate matter deposited in the DPF 41 is promoted to decrease the PM deposition amount.

Here, when the PM deposition amount is smoothly decreased and becomes less than the second deposition amount that is a standard regarding whether or not to perform the first regeneration control mode, specifically, at a step where the particular matter is smoothly combusted due to the automatic regeneration and thus the PM deposition amount becomes small (less than the second deposition amount), the filter regeneration control means 160 finishes the second regeneration control mode.

According to the present embodiment, the increase of the engine speed is required on the basis of the PM deposition amount to promote the combustion of the DPF 41 due to the automatic regeneration. And, the requiring of engine speed increasing is appropriately stopped at timing when the automatic regeneration progresses and the PM deposition amount is certainly decreased. In this manner, the increasing of the engine speed can be required only for an appropriate period where the PM deposition amount is decreased to be a predetermined value, the useless increasing of the engine speed can be eliminated, and the fuel consumption due to the automatic regeneration can be suppressed.

Meanwhile, it should be considered that the embodiments disclosed herein this time are exemplification in all points and is not restrictive. The scope of the present invention is shown by not the above-described explanation but the claims, and intends to include all the modification in an equivalent means and range to the claims.

Additionally, the automatic regeneration in the above-mentioned embodiments is explained by employing the "closing of the intake throttle" as an example; however, the automatic regeneration is not limited to the "closing of the intake throttle", and the regeneration of the DPF due to a post injection of fuel may be included in the automatic regeneration. The post injection is an operation for promoting the temperature increasing of the DPF 41 by injecting a fuel to the combusted gas.

Moreover, in the automatic regeneration performed in each of the regeneration control mode, the performance of the "closing of the intake throttle" and the performance of the "post injection" may be combined arbitrarily. For example, the first regeneration control mode performs the closing of the intake throttle, and after that, in the second regeneration control mode 52, the post injection may be started in addition to the closing of intake throttle after the water temperature or the exhaust temperature is sufficiently increased.

Furthermore, in each of the above-described embodiments, the automatic regeneration (the first regeneration control mode) is started with a trigger that the PM deposition amount becomes a predetermined deposition amount or more, however, the trigger to start the automatic regeneration does not necessarily employ the PM deposition amount as the standard. For example, the difference between the inlet side and outlet side of the DPF 41 (or the exhaust gas cleaning device 31), that is, the differential pressure detected by the differential pressure sensor 44 may be employed as the standard. When the differential pressure detected by the differential pressure sensor 44, it can be considered as described above that the PM deposition amount in the DPF 41 becomes a predetermined deposition amount or more, and accordingly the differential pressure detected by the differential pressure sensor 44 can be employed as the trigger to start the automatic regeneration.

Similarly, in the second embodiment, the operation (the second regeneration control mode) for emitting the warning that requires the operator to increase the speed of the diesel engine 9 may be started by employing not the PM deposition amount but the difference (the differential pressure) between the inlet side and outlet side of the DPF 41 (or the exhaust gas cleaning device 31) as the standard.

In the second embodiment, even in the case where the difference (the differential pressure) between the inlet side and outlet side of the DPF 41 (or the exhaust gas cleaning device 31) is employed as the trigger to start the automatic regeneration (the first regeneration control mode), the second regeneration control mode is started after the first regeneration control mode is started in the same manner with the case of employing the PM deposition amount. On this occasion, the temperature indicator at which the first regeneration control mode is started is often a value of the temperature indicator or less at which the second regeneration control mode is started.

In addition, the regeneration control of the DPF 41 according to the invention can be also applied to the working construction machine and agricultural machine such as the Compact Track Loader (CTL) and the tractor other than the backhoe 1.

(Third Embodiment)

A third embodiment of the present invention will be explained below.

The backhoe 1 according to the present embodiment has the same configuration with that of the backhoe 1 shown in FIG. 23 explained in the first embodiment. In addition, the display device 11 shown in FIG. 6 has the same configuration with that of the display device 11 according to the first embodiment. Moreover, a configuration of the diesel engine 9 and a configuration of the exhaust system of the diesel engine 9 each shown in FIG. 5 are the same with those of the diesel engine 9 according to the first embodiment and of the exhaust system.

Figure 5:
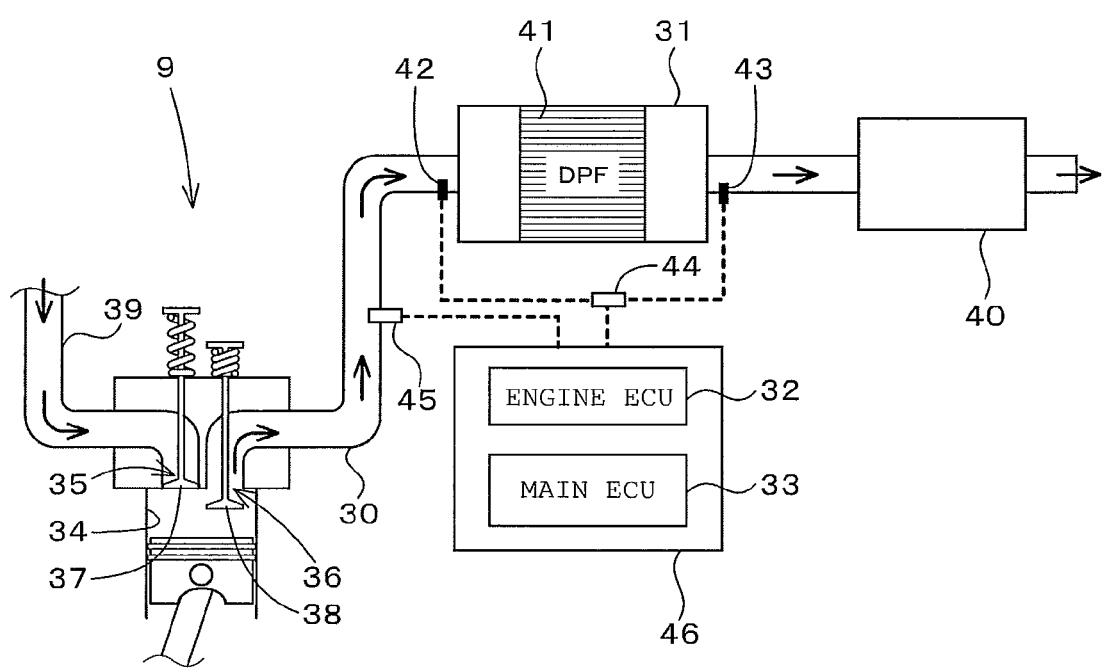
FIG. 5 is a diagram showing a configuration of the exhaust gas cleaning device provided to the exhaust system of the diesel engine included in the backhoe according to the embodiments of the present invention.

As shown in FIG. 5, to the exhaust manifold 30 connecting the diesel engine 9 to the exhaust gas cleaning device 31, an exhaust temperature sensor 45 for detecting a temperature of the combustion gas exhausted from the diesel engine 9 toward the exhaust gas cleaning device 31 (the exhaust temperature) is provided. The exhaust temperature sensor 45 is composed of, for example, a thermistor. The above-described differential pressure detected by the differential pressure sensor 44 and the exhaust temperature detected by the exhaust temperature sensor 45 are sent to the control part 46.

The control part 46 controls the backhoe 1, is composed of the plurality of control devices (the ECUs), and, for example, has the engine ECU 32 for controlling the diesel engine 9 and the main ECU 33 for controlling the entire operation of the backhoe 1. The engine ECU 32 and the main ECU 33 are, for example, composed of CPUs.

The engine ECU 32 obtains information from sensors arranged in some places of the diesel engine 9 and a power transmission system, calculates a suitable fuel injection amount and injection timing, ignition timing, an idling engine speed, and the like according to a state of the diesel engine 9, and outputs a control command to the diesel engine 9 and the like. For example, when an accelerator provided around the operator's seat 10 is operated (by performing an accelerating operation), the engine ECU detects an operation amount (an opening degree) of the accelerator to increase and decrease the fuel injection amount. In this manner, the speed of the diesel engine 9 can be increased and decreased.

As an sensor supplying the information to the engine ECU 32, an accelerator opening sensor for detecting an acceleration opening, the differential pressure sensor 44 for detecting the differential pressure of the exhaust gas cleaning device 31, the exhaust temperature sensor 45 for detecting the exhaust temperature, an air flow meter for detecting an intake air amount, a crank position sensor for detecting the engine speed, the water temperature sensor for detecting a water temperature of the coolant water, a throttle position sensor for detecting an opening of a valve, and the like are included. Other than these sensors, a cam position sensor for detecting a crank position, an oxygen concentration sensor for detecting an oxygen concentration of the intake air, and the like are included.

The main ECU 33 controls various types of device (the traveling device, the working device, and the like) provided to the backhoe 1 in combination with the engine ECU 32. For example, the main ECU 33 executes the flow rate control for supplying a predetermined operation oil to the respective cylinder such as the swing cylinder, the boom cylinder 18, the arm cylinder 19, the bucket cylinder 20, and the like.

The main ECU 33 also controls the entire operation of the backhoe 1 including the display device 11 displaying an operation state of the backhoe 1, for example, a meter and monitor provided around the operator's seat 10. The main ECU 33 in the present embodiment has a filter regeneration means 247 to regenerate the DPF 41 of the exhaust gas cleaning device 31. The filter regeneration means 247 is realized by a computer program executed by the main ECU 33.

Here, the display device 11, the engine ECU 32, and the main ECU 33 are connected each other via a vehicle communication network N such as the Controller Area network (CAN communication), and are able to mutually send and receive data. Meanwhile, if the vehicle communication network is able to send and receive the data between the display device 11, the engine ECU 32, and the main ECU 33, the standard of the network is not specifically limited. For example, the FlexRay and also other network may be employed.

Figure 6:
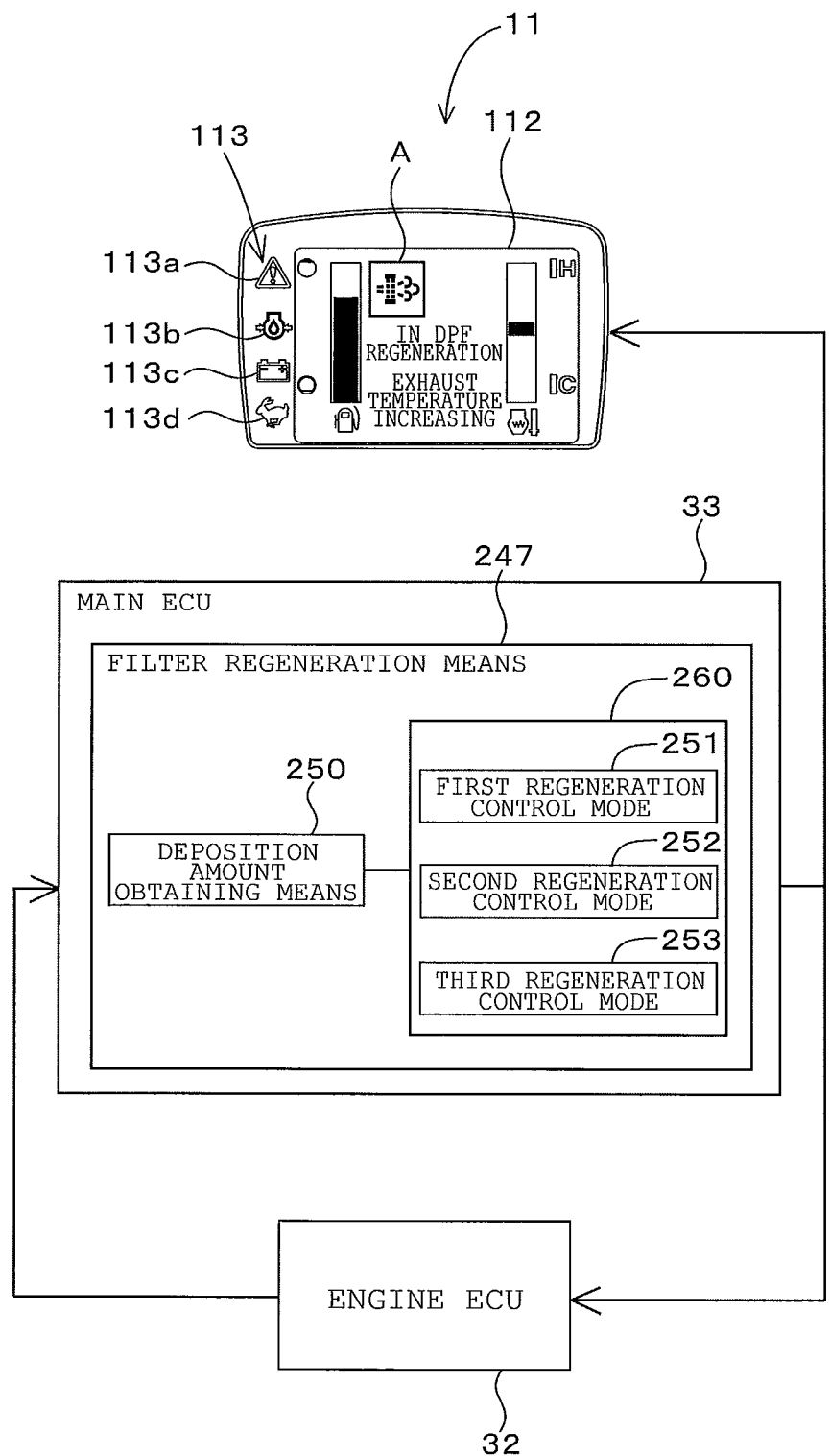
FIG. 6 is a block diagram showing schematic configurations of: a filter regeneration means of a main ECU, an engine ECU, and a display device in a third embodiment of the present invention.

FIG. 6 is a block diagram showing a configuration of the filter regeneration means 247. As shown in FIG. 6, the filter regeneration means 247 includes: a deposition amount obtaining means 250 to obtain the deposition amount (the PM deposition amount) of the particular matter deposited in the DPF 41; and a filter regeneration control means 60 to regenerated the DPF 41 on the basis of the PM deposition amount obtained by the deposition amount obtaining means 250.

The deposition amount obtaining means 250 obtains, from the engine ECU 32, the information such as: the differential pressure of the exhaust gas cleaning device 31 (the value detected by the differential pressure sensor 44), the exhaust temperature detected by the exhaust temperature sensor 45, the water temperature of the coolant water, the oxygen concentration of the intake air and the temperature, the injection amount of fuel, and the like, and then calculates and obtains the deposition amount of the particulate matter deposited in the DPF 41.

The filter regeneration control means 60 divides the regeneration operation to regenerate the DPF 41 into a plurality of modes to separately performs the modes in a stepwise fashion, and specifically performs the regeneration operation of three modes, a first regeneration control mode 251, a second regeneration control mode 252, and a third regeneration control mode 253. That is, the filter regeneration control means 60 determines the regeneration control mode, among the first regeneration control mode 251 to the third regeneration control mode 253, to be performed on the basis of the PM deposition amount obtained by the deposition amount obtaining means 250, and thereby regenerating the DPF 41 in each of the determined regeneration control modes.

For example, the filter regeneration control means 60 has four threshold values as predetermined values serving as a standard to determine the regeneration control mode on the basis of the PM deposition amount. The four threshold values are a warning clearing threshold value, a threshold value TH1 (a first deposition threshold value), a threshold value TH2 (a second deposition threshold value), and a threshold value TH3 (a third deposition threshold value), in ascending order. The four threshold values correspond to regeneration control levels related to contents of the regenerating operation of the DPF 41 to be performed. The filter regeneration control means 60 compares the PM deposition amount calculated by the depositing amount obtaining means 250 with the above-mentioned four threshold values, judges where is the present PM deposition amount between the threshold values, and determines the corresponding regeneration control level.

Figure 7:
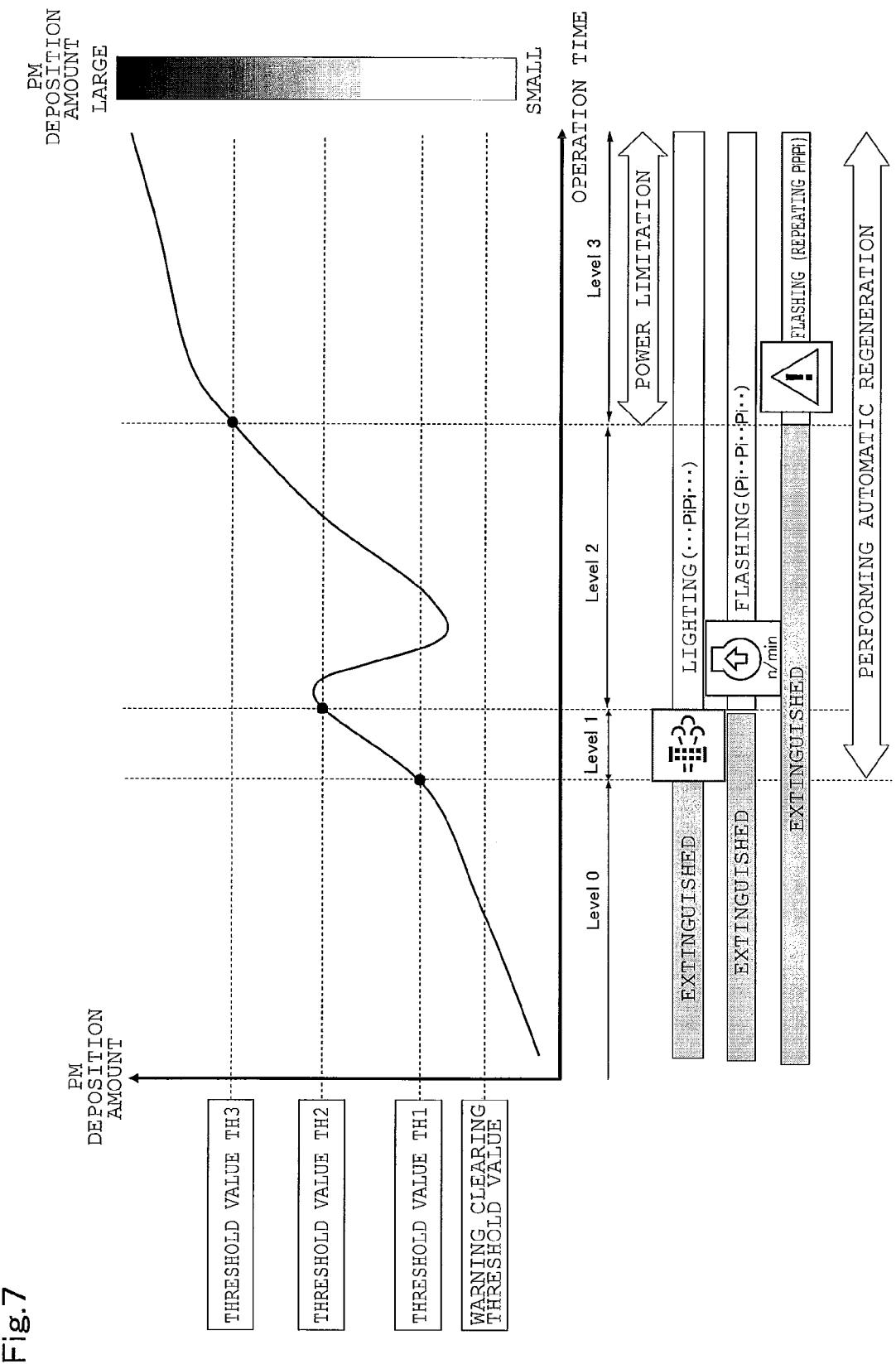
FIG. 7 is a graph showing one example of change of a deposition amount of particular matter (a PM deposition amount) with respect to a passage time in the third embodiment of the present invention.

FIG. 7 is a graph showing one example of the variation of the deposition amount (the PM deposition amount) of the particulate matter with respect to the elapsed time. Using FIG. 7, the regeneration of the DPF 41 will be explained in detail.

When the diesel engine 9 of the backhoe 1 is started, the deposition amount obtaining means 250 continuously calculates and obtains the PM deposition amount of the DPF41. In the graph of FIG. 7, the PM deposition amount is increased as an operation time of the diesel engine 9 is increased starting from the origin side.

At first, when the deposition amount obtaining means 250 calculates the PM deposition amount, the filter regeneration control means 60 compares the obtained PM deposition amount with four threshold values of the warning clearing threshold value, the threshold value TH1, the threshold value TH2, and the threshold value TH3.

When the PM deposition amount is less than the threshold value TH1, the filter regeneration control means 60 sets the regeneration control level to "Level 0", and judges in "Level 0" that the regeneration of the DPF 41 is not required and does not regenerate the DPF 41 (does not start the regeneration of the DPF 41).

Next, when the PM deposition amount becomes the threshold value TH1 or more and less than the threshold value TH2, the filter regeneration control means 60 changes (shifts) the regeneration control level from "Level 0" to "Level 1". The regeneration level, "Level 1" or more, shows that the PM deposition amount reaches a degree requiring the automatic regeneration of the DPF 41. In response to the regeneration control level becoming "Level 1", the filter regeneration control means 60 selects a first regeneration control mode 251 for performing the automatic regeneration of the DPF 41, outputs a command for the automatic regeneration in the first regeneration control mode 251 to the control part 46 and so on, and thus performs the regeneration of the DPF 41. As the operation of the automatic regeneration, the intake throttle of the diesel engine 9, for example, is closed, and the exhaust temperature is increased due to the closing of the intake throttle.

In the first regeneration control mode 251, in a case where the deposition amount of the particulate matter becomes the threshold value TH1 or more (the regeneration control level becomes "Level 1"), the automatic regeneration of the DPF41 is started, and thus the particulate matter deposited in the filter is combusted and removed.

Additionally, in the first regeneration control mode 251, the display device 11 displays the icon A showing that the automatic regeneration is performed, and emits the continuous warning sound.

As described above, the automatic regeneration is an automatic regeneration that does not require a specific operation to the operator operating the backhoe 1, and is an operation where the backhoe 1 independently, automatically if seen from the operator, tries to increase the temperature of the DPF 41 and to combust the deposited particulate matter.

Next, after the starting of the automatic regeneration, when the PM deposition amount becomes the threshold value TH2 or more and less than the threshold value TH3 while the first regeneration control mode 251 in "Level 1" is performed, the filter regeneration control means 60 changes (shifts) the regeneration control level from "Level 1" to "Level 2" to be shifted to the second regeneration control mode 252, in order to further efficiently perform the automatic regeneration of the DPF 41 by increasing the exhaust temperature.

In the second regeneration control mode 252, the warning that requires the increasing of the speed of the diesel engine 9 is emitted, continuously performing the automatic regeneration. Here, the increasing of speed of the engine 9 means that the speed of the engine is increased at least to the idling engine speed or more, and preferably the engine speed is increased to be twice as large as the idling engine speed.

Specifically, in the second regeneration control mode 252, the display device 11 displays the icon B to order the operator to increase the engine speed, for example, to 1800 rpm or more, on the display device 11 and emits the intermittent warning sound. In the case where the operator operates the accelerating operation in the second regeneration control mode 252, when the operator performs the accelerating operation in accordance with the display and with the warning sound to increase the engine speed to a predetermined speed or more (a speed higher than the idling engine speed, for example, 1800 rpm or more), the exhaust temperature is further increased, the combustion of the particular matter deposited in the DPF 41 is promoted to decrease the PM deposition amount. On this occasion, when the PM deposition amount falls below the warning clearing threshold value, the filter regeneration control means 60 returns the regeneration control level to "Level 0" and finishes: the automatic regeneration of the DPF 41; and the display of the icon A and icon B on the display device 11.

Meanwhile, in a case where the PM deposition amount is further increased and the PM deposition amount becomes the threshold value TH3 or more, for example, in a case where the engine speed is not increased, the filter regeneration control means 60 changes (shifts) the regeneration control level from "Level 2" to "Level 3", and shifts to a third regeneration control mode 253.

The third regeneration control mode 253 is a regeneration operation for ordering the diesel engine 9 to limit the output to be within a predetermined range in a case where the PM deposition amount becomes the threshold value TH3 or more higher than the threshold value TH2 at the step where the warning is emitted by the second regeneration control mode 252. In the third regeneration control mode 253, the output of the engine is limited, continuing the automatic regeneration.

In the third regeneration control mode 253, the filter regeneration control means 60 orders the engine ECU 32 to perform a power limitation for limiting the maximum output of the diesel engine 9 to a predetermined value or less (for example, 50% or less of the regulated maximum output), and makes the display device 11 display an icon to show that the PM deposition amount becomes too large and emit the continuous warning sound.

Also in "Level 3", the icon B that orders the increasing of the engine speed is displayed on the display device 11 in the same manner as that in "Level 2". When the operator increases the engine speed in accordance with the warning and thus the PM deposition amount falls below the warning clearing threshold value, the filter regeneration control means 60 returns the regeneration control level to "Level 0", and finishes the automatic regeneration of the DPF 41 and the display of each icon on the display 11.

As described above, in any of "Level 1" to "Level 3", when the PM deposition amount falls below the warning clearing threshold value, the deposition amount obtaining means 250 returns the regeneration control level to "Level 0", and finishes the automatic regeneration of the DPF 41 and the display of each icon on the display 11.

Figure 8:
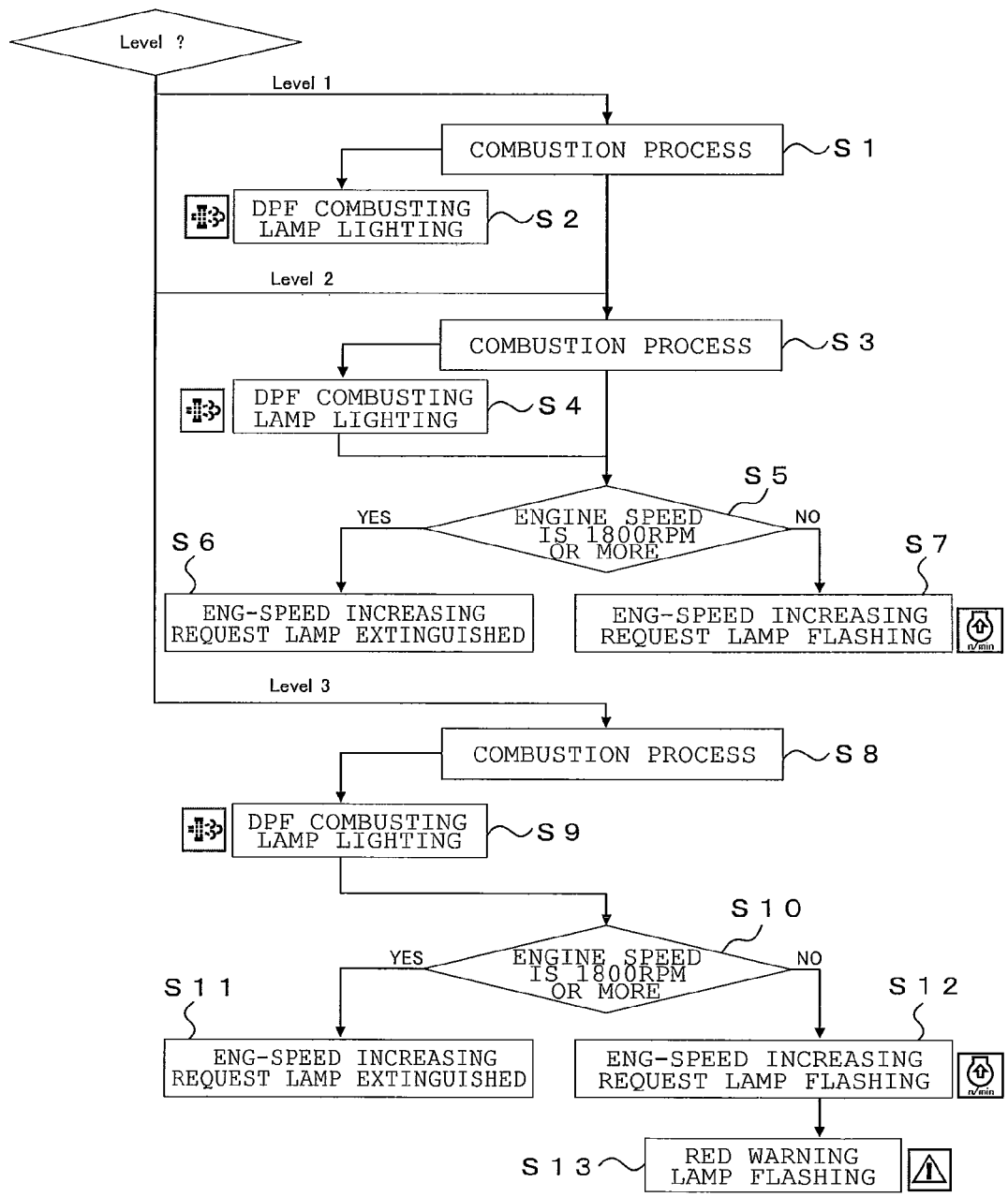
FIG. 8 is a flowchart showing an operation after a regeneration control level is determined by a deposition amount obtain means.
Figure 9:
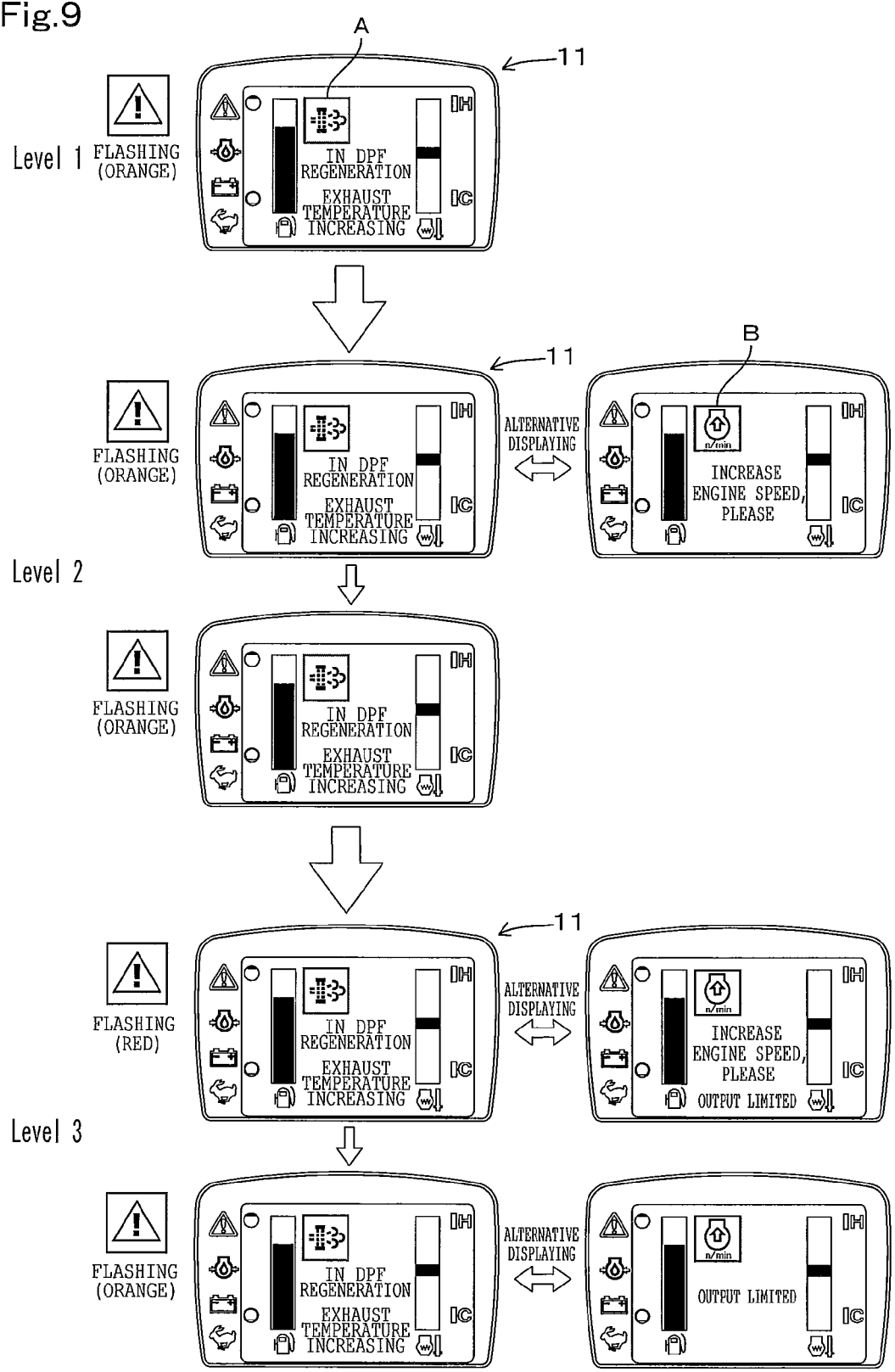
FIG. 9 is a diagram showing display modes of the display device in each of the regeneration control levels.

Referring to FIG. 8 and FIG. 9, the above-mentioned regeneration control of the DPF 41 will be further explained. FIG. 8 is a flow chart showing the operation after the regeneration control level is determined by the filter regeneration control means 60, and FIG. 9 is a diagram showing the display mode of the display device 11 in each of the regeneration control level.

In FIG. 8, when the regeneration control level is "level 1" (in the first regeneration control mode 251), the filter regeneration control means 60 make the engine ECU 32 perform the automatic regeneration as the combusting process (S1), and makes the display device 11 display, due to the main ECU 33, the icon (a DPF combusting lamp) A showing that the automatic regeneration is performed (S2).

As shown in FIG. 9, in the first regeneration control mode 251, the display device 11 displays the icon (the DPF combusting lamp) A and displays massages of "DPF regeneration in progress" and "Exhaust temperature increasing" on the liquid crystal panel 112 in accordance with the order issued by the filter regeneration control means 60. On this occasion, the display device 11 flashes, to be an orange color, the warning LED display part 113a provided in the uppermost portion of the LED display part 113.

Next, when the regeneration control level is "Level 2" (in the second regeneration control mode 252), the filter regeneration control means 60 orders the engine ECU 32 to continue the automatic regeneration as the combusting process (S3), and makes the display device 11 light due to the main ECU 33: the icon (the DPF combusting lamp) A showing that the automatic regeneration is performed; and the icon (an Engine-speed increasing requiring lamp) B to order the increasing of the engine speed (S4). Moreover, in the second regeneration control mode 252, the filter regeneration control means 60 judges whether or not the engine speed obtained from the engine ECU 32 is, for example, 1800 rpm (S5), and if 1800 rpm or more (S5: YES), the filter regeneration control means 60 orders the display device 11 to extinguish the Engine-speed increasing requiring lamp B (S6). In addition, if the engine speed is less than 1800 rpm (S5: NO), the filter regeneration control means 60 orders the display device 11 to flash the Engine-speed increasing requiring lamp B (S7).

As shown in FIG. 9, in the second regeneration control mode 252, the display device 11 alternately displays a screen displaying the DPF combusting lamp (icon) A and the Engine-speed increasing requiring lamp (icon) B on the liquid crystal panel 112 due to the second regeneration control mode 252. On this occasion, the display device 11 flashes the warning LED display part 113a, to be an orange color, provided in the uppermost portion of the LED display part 113.

When the operator increases the engine speed in accordance with the displayed order and the engine speed obtained from the engine ECU 32 is 1800 rpm or more, the filter regeneration control means 60 does not make the display device 11 display the screen displaying the Engine-speed increasing requiring lamp (icon) B and orders the display device 11 to display only the screen displaying the DPF combusting lamp (icon) A.

Sequentially, when the regeneration control level is "Level 3" (in the third regeneration control mode 253), the filter regeneration control means 60 orders the engine ECU 32 to continue the automatic regeneration as the combusting process (S8), and makes the display device 11 light: the icon (the DPF combusting lamp) A showing that the automatic regeneration is performed; and the icon (the Engine-speed increasing requiring lamp) B to order the increasing of the engine speed (S9). Moreover, in the third regeneration control mode 253, the filter regeneration control means 60 judges whether or not the engine speed obtained from the engine ECU 32 is, for example, 1800 rpm or more (S10), and if 1800 rpm or more (S10: YES), the filter regeneration control means 60 orders the display device 11 to extinguish the Engine-speed increasing requiring lamp B (S11). In addition, if the engine speed is less than 1800 rpm (510: NO), the filter regeneration control means 60 orders the display device 11 to flash the Engine-speed increasing requiring lamp B (S12), and orders the display device 11 to flash the warning LED display part 113a, to be a red color, provided in the uppermost portion of the LED display part 113 due to the main ECU 33(S13).

As shown in FIG. 9, the display device 11 in "Level 3" alternately displays the screen displaying the DPF combusting lamp (icon) A and the screen displaying the Engine-speed increasing requiring lamp (icon) B on the liquid crystal panel 112 in accordance with the order from the filter regeneration control means 60. Since the power limitation of the backhoe 1 is performed in "Level 3", a message "Output limitation in progress" is displayed in a lower portion of the screen displaying the Engine-speed increasing requiring lamp (icon) B. On this occasion, the display device 11 flashes the warning LED display part 113a, to be a red color, provided in the uppermost portion of the LED display part 113.

When the operator increases the engine speed in accordance with the displayed order and the engine speed obtained from the engine ECU 32 is 180 orpm or more, the filter regeneration control means 60 orders the display device 11 not to display a message "Increase the engine speed, please" in the screen displaying the Engine-speed increasing requiring lamp (icon) B. In this manner, in the case where the engine speed is 1800 rpm or more, the display device 11 alternately displays: the screen displaying the DPF combusting lamp (icon) A; and the screen displaying the Engine-speed increasing requiring lamp (icon) B without displaying the message "Increase the engine speed, please" on the liquid crystal panel 112 in accordance with the order from the filter regeneration control means 60. On this occasion, the display device 11 changes the flashing of the warning LED display part 113a, from the red color to the orange color, provided in the uppermost portion of the LED display part 113.

According to the present embodiment, since the increasing of the engine speed is promoted by emitting the warning to the operator, the operator noticing the warning can increase the exhaust temperature by arbitrarily increasing the speed of the diesel engine 9 even in the working. As a result of the increase of the exhaust temperature, the temperature of the DPF 41 increased by the automatic regeneration such as the closing of the intake throttle is further increased, and thus the particulate matter deposited in the DPF 41 is combusted. As described above, according to the present embodiment, since the operator can be demanded to perform the operation for backing up the automatic regeneration (the increasing of the engine speed), the decreasing of the PM deposition amount can be promoted, and the regeneration of the DPF 41 can be efficiently performed.

The above-mentioned increasing of the engine speed that is the back-up operation of the automatic regeneration is performed by the accelerating operation due to the operator, and accordingly it is not required to stop the backhoe 1 only for the regeneration of the DPF 41 to interrupt the working.

For example, there is a case of making the backhoe 1 travel in order to move in a work place and to evacuate from the work place. In that case, the operator operates the operation level provided around the operator's seat 10 to make the backhoe 1 travel. Since such traveling is often performed intermittently and repeatedly in the working, the engine speed is increased to increase the exhaust temperature by manually performing the accelerating operation at arbitrary timing of the operator in an idle time, that is, an interval between the repeated traveling.

In addition, the operator moves the working device by operating other operation lever than the lever used for the traveling of the backhoe 1 in the work place, and performs, for example, the excavation operation. Since the working performed in the work place includes the plurality of sequential working units, the operator can increase the engine speed in the same manner as in the traveling to increase the exhaust temperature by manually operating the accelerating operation at arbitrary timing in the idle time, that is, the interval from the finishing of one working unit until the starting of the next working unit.

In addition, according to the present embodiment, in the case where the regeneration of the DPF 41 is required to be further promoted even during the traveling and the working, the increasing of the engine speed is informed to the operator due to the warning firstly, and then the increasing of the engine speed can be arbitrarily performed by the accelerating operation. Accordingly, it is not required to stop the backhoe 1 only for the regeneration of the DPF 41 as in the conventional way, and the regeneration of the DPF 41 can be easily performed.

Moreover, according to the present embodiment, after the PM deposition amount becomes the threshold value TH1 or more to start the automatic regeneration, the necessity to increase the speed of the diesel engine 9 (whether or not to promote the operator to perform the regeneration of the DPF 41) is judged on the basis of the increasing tendency of the PM deposition amount (whether or not the threshold value TH2 or more). That is, only in the case where the PM deposition is further increased without obtaining a sufficient regeneration effect while the automatic regeneration is started (in the case of the threshold value TH2 or more), the necessity to increase the speed is informed to the operator with use of the warning.

Specifically, in the case where the regeneration effect is sufficient (less than the threshold value TH2), since the warning to increase the engine speed is not performed, unnecessary increasing of the engine speed can be avoided, and consequently the deterioration of the fuel consumption according to the increasing of the engine speed can be prevented.

In addition, according to the present embodiment, when the regeneration control level becomes "Level 3", the output (the power) of the diesel engine 9 is limited. This "Level 3" is a step where the present PM deposition is being increased with respect to the PM deposition amount able to be caught by the DPF 41; however, if the power limitation of the diesel engine 9 is performed at the step, the increased PM deposition amount can be decreased.

Accordingly, at the step where the power limitation of the diesel engine 9 is performed, the PM deposition amount is also decreased by the automatic regeneration (the decreasing by the combustion), and further the amount of the exhaust gas is suppressed due to the power limitation to suppress the increasing of the PM deposition amount, and consequently thereby suppressing the total increasing of the PM deposition amount based on both of: the decreasing of the PM deposition amount due to the combustion; and the decreasing of the PM deposition amount due to the suppression of the amount of the exhaust gas. Furthermore, since the power limitation of the diesel engine 9 is performed during the operation of the diesel engine 9, the working can be continued if a small-loaded working.

In the present embodiment, since the warning that promotes the increasing of the engine speed is continuously emitted even when the PM deposition amount becomes the threshold value TH3 or more, the operator can increase the speed of the diesel engine 9 to increase the exhaust temperature before the PM deposition amount becomes excessive.

(Fourth Embodiment)

In a fourth embodiment, a standard at which the regeneration control level is shifted from "Level 1" to "Level 2" is different from that of the above-mentioned third embodiment.

Figure 10:
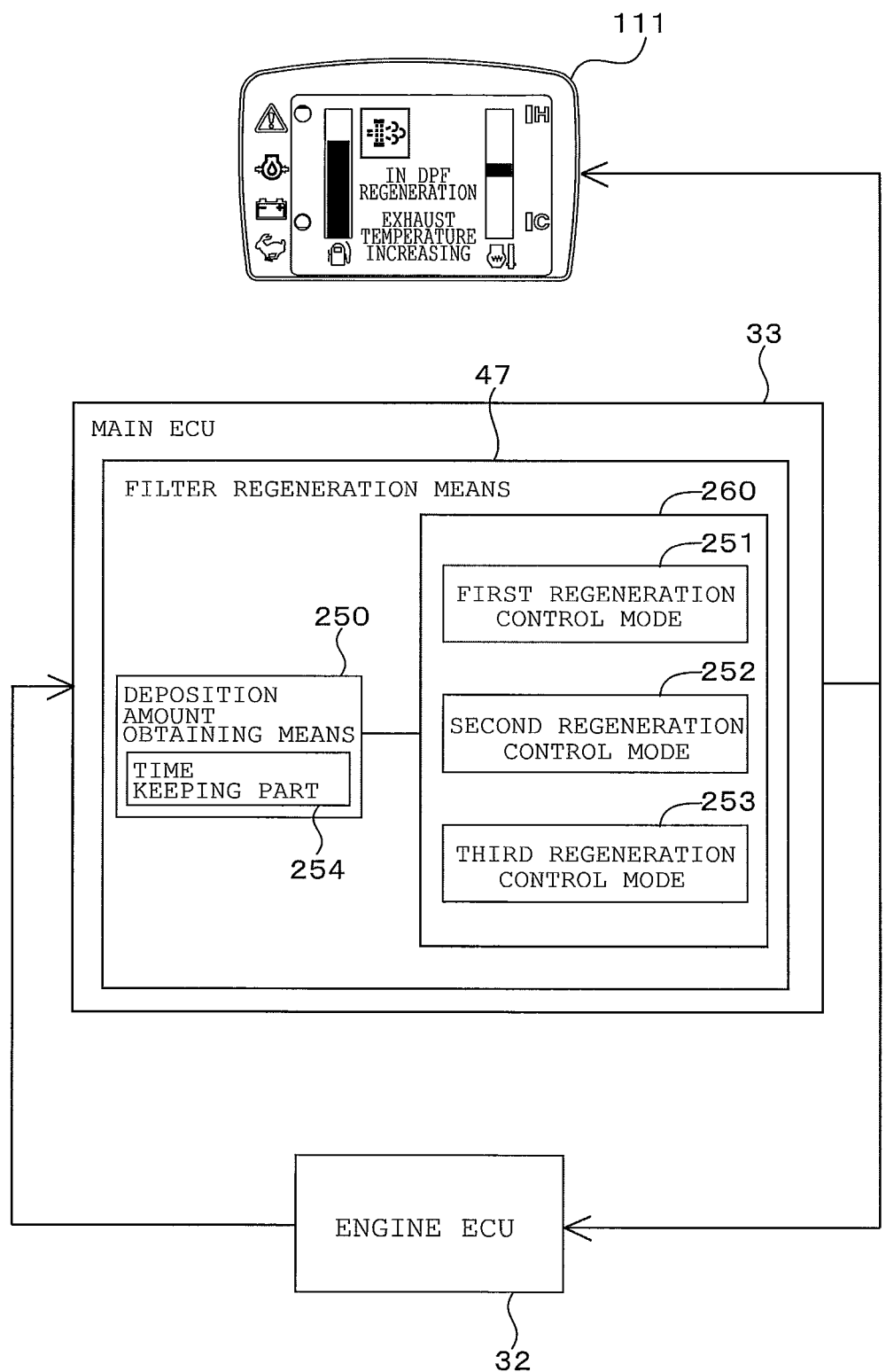
FIG. 10 is a block diagram showing schematic configurations of: a filter regeneration means of a main ECU, an engine ECU, and a display device in a fourth embodiment of the present invention.
Figure 11:
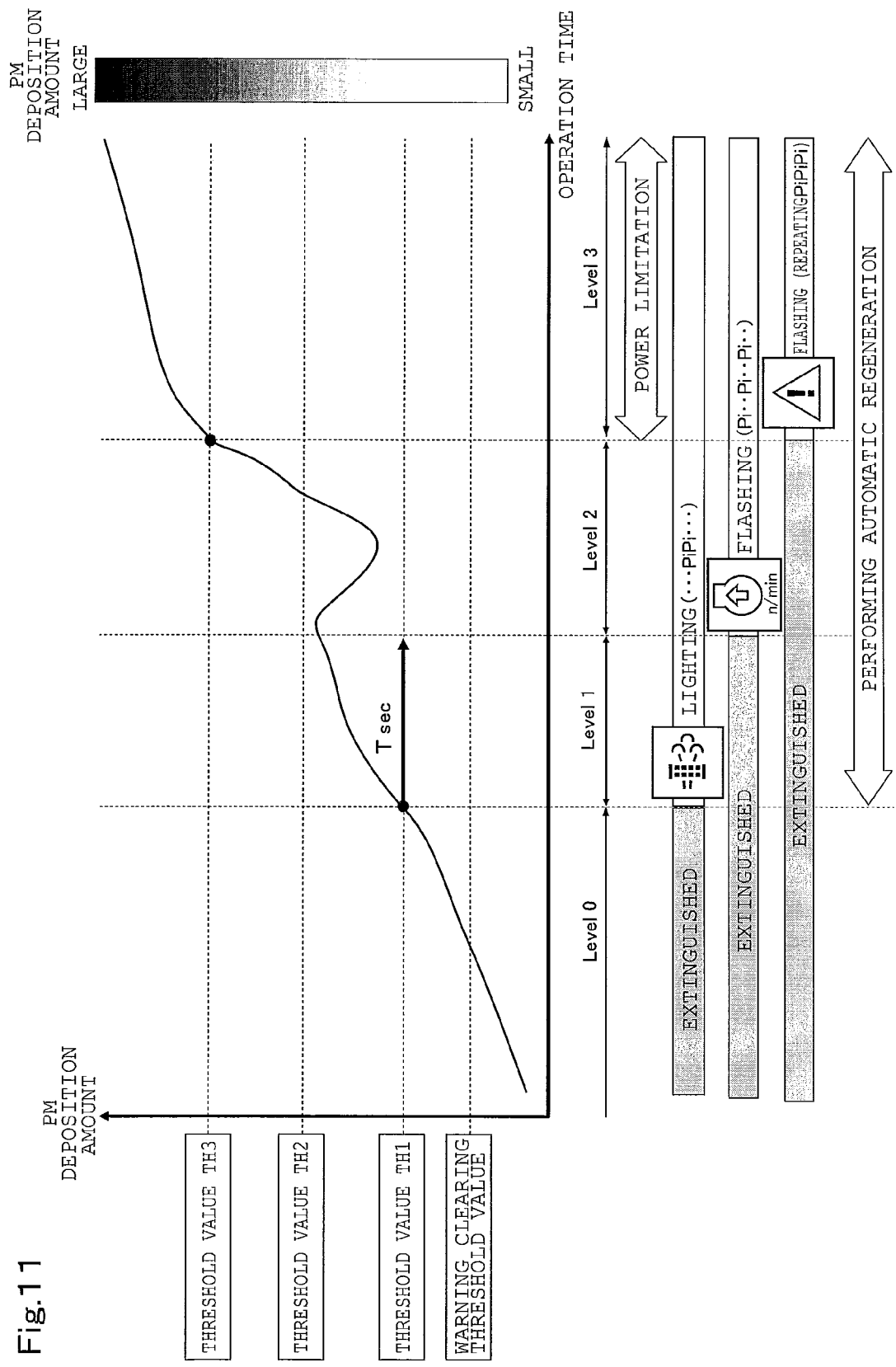
FIG. 11 is a graph showing one example of change of a deposition amount of particular matter (a PM deposition amount) with respect to a passage time in the fourth embodiment of the present invention.
Figure 12:
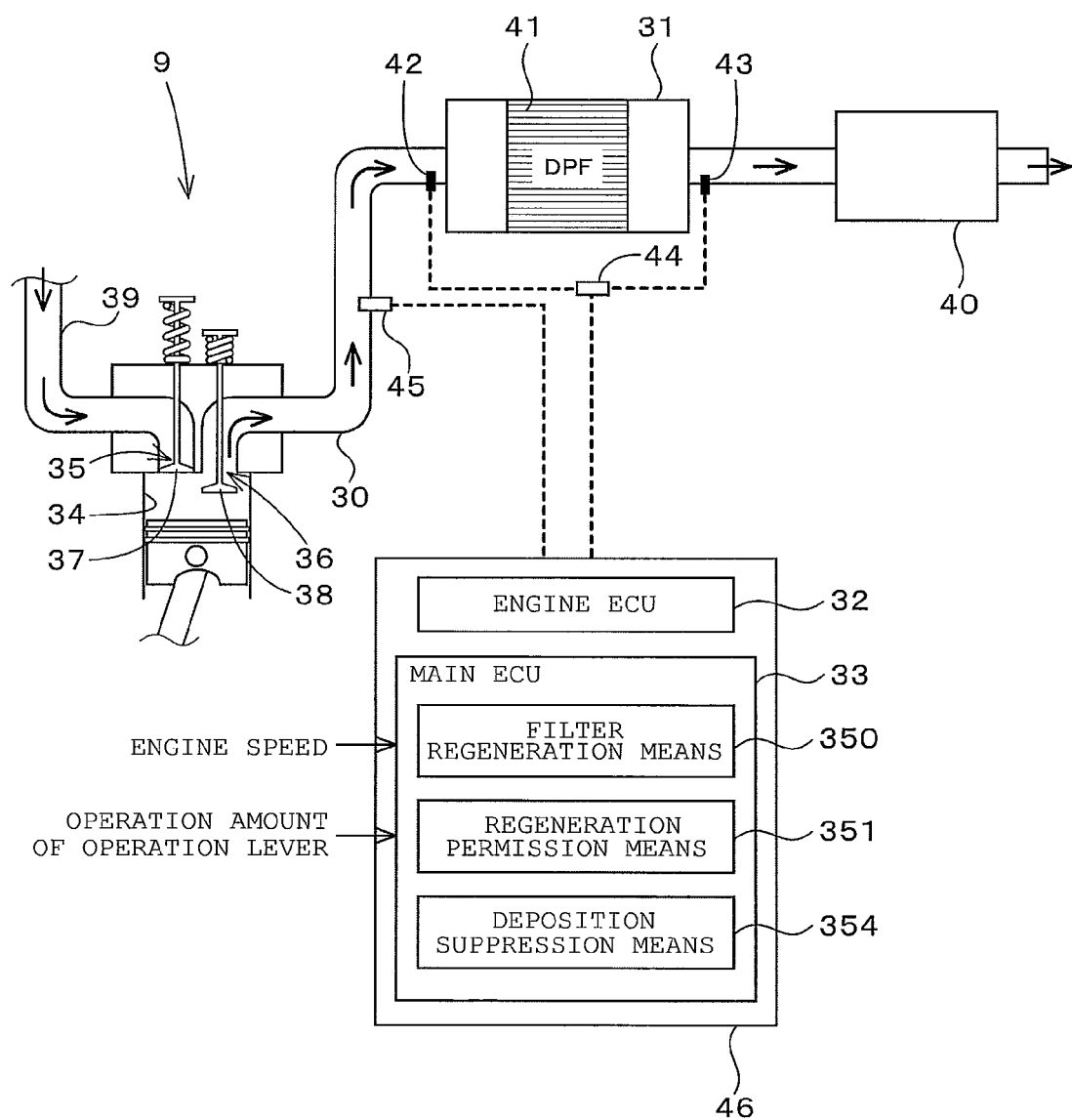
FIG. 12 is a diagram showing a configuration of an exhaust gas cleaning device in a fifth embodiment.

Referring to FIG. 10 and FIG. 11, the different point from the third embodiment will be explained.

Referring to FIG. 10, when the PM deposition amount is equal to or more than the threshold value TH1, the regeneration control level is in "Level 1". After that, when the PM deposition amount after a predetermined time T seconds from the timing of being in "Level 1" is not less than the warning clearing threshold value being smaller than the threshold value TH1 (when equal to or more than the warning clearing threshold value) while the PM deposition amount is not equal to or more than the threshold value TH2, the regeneration control level is shifted from "Level 1" to "Level 2". This different point from the third embodiment will be explained below.

The filter regeneration means 247 has a timekeeping part 254. The timekeeping part 254 starts the timekeeping from the timing when the regeneration control level has been "Level 1", and counts an elapsed time from the timing of being in "Level 1".

The filter regeneration control means 60 judges whether or not the PM deposition amount is equal to or more than the threshold value TH2, and in the case of being equal to or more than the threshold value TH2, shifts the regeneration control level to "Level 2".

In addition, even when judging that the PM deposition amount is less than the threshold value TH2, the filter regeneration control means 60 shifts the regeneration control level to "Level 2", if the PM deposition amount after the predetermined time is not less than the warning clearing threshold value. That is, when the PM deposition amount is not less than the warning clearing threshold value after the predetermined time T seconds from the timing of being in "Level 1", the regeneration control level is shifted to "Level 2".

In this manner, the filter regeneration control means 60 according to the fourth embodiment can judge that in a case where a time when the regeneration control level is "Level 1" is equal to or more than the predetermined time T seconds, a sufficient regeneration effect cannot be obtained only by closing the intake throttle in the automatic regeneration operation, and accordingly shifting to the next regeneration control level.

According to the filter regeneration means 247 having the deposition amount obtaining means 250 performing the above-mentioned operation, the warning that requires the operator to increase the engine speed can be issued without waiting for the increasing of the PM deposition amount. Accordingly, the DPF regeneration always can be performed early.

According to the present embodiment, a necessity to increase the speed of the diesel engine 9 (whether or not to promote the operator to regenerate the DPF 41) is judged on the basis of a decreasing tendency of the PM deposition amount (whether or not less than the warning clearing threshold value) after the elapsed time (the predetermined time T seconds) from the starting of the automatic regeneration. Specifically, after the starting of the automatic regeneration, when the PM deposition amount is less than the warning clearing threshold value and is in the decreasing tendency, it is not required to increase the speed of the engine 9, and on the other hand, when the PM deposition amount is equal to or more than the warning clearing threshold vale and is not in the decreasing tendency, the operator is informed to increase the speed of the engine 9, thereby performing the back-up operation as soon as possible. That is, since the DPF can be regenerated by backing up the automatic regeneration always at the early step (a step where the PM deposition amount is not so large), an initial performance and deterioration of the DPF can be suppressed.

Meanwhile, it should be considered that the embodiments disclosed herein this time are exemplification in all points and is not restrictive. The scope of the present invention is shown by not the above-described explanation but the claims, and intends to include all the modification in an equivalent means and range to the claims.

The automatic regeneration in the above-mentioned embodiments is explained by employing the "closing of the intake throttle" as an example; however, the automatic regeneration is not limited to the "closing of the intake throttle", and the regeneration of the DPF due to a post injection of fuel may be included in the automatic regeneration. The post injection is an operation for promoting the temperature increasing of the DPF 41 by injecting a fuel to the combusted gas.

Additionally, in the automatic regeneration performed in each of the regeneration control modes, the performing of "closing of the intake throttle" and the performing of "post injection" may be arbitrarily combined. For example, the first regeneration control mode 251 to the third regeneration control mode 253 all may perform the closing of the intake throttle, and additionally when the water temperature and the exhaust temperature become higher than those in the first regeneration control mode 251, the post injection may be started in addition to the closing of the intake throttle. In this case, it is preferred to continuously perform the post injection also in the third regeneration control mode 253. Moreover, the control of the DPF 41 can be applied to the working construction machine and agricultural machine such as the Compact Track loader (CTL) and the tractor other than the backhoe 1.

(Fifth Embodiment)

A fifth embodiment of the present invention will be explained below.

The backhoe 1 according to the present embodiment has the same configuration as that of the backhoe 1 shown in FIG. 23 explained in the first embodiment. In addition, the configuration of the diesel engine 9 and the structure of the exhaust system of the diesel engine 9 are the same as the configuration of the diesel engine 9 and the structure of the exhaust system according to the first embodiment.

The differential pressure detected by the differential pressure sensor and the exhaust temperature detected by the exhaust temperature sensor, each described above, are sent to the control part 46, and the control part 46 performs the control to regenerate the DPF. Meanwhile, the control of regeneration of the DPF will be explained below.

The control part 46 controls the backhoe 1 entirely, other than the control for the regeneration of the DPF. The control part 46 is configured by a plurality of control units (ECU), and, for example, has an engine ECU 32 for controlling the diesel engine 9 and a main ECU 33 for controlling entire operations of the backhoe 1. The engine ECU 32 and the main ECU 33 are configured, for example, by a CPU.

The engine ECU 32 obtains information from sensors arranged in some places of the diesel engine 9 and a power transmission system, calculates a suitable fuel injection amount and injection timing, ignition timing, an idling speed, and the like according to a state of the diesel engine 9, and outputs a control command to the diesel engine 9 and the like. Obviously, in the diesel engine 9, the engine speed can be increased by operating the acceleration lever provided around the operator's seat (by performing the accelerating operation).

As an sensor supplying the information to the engine ECU 32, an accelerator opening sensor for detecting an acceleration opening, the differential pressure sensor 44 for detecting the differential pressure of the exhaust gas cleaning device 31, the exhaust temperature sensor 45 for detecting the exhaust temperature, an air flow meter for detecting an intake air amount, a crank position sensor for detecting the engine speed, the water temperature sensor for detecting a water temperature of the coolant water, a throttle position sensor for detecting an opening of a valve, and the like are included. Other than these sensors, a cam position sensor for detecting a crank position, an oxygen concentration sensor for detecting an oxygen concentration of the intake air, and the like are included.

The main ECU 33 controls various types of device (the traveling device, the working device, and the like) provided to the backhoe 1 in combination with the engine ECU 32. For example, the main ECU 33 executes: the flow rate control for supplying a predetermined operation oil to the respective cylinder such as the swing cylinder, the boom cylinder 18, the arm cylinder 19, the bucket cylinder 20, and the like.

As described above, by controlling the diesel engine 9 with use of the engine ECU 32 and by controlling the various types of devices such as the working device with use of the main ECU 33, the backhoe 1 can be operated. Meanwhile, the controls due to the engine 32 and the main ECU 33 are obviously not limited to the above descriptions.

Then, as described above, the control part 46 performs the control to regenerate the DPF. The regeneration of the DPF will be explained below in detail.

To the control part 46, a filter regeneration means 350 for regenerating the DPF 41 of the exhaust gas cleaning device 31 is provided. Specifically, the main ECU 33 configuring the control part 46 is provided with the filter regeneration means 350, and the filter regeneration means 350 is configured by a computer program and the like stored in the main ECU 33.

When the deposition amount of particulate matter deposited in the DPF 41 (referred to as the PM deposition amount) becomes equal to or more than a predetermined amount (equal to or more than a threshold value), the filter regeneration means 350 controls the diesel engine 9 and the exhaust gas cleaning device 31 in order to combust and remove the particulate matter deposited in the filter, and automatically performs the process (the regeneration operation) to decrease the deposition amount. That is, as shown in FIG. 13, when the PM deposition amount becomes equal to or more than the predetermined threshold value, the filter regeneration means 350 starts up the automatic regeneration mode to start the control of the regeneration of DPF.

In the automatic regeneration mode, the "closing of the intake throttle" that increases the exhaust temperature to combust the particulate matter by closing the intake throttle of the diesel engine 9 is performed, and the "post injection" that increases the exhaust temperature to combust the particulate matter by injecting fuel into the gas after combustion.

Additionally, in the filter regeneration means 350, at a step where the automatic regeneration mode is performed and when the PM deposition amount is in the increasing tendency such as the gradually-increasing, an output limitation mode to limit the output of the diesel engine 9 is started up.

Figure 13:
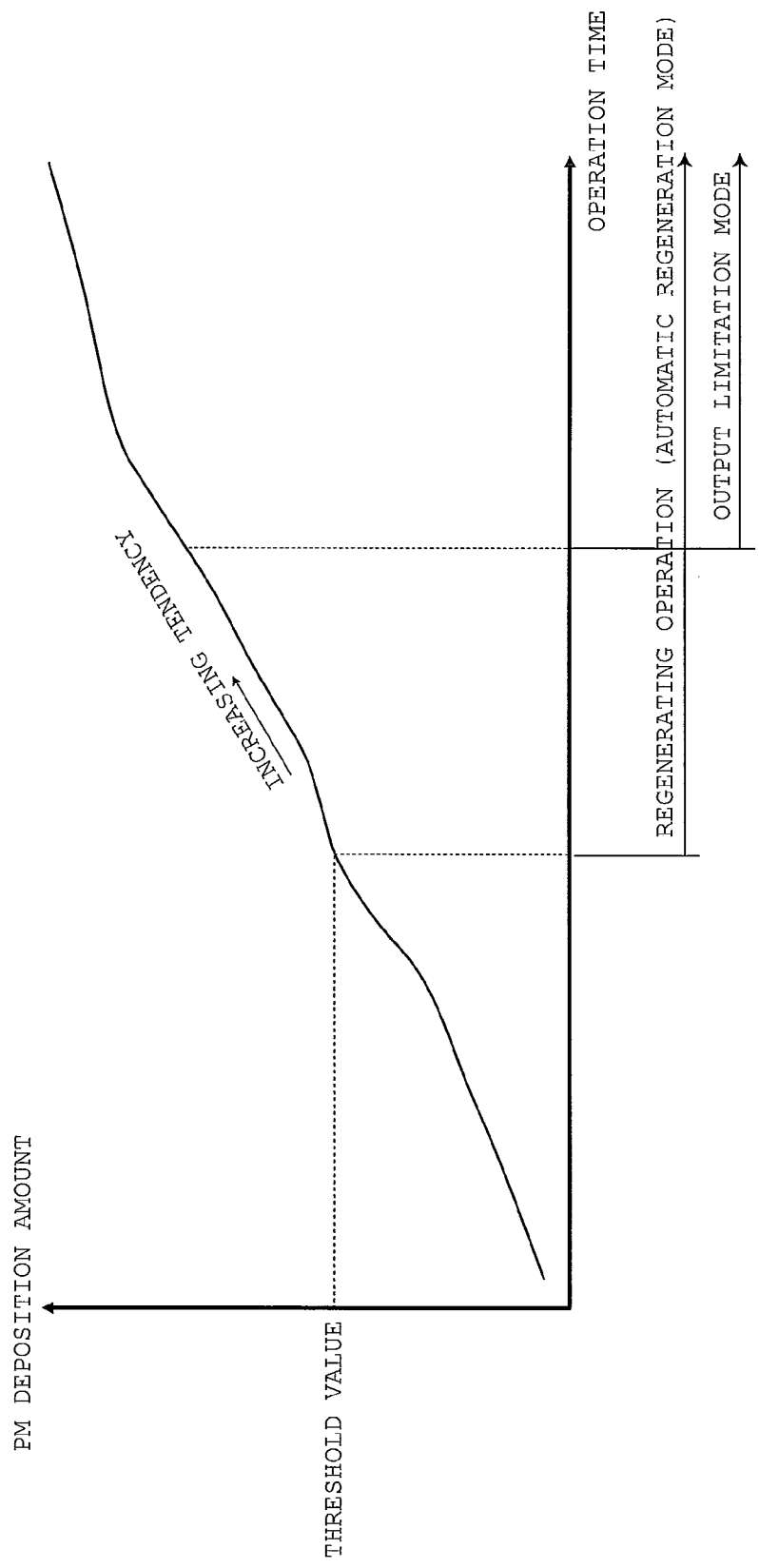
FIG. 13 is a diagram showing a shift (a change) of a PM deposition amount.

As shown in FIG. 13, when the PM deposition amount in a predetermined time is being increased (the transition line of the PM deposition amount is rising to the right) after the starting of the automatic regeneration mode, the output limitation mode is activated.

For example, in a case where the PM deposition amount is calculated every 10 seconds after the automatic regeneration mode is started and the PM deposition amounts calculated every 10 seconds are sequentially increased, the PM deposition amount at the starting of the automatic regeneration mode is compared with the PM deposition amount after 60 seconds; and in the case where the PM deposition amount after 60 seconds is larger, the transition line is created by plotting the PM deposition amount every few seconds, and in a case where a slope of the transition line is plus (the transition line of the PM deposition amount rises to the right) and the like, it is determined that the PM deposition amount is in the increasing tendency, and the output limitation mode is activated.

When the output limitation mode is activated, the power limitation to limit the maximum output of the diesel engine 9 to a predetermined value or less (for example, 50% or less of the regulated maximum output) due to the output limitation mode is ordered to the engine ECU 32. In the output limitation mode, the increasing of the PM deposition amount due to the engine 9 is suppressed as much as possible, continuing the decreasing of the PM deposition amount due to the automatic regeneration mode. That is, in the output limitation mode, the increasing of the PM deposition amount is suppressed by decreasing the PM deposition amount due to the regenerating operation (decreasing due to the combustion) and suppressing the operation of the engine 9 (suppressing the amount of the exhaust gas), and thereby suppressing the entire increasing of the PM deposition amount.

As described above, the PM deposition amount of the DFP can be decreased by performing the regenerating operation of the DPF due to the filter regeneration means 350; and in the present invention, a regeneration permission means 351 for permitting the regenerating operation of the DPF due to the filter regeneration means 350 is included.

The regeneration permission means 351 permits the regenerating operation due to the filter regeneration means 350 under the state where the operator is boarding the backhoe (the working machine) 1, that is, the state where the boarding of the operator is confirmed, and is configured by, for example, a computer program and the like stored in the main ECU 33 (like the filter regeneration means 350).

To explain in detail, a boarding confirmation means 352 for confirming whether or not the operator is boarding the backhoe 1 is provided with the backhoe 1.

The boarding confirmation means 352 has a lever supported so as to freely swing on a side of the operator's seat 10, when the lever 52 is laid down to block a boarding door, it is judged that the operator is boarding (the boarding state), and when the lever 52 is raised (stood up) so as not to block the boarding door, it is judged that the operator is not boarding (the getting-off state). In the boarding confirmation means 352, a signal showing that the operator is in the boarding state or in the getting-off state, that is, showing that the lever 52 is laid down or the lever 52 is raised is inputted to the main ECU 33.

Here, when the engine 9 is in operation and the boarding state is confirmed, the regeneration permission means 351 permits to perform the automatic regeneration due to the filter regeneration means 350.

To be more detailed, the operator firstly board the operator's seat 10 under the state where the lever 52 is raised, and after that, when the lever 52 is laid down and the engine 9 is started, the regeneration permission means 351 sets the regenerating operation due to the filter regeneration means 350 to be in a permitted state. When the PM deposition amount exceeds the threshold value in the permitted state, the filter regeneration means 350 starts up the automatic regeneration mode and the output limitation mode, and regenerates the DPF by performing the "closing of the intake throttle" and the "post injection". Accordingly, after the operator boards the backhoe 1, the regeneration of the DPF can be automatically performed during the working performed by the operator operating the operation lever 47.

Here, there is a case where the operator temporarily stops the operation of the operation lever 47, gets-off the backhoe 1, and then boards the backhoe 1 to start the operation again. For this reason, in the present invention, if the operator temporarily gets-off the backhoe 1, the permitted state due to the regeneration permission means 351 is not cleared immediately, and even in a case where the working is performed by sequentially repeating the boarding, the getting-off, and the boarding, the permitted state is maintained. For example, the permitted state is maintained until the engine 9 is stopped after the starting of the engine 9 even if the operator repeats the boarding and the getting-off, and when the engine 9 is stopped, the permitted state due to the regeneration permission means 351 is automatically cleared.

As described above, in the backhoe 1 of the present invention, the regeneration of the DPF due to the filter regeneration means 350 can be performed, and a deposition suppression means 354 for suppressing the increasing of the deposition amount of the particulate matter deposited in the DPF other than the operation for performing the regeneration of the DPF is provided. The deposition suppression means 354 is configured by a computer program and the like stored in the main ECU 33, same as in the filter regeneration means 350.

The deposition suppression means 354 suppresses the increasing of the deposition amount of the particulate matter deposited in the DPF by forcibly stopping the engine 9. Since there are a plurality of patterns of the engine stopping due to the deposition suppression means 354, the patterns will be explained in turn. Meanwhile, it is enough that the deposition suppression means 354 included in the backhoe 1 performs any one of the patterns shown as follows.

The deposition suppression means 354 in a first pattern stops the engine 9 under the state where the engine 9 is in operation and when the getting-off state of the operator continues for a predetermined time (for example, 60 seconds). Specifically, when a state, the engine speed inputted to the main ECU 33 is larger than zero and a signal showing that the boarding of the operator is not confirmed by the boarding confirmation means 352 is inputted to the main ECU 33 (an engine operation getting-off state), is continued for 60 seconds or more, the deposition suppression means 354 outputs the signal of the engine stopping to the engine ECU to forcibly stop the engine 9. Meanwhile, the length of time (the predetermined time) of the getting-off state for the judgment of the engine stopping due to the deposition suppression means 354 is set depending on workability of the backhoe 1 and on an increasing degree of the PM deposition amount under a leaving state of the operating engine 9, and naturally is not limited to 60 seconds as described above. For example, the predetermined time may be 300 seconds. In addition, the length of time of the getting-off state may be arbitrarily set by operating the display device 11.

The deposition suppression means 354 in a second pattern stops the engine 9 when the PM deposition amount is in the increasing tendency under the state where the engine 9 is in operation and the operator is getting-off. Specifically, the deposition suppression means 354 monitors the transition of the PM deposition amount under the engine operation getting-off state. And, when the transition line of the PM deposition amount rises to the right after the starting of the engine 9 in the same manner as shown in FIG. 13, the deposition suppression means 354 outputs the signal of the engine stopping to the engine ECU to forcibly stop the engine.

In this manner, by providing the deposition suppression means 354 other than the filter regeneration means 350, the PM deposition amount can be prevented from being unnecessarily increased.

For example, in order to warm the backhoe 1 (the warm-up operation), the operator sometimes gets-off the backhoe 1 after boarding the backhoe 1 to start the engine 9, and takes a rest for a while. When the operator forgets that the backhoe 1 is being warmed up and the engine 9 is being operated at the idling engine speed, the PM deposition amount may be gradually increased.

In the deposition suppression means 354 of the first pattern, the engine is automatically stopped when the engine operation getting-off state continues for 60 seconds, and accordingly the PM deposition amount can be prevented, from an early stage, from being increased due to the operator forgetting the warming-up.

Additionally, in the deposition suppression means 354 of the second pattern, the engine 9 is automatically stopped under the engine operation getting-off state and when the PM deposition amount is in the increasing tendency, and accordingly the PM deposition amount can be prevented from being increased due to the operator forgetting the warming-up. Especially, in the deposition suppression means 354 of the second pattern 2, the engine 9 is stopped under a state where the PM deposition amount is actually increased, and accordingly a time for the warming-up can be ensured as much as possible.

In addition, as described above, after the operator boards to perform the working, the operator sometimes gets-off, leaving the engine 9 running, and boards again. There is a case where the time when the operator gets off, leaving the engine 9 running, and boards again is long and thus the PM deposition amount is increased. Even in this case, since the engine 9 is stopped due to the deposition suppression means 354, the increasing of the PM deposition amount after the getting-off of the operator can be prevented.

Meanwhile, as described above, in the getting-off due to the warming-up of the backhoe 1 and in the temporal getting-off in the working, the engine 9 is stopped by the deposition suppression means 354 under the state where it can be considered that the engine 9 is continuously operated and the PM deposition amount is increased; however, after the engine stopping due to the deposition suppression means 354, when the operator boards again to start the engine 9, the engine 9 is restarted preferentially regardless of the stopping of the engine 9 due to the deposition suppression means 354. Even after the restarting of the engine 9, when the conditions to stop the engine 9 due to the deposition suppression means 354 are satisfied again, the engine 9 stops.

Meanwhile, in the above-described embodiment, the filter regeneration means 350 includes the automatic regeneration mode and the output limitation mode; however, the filter regeneration means 350 may include a regenerating operation help mode other than the automatic regeneration mode and the output limitation mode.

The regenerating operation help mode promotes, in the regenerating operation by performing the closing of the intake throttle and the post injection, the increasing of the exhaust temperature by increasing the speed of the engine 9 other than the regenerating operations.

Specifically, when the regenerating operation due to the filter regeneration means 350 is permitted and the automatic regeneration mode is started up by the filter regeneration means 350, the regenerating operation help mode is also started up. Then, an information screen for informing the increasing of speed of the engine 9 is displayed on the display device 11 by the starting-up of the regenerating operation help mode. When boarding, the operator can watch the information screen to promote the increasing of the engine 9, and, for example, by operating the acceleration lever to increase the engine speed, the operator can manually increase the engine speed by himself. When the engine speed in increased, the exhaust temperature is increased, and accordingly the regeneration of the DPF due to the automatic regeneration mode is promoted.

In the regenerating operation help mode, the increasing of the engine speed is performed not automatically but manually due to the operation of the acceleration lever by the operator. The operator can freely perform the helping operation to the regeneration of the DPF (the increasing of the engine speed) whenever the operator wants, and inconvenient, for example, the operation is interfered by the regeneration of the DPF can be reduced.

For example, in performing the helping operation to the regeneration of the DPF (the increasing of the engine speed), if the operation by the operation lever 47 is performed, the operator firstly continues the operation by the operation lever 47 without any change, and after the operation by the operation lever 47 is finished once, the engine speed can be increased by operating the acceleration lever; thereby since the regeneration of the DPF does not interfere the operation of the operation lever 47 by the operator, the regeneration of the DPF can be promoted without deteriorating the operability.

Sixth Embodiment

In the fifth embodiment, when the PM deposition amount is equal to or more than the threshold value, the filter regeneration means 350 is in the automatic regeneration mode and is automatically in the regeneration operation; however, the filter regeneration means 350 according to a sixth embodiment performs the automatic regeneration not automatically but manually. Meanwhile, explanation of the same parts as the configuration of the fifth embodiment will be omitted.

Figure 14:
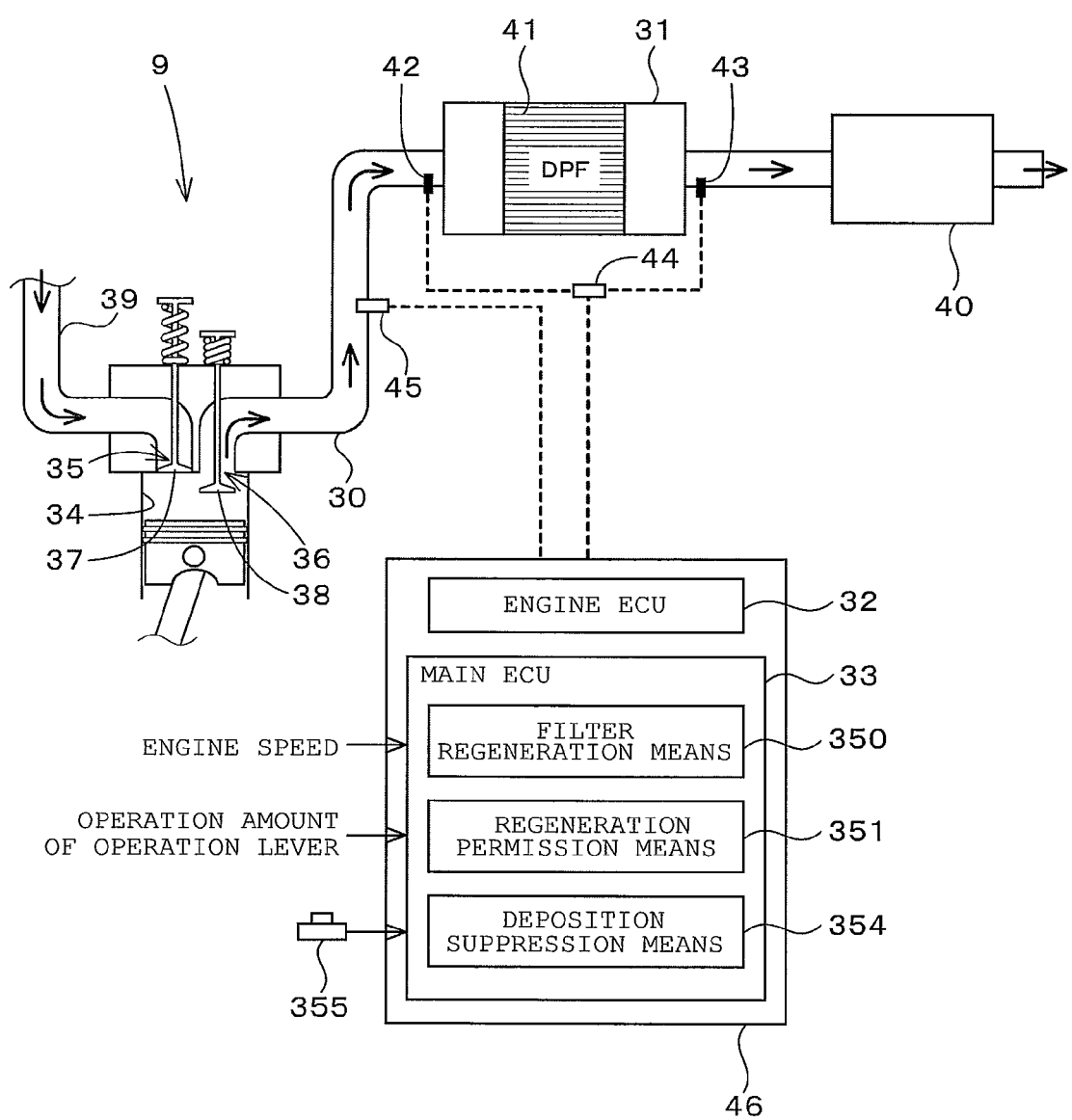
FIG. 14 is a diagram showing a configuration of an exhaust gas cleaning device in a six embodiment.

FIG. 14 shows a configuration of an exhaust gas cleaning device according to the sixth embodiment. As shown in FIG. 14, to the main ECU 33, a regeneration switch 355 for ordering the regenerating operation due to the filter regeneration means 350 is connected. The regeneration switch 355, for example, is a press-button type; when the regenerating operation due to the filter regeneration means 350 needs to be performed, a backlight composed of an LED and the like is lighted or flashed, and when being pressed, the regeneration switch 355 orders the filter regeneration means 350 to perform the regenerating operation.

In the present embodiment, when the boarding is confirmed by the boarding confirmation means 352 (the boarding state), the regeneration permission means 351 sets the regenerating operation due to the filter regeneration means 350 to be in the permitted state. Then, when the PM deposition amount is equal to or more than a threshold value and the regenerating operation is required in the permitted state, the filter regeneration means 350 lights or flashes the backlight with respect to the regeneration switch 355 to promote the pressing of the regeneration switch 355.

When the operator notices the flashing or lighting of the regeneration switch 355 and presses the regeneration switch 355, the filter regeneration means 350 starts to control the regeneration of the DPF due to the manual operation of the regeneration switch 355 (starts the closing of the intake throttle and the post injection). Meanwhile, when the regeneration switch 355 is not lighted or flashed, that is, when there is not the necessity of the regenerating operation due to the filter regeneration means 350, the regenerating operation due to the filter regeneration means 350 is not performed even if the regeneration switch 355 is pressed.

As described above, when the operator presses the regeneration switch 355, the regenerating operation due to the filter regeneration means 350 can be performed. Even in this case, since the engine 9 is stopped by the deposition suppression means 354 under the state where the operator gets off for a long time during the warm-up of the backhoe 1 and the like, the increasing of the PM deposition amount can be suppressed.

Meanwhile, as the condition where the deposition suppression means 354, a case of regeneration (a regeneration pattern) where the engine 9 is operated under the operator being in the getting-off state and the regenerating means is performed by the filter regeneration means 350, and a case of non-regeneration (a non-regeneration pattern) where the operator being in the getting-off state and the regenerating operation is not performed by the filter regeneration means 350 are considered; however, when the engine 9 is operated under the getting-off state, the deposition suppression means 354 may stop the engine 9 to suppress the increasing of the PM deposition amount in both of the regeneration pattern and the non-regeneration pattern. In addition, a condition may be applied to the stopping of the engine 9 as follows.

For example, in the non-regeneration pattern, when a predetermined time has elapsed or the PM deposition amount is in the increasing tendency, the engine 9 is stopped by the deposition suppression means 354, on the other hand, in the regeneration pattern, the engine 9 is stopped after the regenerating operation is finished, and when the PM deposition amount is in the increasing tendency even in the regenerating operation, the engine 9 may be stopped.

It should be considered that the embodiments disclosed herein this time are exemplification in all points and is not restrictive. The scope of the present invention is shown by not the above-described explanation but the claims, and intends to include all the modification in an equivalent means and range to the claims.

In the automatic regeneration, the performing of the "closing of the intake throttle" and the performing of the "post injection" may be arbitrarily set, and are not limited to the above description. For example, the "closing of the intake throttle" may be performed at first, and the "post injection" may be performed after that, otherwise only the "post injection" may be performed.

In the above-mentioned embodiment, the boarding confirmation means 352 is configured by the lever provided around the operator's seat 10, and confirms the boarding state and the getting-off state of the operator due to the lever 52; however, a lever used in a lever lock structure shown below may be commonly used as the above-mentioned boarding confirmation means.

In the case of the working machine such as the backhoe 1, if the operation lever 47 is moved under the state where the operator does not board the backhoe 1, an actuator is unexpectedly operated, and accordingly in order to prevent this, the lever lock structure is provided. In the lever lock structure, a lever for lever lock to confirming the boarding by being swung in the same manner as that of the above-mentioned lever 52 is provided; in the boarding state where the lever for lever lock is laid down, supply of the operating oil to the actuator is permitted, and in the getting-off state where the lever for lever lock is raised, the supply of the operating oil to the actuator is permitted. The lever for lever lock used for the lever lock mechanism may be used as the above-mentioned boarding confirmation means.

In addition, by providing a pressure sensor to a seat portion and a back portion of the operator's seat, the pressure sensor may be employed as the boarding confirmation means. In this case, during the pressure sensor is operated to detect a pressure, the boarding state is confirmed, and during the pressure sensor does not detect the pressure, the getting-off state is confirmed. Additionally, the boarding confirmation means may confirm the boarding with use of a camera other than the lever and the sensor.

Seventh Embodiment

A seventh embodiment of the present invention will be explained below.

The backhoe 1 according to the present embodiment has the same configuration as that of the backhoe 1 shown in FIG. 23 explained in the first embodiment. In addition, the configuration of the diesel engine 9 and the structure of the exhaust system of the diesel engine 9 are the same as the configuration of the diesel engine 9 and the structure of the exhaust system according to the first embodiment.

Figure 15:
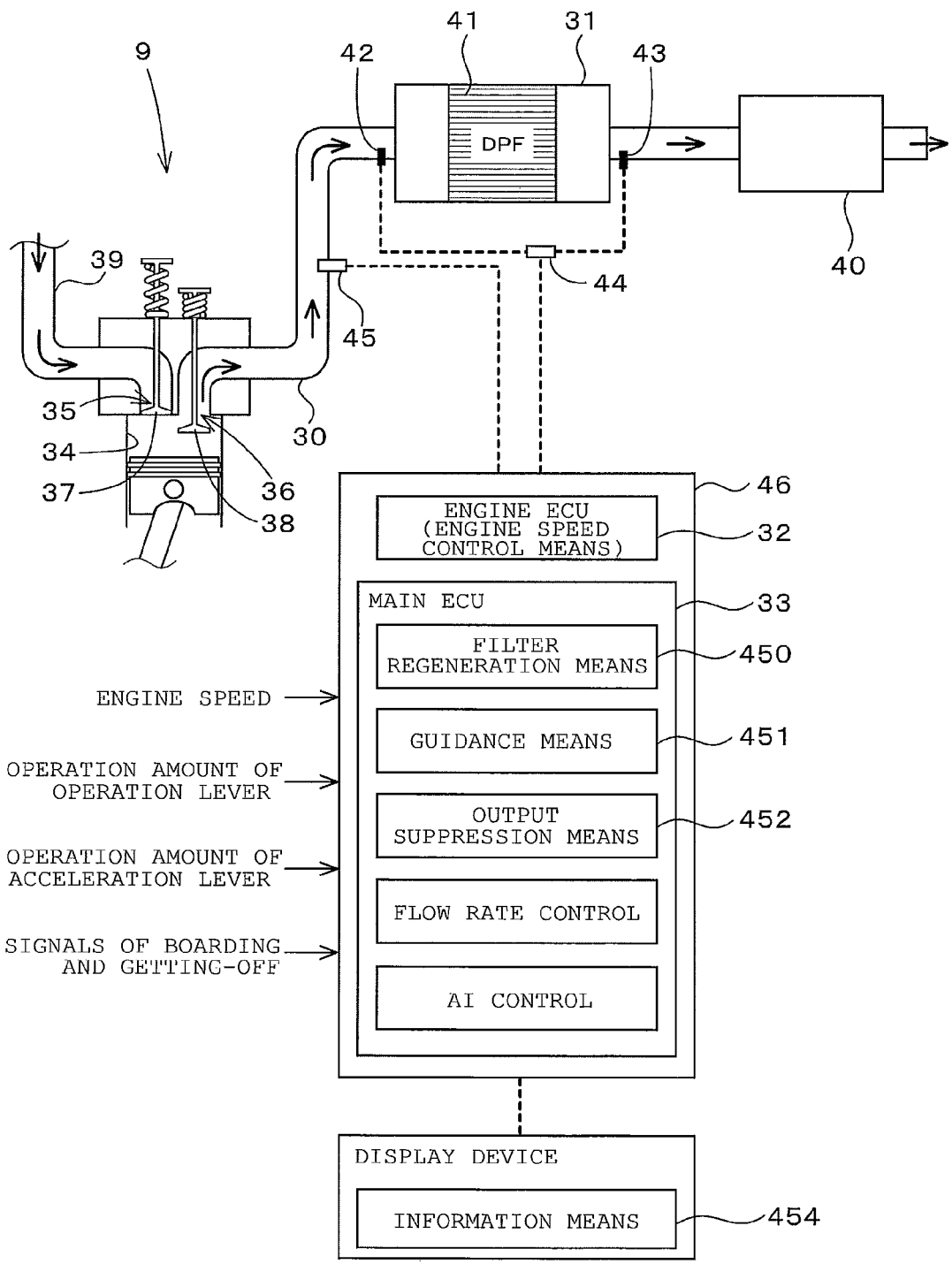
FIG. 15 is a diagram showing a configuration of an exhaust gas cleaning device in a seventh embodiment.

As shown in FIG. 15, to the exhaust manifold 30 connecting the diesel engine 9 to the exhaust gas cleaning device 31, an exhaust temperature sensor 45 for detecting a temperature of the combustion gas exhausted from the diesel engine 9 toward the exhaust gas cleaning device 31 (the exhaust temperature) is provided. The exhaust temperature sensor is composed of, for example, a thermistor. The differential pressure detected by the differential pressure sensor and the exhaust temperature detected by the exhaust temperature sensor, mentioned above, are sent to the control part 46, and the control part 46 performs a control for regeneration of the DPF. Meanwhile, the control for the regeneration of the DPF will be described later.

The control part 46 controls all of the backhoe 1, other than the control for the regeneration of the DPF. The control part 46 is configured by the plurality of control units (ECU), and, for example, has the engine ECU 32 for controlling the diesel engine 9 and the main ECU 33 for controlling entire operations of the backhoe 1. The engine ECU 32 and the main ECU 33 are configured, for example, by a CPU.

The engine ECU 32 obtains information from sensors arranged in some places of the diesel engine 9 and the power transmission system, calculates the suitable fuel injection amount, injection timing, and ignition timing according to the state of the diesel engine 9, and outputs the control command to the diesel engine 9 and the like. Obviously, in the diesel engine 9, when the accelerator (the acceleration lever) provided around the operator's seat 10 is operated, the speed of the engine can be increased and decreased.

As an sensor supplying the information to the engine ECU 32, an accelerator opening sensor for detecting an acceleration opening (an operation amount of the acceleration lever), the differential pressure sensor 44 for detecting the differential pressure of the exhaust gas cleaning device 31, the exhaust temperature sensor 45 for detecting the exhaust temperature, an air flow meter for detecting an intake air amount, a crank position sensor for detecting the engine speed, the water temperature sensor for detecting a water temperature of the coolant water, a throttle position sensor for detecting an opening of a valve, and the like are included. Other than these sensors, a cam position sensor for detecting a crank position, an oxygen concentration sensor for detecting an oxygen concentration of the intake air, and the like are included.

The main ECU 33 controls various types of device (the traveling device, the working device, and the like) provided to the backhoe 1 in combination with the engine ECU 32. For example, the main ECU 33 executes the flow rate control and the AI control.

The AI control is a control for setting the engine speed so that, when the operation lever 47 is not operated, the engine speed can be the idling engine speed and so that, when the operation lever 47 is operated, the engine speed can correspond to the acceleration.

Specifically, in the AI control, when an on-signal of the idle switch is inputted by shifting the operation lever 47 to the neutral position, an idle signal to set the engine speed to the idling speed is outputted to the auto idle motor regardless of an operation amount of the acceleration lever, and thereby driving the auto idle motor and setting the engine speed to the idling speed. Additionally, when an off-signal of the idle switch is inputted by swinging the operation lever 47 from back to front or from left side to right side, the engine speed based on the acceleration lever is outputted to the auto idle motor on the basis of the signal of the accelerator position, the auto idle motor is driven to operate a governor lever, and thus the engine speed is set to a speed corresponding to the acceleration lever.

As described above, the diesel engine 9 is controlled by the engine ECU 32, and various types of device such as the working device are controlled by the main ECU 33, and thereby the backhoe 1 can be operated. Meanwhile, the controls due to the engine ECU 32 and due to the main ECU 33 are obviously not limited to the above-described control.

Then, as described above, the control part 46 performs the control to regenerate the DPF.

The regeneration of the DPF will be explained below in detail.

To the control part 46, a filter regeneration means 450 for regenerating the DPF 41 of the exhaust gas cleaning device 31 is provided. Specifically, the main ECU 33 configuring the control part 46 is provided with the filter regeneration means 450, and the filter regeneration means 450 is configured by a computer program and the like stored in the main ECU 33.

When the deposition amount of particulate matter deposited in the DPF 41 (referred to as the PM deposition amount) becomes equal to or more than a predetermined amount, the filter regeneration means 450 controls the diesel engine 9 and the exhaust gas cleaning device 31 in order to combust and remove the particulate matter deposited in the filter, and automatically performs the process (the regeneration operation) to decrease the deposition amount.

Figure 16:
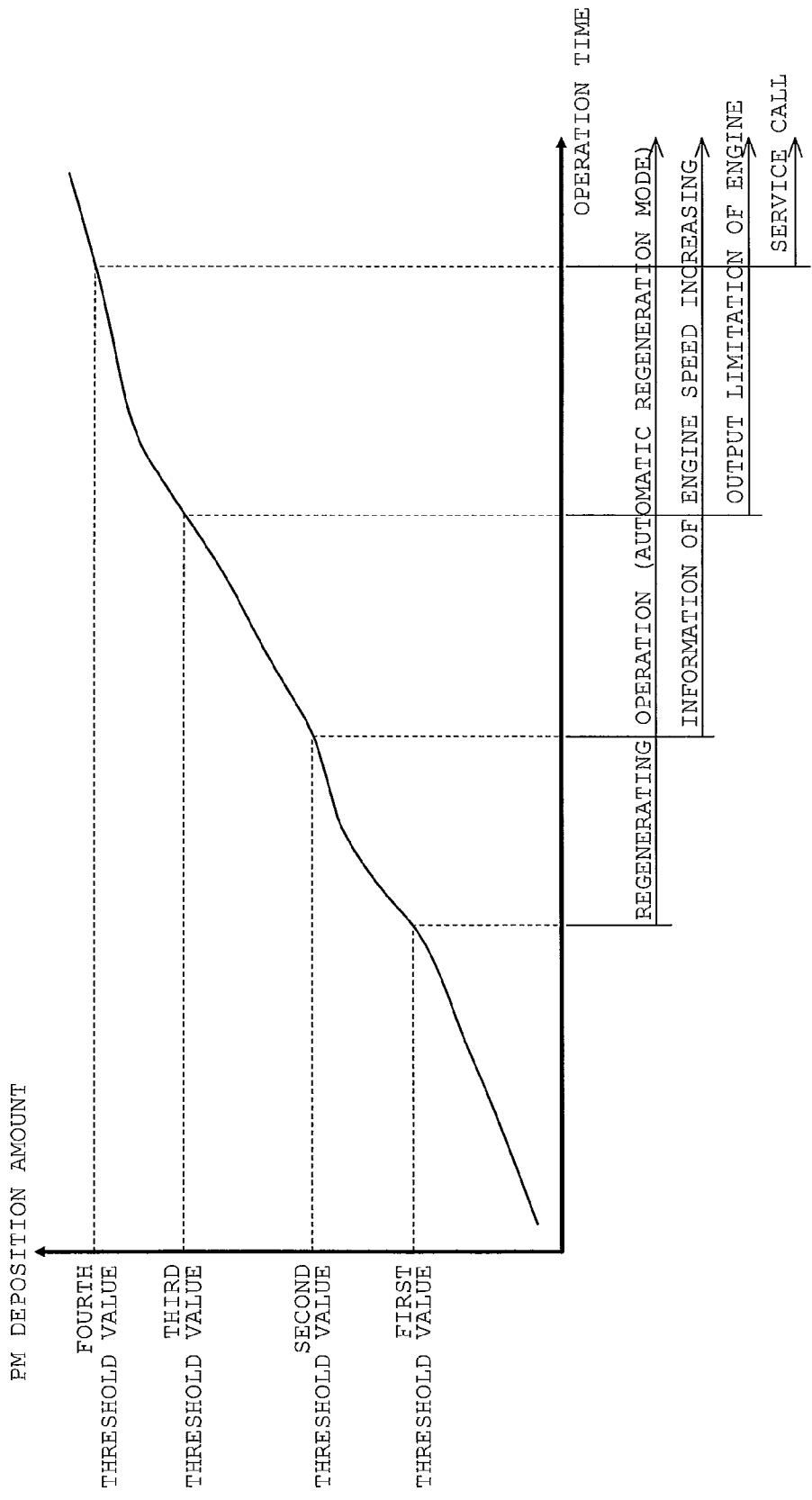
FIG. 16 is a diagram showing a shift (a change) of a PM deposition amount.

As shown in FIG. 16, when the PM deposition amount becomes equal to or more than the predetermined threshold value, the filter regeneration means 450 starts up the automatic regeneration mode to start the control of the regeneration of DPF.

In the automatic regeneration mode, the filter regeneration means 450 outputs a signal for closing the intake throttle of the diesel engine 9 to the engine ECU 32, and increases the exhaust temperature by closing the intake throttle under the control of the engine ECU 32. That is, in the automatic regeneration mode, the "closing of the intake throttle" for combusting the particulate matter due to the increasing of the exhaust temperature by closing the intake throttle is performed. Additionally, in the automatic regeneration mode, the filter regeneration means 450 outputs a signal for injecting fuel into the gas after combustion to the engine ECU 32, and increases the exhaust temperature by injecting the fuel under the control of the engine ECU 32. That is, in the automatic regeneration mode, the "post injection" for combusting the particulate matter due to the increasing of the exhaust temperature by injecting the fuel is performed.

In this manner, when the PM deposition amount is equal to or more than the first threshold value, the filter regeneration means 450 automatically performs the "closing of the intake throttle" and the "post injection", and thus performs the regeneration of the DPF 41.

Meanwhile, the filter regeneration means 450 performs the regeneration of the DPF 41 and performs the control to decrease the PM deposition amount; however, as shown in FIG. 16, when the DPF 41 is, for example, continuously used for a long time, the PM deposition amount is sometimes increased gradually. If the PM deposition amount becomes excessive, the DPF 41 may be broken, and accordingly in the working machine (backhoe) 1, a countermeasure to suppress the increasing of the PM deposition amount as much as possible is employed.

The countermeasure of the case where the PM deposition amount is increased exceeding the first threshold value will be explained below in detail.

The working machine (backhoe) 1 is provided with a means to increase the speed of the engine 9 in the regenerating operation due to the automatic regeneration mode. Specifically, the backhoe 1 is provided with a guidance means 451 for guiding the manually-increasing of the speed of the engine 9 during the automatic regeneration mode is started up, when the PM deposition amount is equal to or more than the second threshold value larger than the first threshold value (a condition A) or when a time for which the PM deposition amount is larger than the first threshold value continues for a predetermined time (for example, 1800 seconds) (a condition B).

The guidance means 451 is configured by a computer program and the like stored in the main ECU 33 like the filter regeneration means 450. When the condition A or the condition B is satisfied, the guidance means 451 switches the screen of the display device 11 to the information screen, and performs the display to inform the increasing of the speed of the engine (hereinafter referred to as the engine speed) on the information screen. For example, the message "Increase the engine speed, please" is displayed on the information screen.

When watching the information screen, the operator knows the requirement of increasing the engine speed, and the operator manually operates the accelerator (the acceleration lever) toward the increasing side of the engine speed, thereby increasing the engine speed. When the engine speed is increased to a speed (for example, 1800 rpm) higher than the idling engine speed (1000 rpm), the exhaust temperature is increased, and the regeneration of the DPF is promoted.

Here, in order to efficiently increase the exhaust temperature, it is preferred to display a target value (1800 rpm) of the engine speed on the information screen. For example, a message "Increase the engine speed to 1800 rpm or more, please" is displayed on the information screen. Meanwhile, in the case where the target value of the engine speed is displayed on the information screen, it is preferred that the target value can be arbitrarily set by operating the display device 11. In addition, the target value of the engine speed is a value at which the increasing of the exhaust temperature due to the increasing of the engine speed can be expected, and is preferably one and a half or more as large as the idling engine speed.

As described above, the increasing of the engine speed is performed not automatically but manually by the operation of the acceleration lever due to the operator. The operator can freely perform the promoting operation to promote the regeneration of the DPF (the increasing of the engine speed) automatically performed by the filter regeneration means 450 whenever the operator wants, and inconvenient, for example, the operation is interfered by the regeneration of the DPF can be reduced.

For example, in performing the promoting operation to the regeneration of the DPF (the increasing of the engine speed), if the operation by the operation lever 47 is performed, the operator firstly continues the operation by the operation lever 47 without any change, and after the operation by the operation lever 47 is finished once, the engine speed can be increased by operating the acceleration lever; thereby since the regeneration of the DPF does not interfere the operation of the operation lever 47 for the working by the operator, the regeneration of the DPF can be promoted without deteriorating the operability.

In this manner, when the operator operates the acceleration lever to increase the engine speed in accordance with the information screen, it can be considered the PM deposition amount becomes equal to or less than the first threshold value. However, in a case where the operator does not notice the information screen and thus does not operate the acceleration lever and the like, there is a possibility that the PM deposition amount is further increased.

For this reason, the backhoe 1 is provided with an output limitation means 452 for limiting an output of the engine during in the regenerating operation due to the automatic regeneration mode. The output limitation means 452 is configured by a computer program and the like stored in the main ECU 33 like the filter regeneration means 450.

When the PM deposition amount becomes equal to or more than the third threshold value larger than the second threshold value, the output limitation means 452 limits the output of the engine with the increasing and decreasing of the speed of the engine allowed. For example, when the operation amount due to the operation lever 47 is operated under the stare where the operator boards, a load of the hydraulic pump discharging the operation oil in accordance with the operation amount changes, and the engine speed is increased and decreased in synchronization with the change of load of the hydraulic pump. The change of load of the hydraulic pump and the increasing and decreasing of the engine speed are controlled by the engine ECU 32 and the main ECU 33.

The output limitation means 452 allows the above-mentioned increasing and decreasing of the engine speed due to the operation lever 47 and the like (the increasing and decreasing of the engine speed due to the flow rate control and the like) and freely changes the engine speed; however, when the PM deposition amount is equal to or more than the third threshold value, the output limitation means 452 orders the engine ECU 32 to limit the output, and the engine ECU 32 controls the injection time and the injection amount of fuel on the basis of the order of output limitation, thereby limiting the maximum output (the output) of the diesel engine 9 to a predetermined value or less (for example, 50% or less of a normal output).

In this manner, the increasing of the PM deposition amount due to the engine 9 is suppressed as much as possible by limiting the output of the diesel engine 9. That is, the output limitation means 452 suppress the increasing of the PM deposition amount by: decreasing the PM deposition amount due to the regenerating operation (decreasing due to the combustion); and limiting the output of the engine 9 (suppressing an amount of the exhaust gas), thereby suppressing the entire increasing of the PM deposition amount.

Meanwhile, the increasing of the engine speed and the output limitation of the engine are normally performed under the state where the operator boards, and the countermeasures promotes the decreasing of the PM deposition amount. However, a case where the operator does not board the working machine (the backhoe) 1 and the engine is in operation can be considered. In this case, there is a possibility that the PM deposition is increased.

Then, in the present invention, the boarding and the getting-off of the operator is confirmed by the boarding confirmation means 453 for confirming the boarding and the getting-off, the above-mentioned "information of increasing of the engine speed" and "output limitation of the engine" are performed if in the boarding state, and on the contrary, the engine speed is decreased to be stopped as described below if not in the boarding state (the getting-off state), thereby suppressing the increasing of the PM deposition amount.

The boarding confirmation means 453 has a lever 455 supported so as to be freely swung, for example, on a side of the operator's seat 10; when the lever 455 is laid down to block the boarding door, it is judged that the operator is boarding (the boarding state), and the boarding confirmation means 453 outputs the signal showing the boarding state to the main ECU 33. In addition, when the lever 455 is raised (stood up) to open the boarding door, the boarding confirmation means 453 determines the getting-off state, and outputs the signal showing the getting-off state to the main ECU 33. The signals of the boarding state and the getting-off state are also outputted to the engine ECU 32 via the vehicle communication network N such as the Controller Area network (CAN communication).

Here, in the case where: the engine is in operation under the getting-off state; and the PM deposition amount is equal to or more than the third threshold value larger than the second threshold value, the engine ECU 32 (an engine speed control means) automatically decreases the engine speed.

Specifically, after the engine is started, when the operation lever 47 is not operated regardless of the boarding state or the getting-off state, the engine speed is set to the idling engine speed under the AI control of the main ECU 33.

Figure 17:
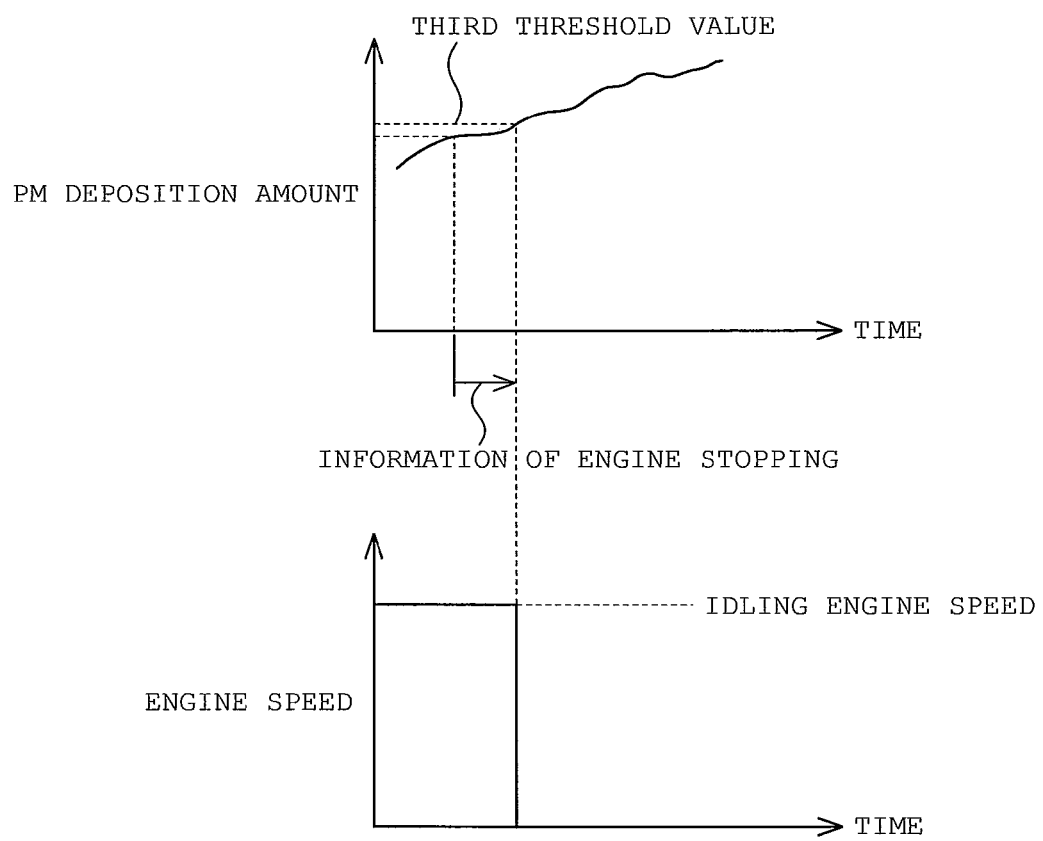
FIG. 17 is an explanation diagram explaining decreasing of engine speed in a seventh embodiment.

As described above, when the signal showing the getting-off state is inputted under the state where the engine speed is controlled to the idling engine speed (an idling getting-off state), the engine speed control means 32 judges whether or not the PM deposition amount is equal to or more than the third threshold value, and if the PM deposition amount is the equal to or more than the third threshold value, the engine speed control means 32 sets the speed of the engine to zero to stop the engine as shown in FIG. 17. On the other hand, if the PM deposition amount is less than the third threshold value even under the idling getting-off state, the engine speed control means 32 maintains the idling engine speed.

As mentioned above, according to the present invention, when the engine is in operation under the getting-off state and the PM deposition amount is equal to or more than the third threshold value (equal to or more than a predetermined value), the engine speed is automatically decreased to zero by the engine speed control means 32, and accordingly no exhaust gas is exhausted from the engine, thereby preventing the PM deposition amount from being increased in a period when the operator does not board.

For example, in order to warm the backhoe 1 (the warm-up operation), the operator sometimes gets-off the backhoe 1 once after boarding the backhoe 1 to start the engine 9, and takes a rest for a while. When the operator forgets that the backhoe 1 is being warmed up and the engine 9 is being operated at the idling engine speed for a long time, the PM deposition amount is gradually increased to be excessive, the PM deposition amount exceeds the limit of the DPF 41, and there will be a possibility that the DPF 41 has to be exchanged.

However, in the present invention, even in the case where the engine is operated at the idling engine speed under the state the operator does not board, as in the warm-up operation, the engine is stopped by the engine speed control means 32 when the PM deposition amount becomes equal to or more than the third threshold value, and accordingly the PM deposition amount can be preliminarily prevented from being excessive (the PM deposition amount exceeds the limit of catch of the DPF 41) due to the forgetting of the warm-up operation and the like. Obviously, the third threshold value, that is, the predetermined value at which the engine speed is automatically decreased is set to be lower than the limit value of catch of the DPF 41 (a value at which the exchanging is required).

In the above mentioned embodiment, the engine speed is set to zero at a timing when the PM deposition amount becomes equal to or more than the third threshold value due to the engine speed control means 32 as shown in FIG. 17; however, in the case of stopping the engine as described above, it is preferred to provide an information means 54 for informing the stopping of the engine and the like to the backhoe 1.

The information means 54 is composed of, for example, a speaker and the like provided to the display device 11 of the backhoe 1, outputs sound, a buzzer or the like from the speaker at the timing when the PM deposition amount exceeds the second threshold value to be close to the third threshold value, and thus preliminarily informs the stop of the engine. Meanwhile, the information means 54 is composed of a lamp, and at the timing when the PM deposition amount exceeds the second threshold value to be close to the third threshold value, the stop of the engine may be informed, for example, by flashing the lamp.

As described above, according to the present invention, after the stop of engine is informed by the information means 54, the engine is stopped at the timing when the PM deposition amount becomes equal to or more than the third threshold value, and accordingly if the operator forgets the warm-up operation is performed, for example, the operator can be made notice the warm-up operation before the stop of engine.

In addition, according to the present invention, in the case where the PM deposition amount is equal to or more than the third threshold value and the operator boards, the increasing of the PM deposition amount can be suppressed by performing the "information of increasing of the engine speed" and the "output limitation of the engine", and in the case where the operator is not boarding, the increasing of the PM deposition amount can be suppressed by "decreasing the engine speed to zero". That is, in the backhoe 1 of the present invention, the increasing of the PM deposition amount can be suppressed in both of the boarding state and the non-boarding state (the state of not boarding).

Then, there is a case where, under the condition where the PM deposition amount is already equal to or more than the third threshold value, the engine is started. On this occasion, when the operator boards after the engine is started, the output limitation of the engine is performed as described above, and when the operator gets-off, the engine speed is decreased as described above.

Here, in the case where the PM deposition amount is equal to or more than the third threshold value and further the PM deposition amount is equal to or more than a fourth threshold value, messages showing: immediately moving the backhoe 1 to a safe place (a place allowing maintenance) to stop the engine; and calling the service call (request of the maintenance) to a maker, a sales company, a maintenance company, and the like are displayed on the display device 11 during the operator is boarding. For example, a display "immediately stop the working machine at a safe place, stop the engine, and call the service call, please" is made on the display device 11. Meanwhile, the fourth threshold value is a value larger than the third threshold value and smaller then the limit value of catch of the DPF 41, and shows that the PM deposition amount is being close to the limit value. In other words, the fourth threshold value shows the state where the DPF 41 has to be immediately maintained, and is set, for example, to 80 to 90% if the limit value of the PM deposition amount is 100%, and is set to equal to or more than 50% of a difference between the third threshold value and the limit value (a remaining allowable deposition amount) if the third threshold value is a standard.

According to this, the service call is made on the display device 11 at the timing when the PM deposition amount exceeds the third threshold value and further exceeds the fourth threshold value at which the maintenance of the DPF 41 is required, and accordingly the maintenance of the DPF 41 can be conducted before the PM deposition amount reaches the limit value. Further, at the previous step where the PM deposition amount exceeds the fourth deposition amount, the process to automatically decrease the engine speed and the process to limit the output of engine is performed under the condition of the third threshold value or more, the process to increase the engine speed is performed under the condition of the second threshold value or more, and the process to perform the automatic regeneration is performed under the condition of the first threshold value or more, thus the increasing of the PM deposition amount is suppressed at each of the steps, and accordingly the DPF 41 can be used for a long period of time.

Eighth Embodiment

Figure 18:
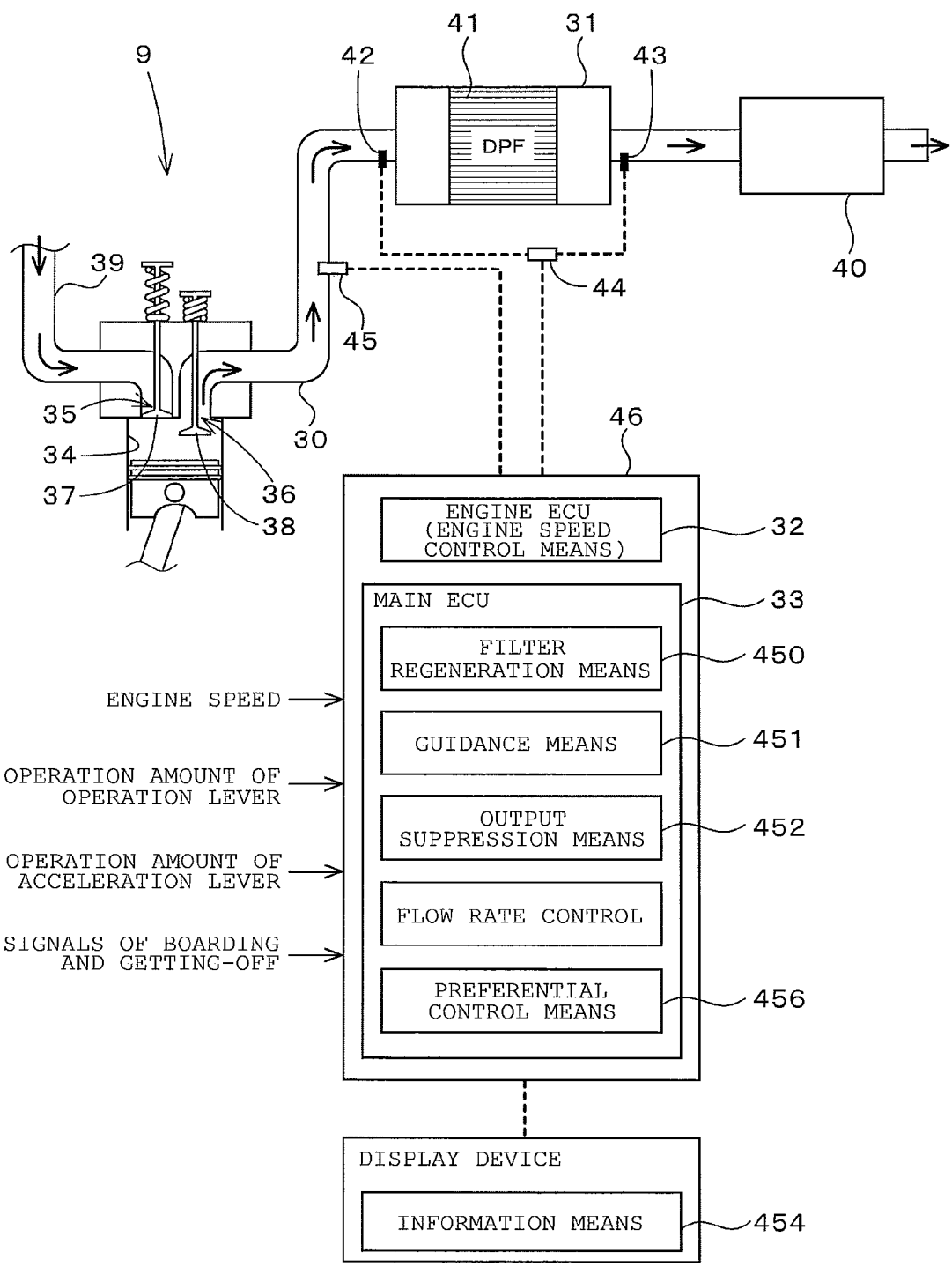
FIG. 18 is a diagram showing a configuration of an exhaust gas cleaning device in an eighth embodiment.

In the seventh embodiment, the AI control is included in the main ECU 33, and the control to automatically set the engine speed to the idling engine speed when the operation lever 47 is not operated is performed; however, as shown in FIG. 18, in an eighth embodiment, the backhoe 1 (the main ECU 33) that does not include the AI control will be explained.

In the seventh embodiment, when the operator is in the getting-off state, the engine speed is necessarily the idling engine speed because the AI control is provided, however, in the eighth embodiment, since the AI control is not provided, the engine speed is a value set by the acceleration lever under the getting-off state. For example, in a case where the engine speed is set to 1600 rpm by the acceleration lever, the engine speed is 1600 rpm even when the operator is in the getting-off state.

Figure 19:
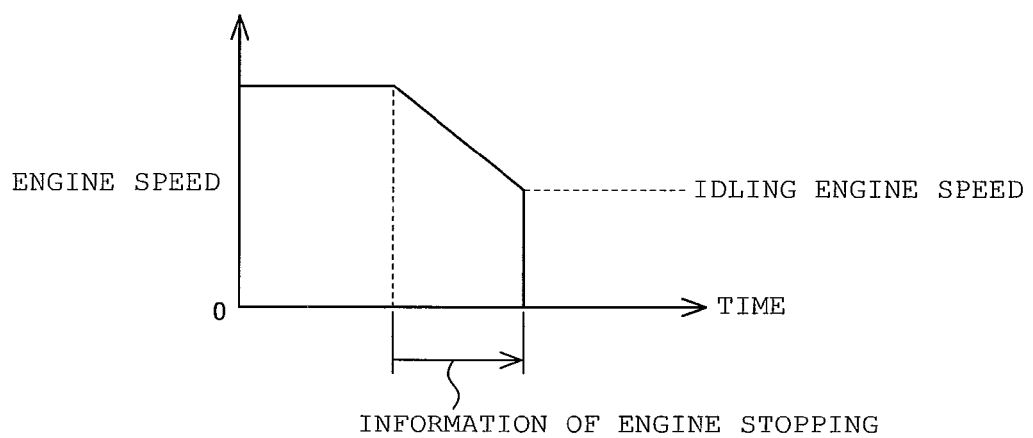
FIG. 19 is an explanation view explaining decreasing of engine speed in an eighth embodiment.

When the operator gets off under the state and the signal showing the getting-off state is inputted, the engine speed control means 32 judges whether or not the PM deposition amount is equal to or more than the third threshold value, and starts to gradually decrease the engine speed set by the acceleration lever as shown in FIG. 19 when the PM deposition amount is equal to or more than the third threshold value. The engine speed control means 32 gradually decrease the speed of the engine after starting the decreasing of the engine speed, and sets the engine speed to zero instantly at the timing when the engine speed becomes the idling engine speed.

On the other hand, after the PM deposition amount becomes equal to or more than the third threshold value and the decreasing of the engine speed is started, the information means 54 informs that the engine is stopped. Specifically, when the decreasing of the engine speed due to the engine speed control means 32 is started, the informing of the stopping of the engine due to the information means 54 is started, the information of the engine stop due to the information means 54 is terminated at the timing when the engine speed becomes the idling engine speed.

According to the eighth embodiment, for example, even under a state where the warm-up of the backhoe 1 is performed by setting the engine speed to the idling engine speed or more, the increasing of the PM deposition amount can be suppressed by decreasing the engine speed to zero. The operator can know due to the information means 54 that the engine speed is gradually decreased, and thus know that the PM deposition amount is equal to or more than the third threshold value. For this reason, the operator can increase the engine speed to a target value or more by operating the acceleration lever after boarding the backhoe 1, and thereby suppressing the increasing of the PM deposition amount.

Meanwhile, in the above mentioned eighth embodiment, since the idling engine speed is the value set by the acceleration lever even under the getting-off state, in a case where a set value of the acceleration lever is set to be extraordinary higher than the idling engine speed and thus the engine speed is high, the PM deposition amount sometimes is not increased.

As a modified example of the eighth embodiment, it is preferred that the main ECU 33 is provided with a preferential control means 456 that does not decrease the engine speed due to the engine speed control means 32 in a region where the engine speed is high and the exhaust temperature is increased even when the PM deposition amount exceeds the third threshold value. The preferential control means 456 is configured by a computer program and the like stored in the main ECU 33.

Specifically, when the engine speed is equal to or more than a target value (for example, 1800 rpm or more) of the engine speed to be displayed on the information screen of the guidance means 451, the preferential control means 456 does not perform the control to decrease the engine speed due to the engine speed control means 32 even when the PM deposition amount is equal to or more than the third threshold value.

Figure 20:
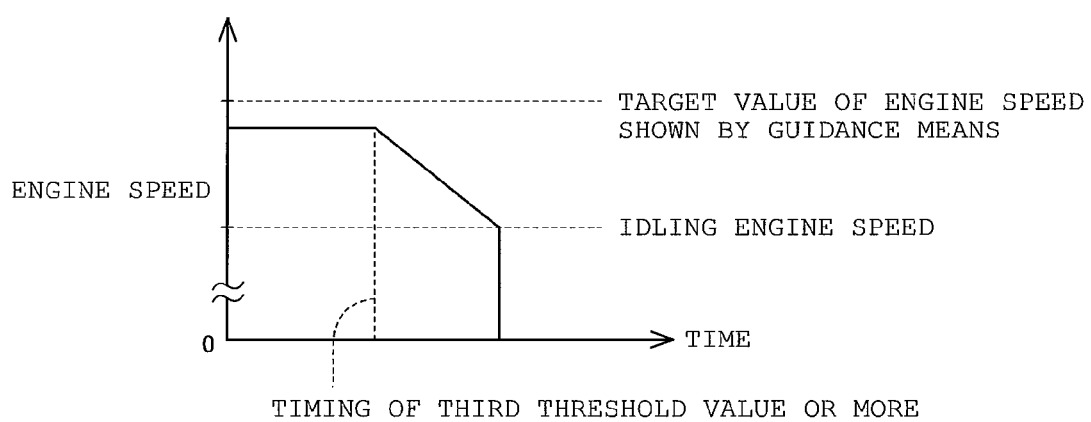
FIG. 20 is an explanation view explaining decreasing of engine speed in an eighth embodiment.
Figure 21:
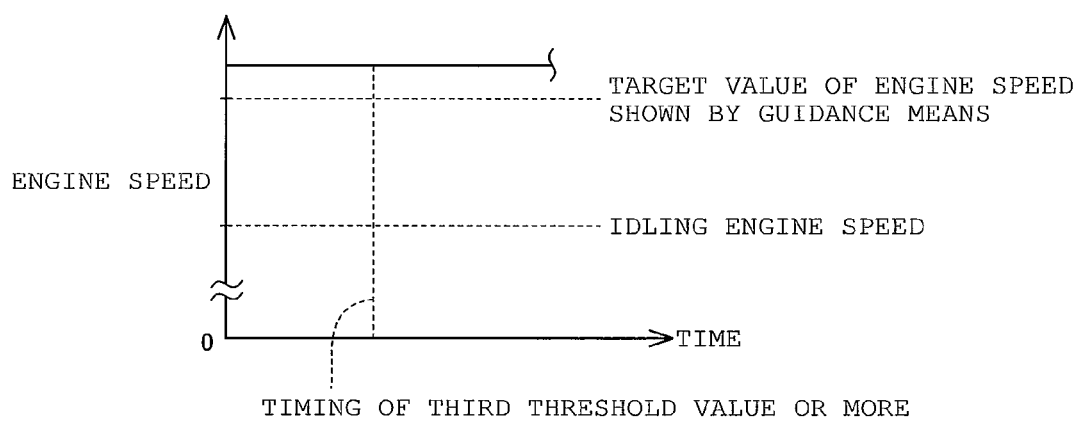
FIG. 21 is an explanation view explaining decreasing of engine speed in an eighth embodiment.

In the case where the preferential control means 456 is provided, as show in FIG. 20, when the engine speed is equal to or more than the idling engine speed and is less than the target value of the engine speed shown by the guidance means 451 under the getting-off state, the decreasing of the engine speed is performed by the engine speed control means 32, and as shown in FIG. 21, when the engine speed is equal to or more than the target value of the engine speed shown by the guidance means 451, the control to decrease the engine speed is stopped by the preferential control means 456.

Since a high engine speed is retained by the preferential control means 456, the exhaust temperature is increased, and the regeneration of DPF due to the automatic regeneration mode can be maintained. That is, in the eighth embodiment, in the configuration able to suppress the PM deposition amount in the warm-up operation (the engine speed is decreased to zero when the PM deposition amount is equal to or more than the threshold value under the getting-off state), the exhaust temperature is increased by maintaining the engine speed in a case where the engine speed due to the acceleration lever is high, and the regeneration of the DPF can be preferentially performed.

Figure 22:
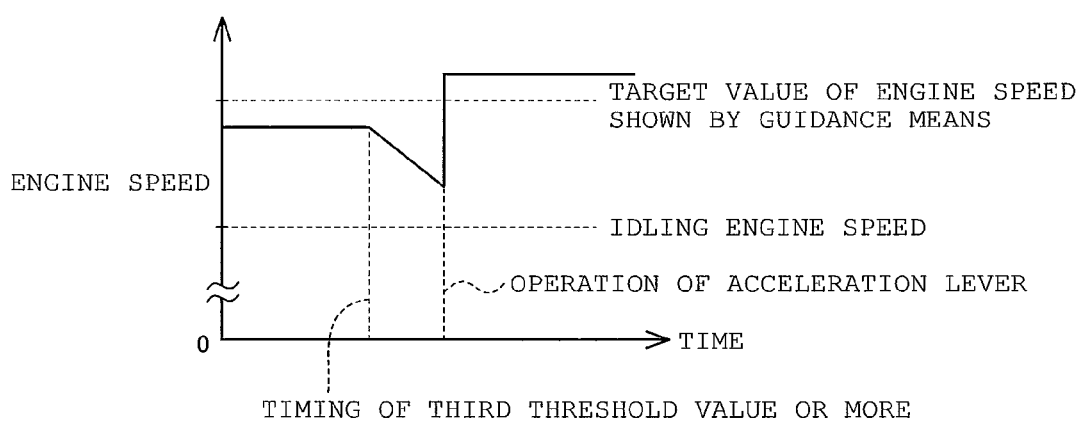
FIG. 22 is an explanation view explaining decreasing of engine speed in an eighth embodiment.

Meanwhile, as shown in FIG. 22, when the operator boards to operate the acceleration lever to set the engine speed to the target value or more of the engine speed shown by the guidance means 451 under the state where the engine speed is automatically decreased by the engine speed control means 32, it is preferred that the engine speed control means 32 clears the control to automatically decrease the speed of engine to set the engine speed to a value based on the operation amount of the acceleration lever. In this case, in the configuration able to suppress the PM deposition amount in the warm-up operation, the engine speed can be instantly returned to be high by operating the acceleration lever, thereby promoting the regeneration of the DPF.

It should be considered that all points disclosed in the embodiments are examples and do not limit the present invention. A scope of the present invention is shown not by the above-described explanation but by the claims, and it is intended to include all modifications within the meaning and scope equivalent to the claims.

In the automatic regeneration performed, the performing of "closing of the intake throttle" and the performing of "post injection" may be arbitrarily determined, and are not limited to the above description. For example, firstly the closing of the intake throttle may be performed, and then, the post injection may be performed, or only the post injection may be performed.

In the above-mentioned embodiment, the boarding confirmation means 453 is configured by the lever provided around the operator's seat 10, and confirms the boarding state and the getting-off state of the operator due to the lever; however, a lever used in a lever lock structure shown below may be commonly used as the above-mentioned boarding confirmation means 453.

In the case of the working machine such as the backhoe 1, if the operation lever 47 is moved, an actuator is unexpectedly operated, and accordingly in order to prevent this, the lever lock structure is provided. In the lever lock structure, a lever for lever lock to confirm the boarding by being swung in the same manner as that of the above-mentioned lever is provided; in the boarding state where the lever for lever lock is laid down, supply of the operating oil to the actuator is permitted, and in the getting-off state where the lever for lever lock is raised, the supply of the operating oil to the actuator is permitted. The lever for lever lock used for the lever lock mechanism may be used as the above-mentioned boarding confirmation means 453.

In addition, by providing a pressure sensor to a seat portion and a back portion of the operator's seat, the pressure sensor may be employed as the boarding confirmation means 453. In this case, during the pressure sensor is operated to detect a pressure, the boarding state is confirmed, and during the pressure sensor does not detect the pressure, the getting-off state is confirmed. Additionally, the boarding confirmation means 453 may confirm the boarding with use of a camera other than the lever and the sensor.

The control programs for configuring the filter regeneration means 450, the guidance means 451, the output limitation means 452, the preferential control means 456, and the like may be stored in the engine ECU 32 and also may be stored in the main ECU 33, or may be stored in electric appliances mounted on the working machine (the backhoe 1). In addition, the engine ECU 32 (the engine speed control means) and the main ECU 33 may be integrated.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The texts of Japanese application Nos. 2011-201777 and 2011-201778 filed on Sep. 27, 2011, and 2011-263474 and 2011-263475 filed on Dec. 1, 2011 are hereby incorporated by reference.

REFERENCE SIGNS LIST

1 Backhoe
2 Traveling device
3 Turning body
4 Traveling body
5 Dozer
6 Turning bearing
7 Turning pedestal
8 Working device
9 Diesel engine
10 Operator's seat
11 Display device
12 Cabin
13 Support bracket
14 Swing bracket 15 Boom
16 Arm
17 Bucket
18 Boom cylinder
19 Arm cylinder
20 Bucket cylinder
30 Exhaust manifold
31 Exhaust gas cleaning device
32 Engine ECU
33 Main ECU
34 Cylinder
35 Intake port
36 Exhaust port
37 Intake valve
38 Exhaust valve
39 Intake manifold
40 Silencer
41 DPF
42 Inlet side pressure sensor
43 Outlet side pressure sensor
44 Differential pressure sensor
45 Exhaust temperature sensor
46 Control part
47 Operation lever
147 Filter regeneration means
150 Deposition amount obtaining means
160 Filter regeneration control means
A, B Icon
247 Filter regeneration means
250 Deposition amount obtaining means
251 First regeneration control mode
252 Second regeneration control mode
253 Third regeneration control mode
254 Timekeeping part
260 Filter regeneration control means
A, B Icon
350 Filter regeneration means
351 Regeneration permission means
352 Boarding confirmation means
354 Deposition suppression means
355 Regeneration switch
450 Filter regeneration means
451 Guidance means
452 Output limitation means
453 Boarding confirmation means
454 Information means
455 Lever
456 Preferential control means

The invention claimed is:

1. A working machine comprising:
a diesel engine configured to increase a speed by an accelerating operation;
an exhaust gas cleaning device having a filter for catching a particulate matter included in an exhaust gas exhausted from the diesel engine;
a display device configured to display information related to the working machine; and
a control unit configured to:
control operation of the diesel engine to combust and remove the particulate matter deposited in the filter of the exhaust gas cleaning device and configured to obtain a deposition amount of the particulate matter deposited in the filter of the exhaust gas cleaning device,
perform an automatic regeneration for automatically increasing a temperature of the exhaust gas when the deposition amount obtained by the control unit is equal to or more than a second deposition amount preliminarily determined, thereby automatically combusting and removing the particulate matter deposited in the filter; and
make the display device display a warning when the deposition amount obtained by the control unit is equal to or more than a first deposition amount during the automatic regeneration, the first deposition amount being preliminarily determined and larger than the second deposition amount, the warning requesting the accelerating operation for increasing the speed of the diesel engine.

2. The working machine according to claim 1, wherein the control unit makes the display device display the warning requesting the accelerating operation for increasing the speed of the diesel engine when a temperature related to the diesel engine is equal to or smaller than a first temperature under a state where the automatic regeneration is performed.

3. The working machine according to claim 2, wherein the control unit makes the display device stop displaying the warning when the temperature related to the diesel engine is equal to or more than a second temperature for a predetermined time or more under a state where the displaying is made, the second temperature being higher than the first temperature.

4. The working machine according to claim 1, wherein the control unit makes the display device stop displaying the warning when the deposition amount of the particulate matter becomes equal to or smaller than the second deposition amount under a state where the displaying is made.

5. The working machine according to claim 2, wherein the temperature related to the diesel engine is at least one of an intake temperature, exhaust temperature, and coolant temperature of the diesel engine.

6. The working machine according to claim 3, wherein the temperature related to the diesel engine is at least one of an intake temperature, exhaust temperature, and coolant temperature of the diesel engine.

7. A working machine comprising:
a diesel engine configured to increase a speed by an accelerating operation;
an exhaust gas cleaning device having a filter for catching a particulate matter included in an exhaust gas exhausted from the diesel engine;
a display device configured to display information related to the working machine; and
a control unit configured to control operation of the diesel engine to combust and remove the particulate matter deposited in the filter of the exhaust gas cleaning device and configured to obtain a deposition amount of the particulate matter deposited in the filter of the exhaust gas cleaning device, the control unit including:
a first regeneration control mode for performing an automatic regeneration for automatically increasing a temperature of the exhaust gas when the deposition amount obtained by the control unit of the particulate matter deposited in the filter is equal to or more than a first threshold, thereby automatically combusting and removing the particulate matter deposited in the filter; and
a second regeneration control mode for making the display device display a warning when the deposition amount obtained by the control unit is equal to or more than a second threshold during the automatic regeneration, the second threshold being preliminarily determined and higher than the first threshold, the warning requesting the accelerating operation for increasing the speed of the diesel engine.

8. The working machine according to claim 7, wherein the second regeneration control mode makes the display device display the waring requesting the accelerating operation for increasing the speed of the diesel engine to a predetermined speed or more when the deposition amount of the particulate matter does not become smaller than a warning clearing threshold within a predetermined time from the starting of the automatic regeneration due to the first regeneration control mode, the warning clearing threshold being lower than the first threshold.

9. The working machine according to claim 7, wherein the second regeneration control mode makes the display device display the warning request the accelerating operation for increasing the speed of the diesel engine to a predetermined speed or more when the deposition amount of the particulate matter becomes equal to or more than a second threshold, the second threshold being higher than the first threshold.

10. The working machine according to claim 8, wherein the control unit further includes:
a third regeneration control mode for ordering the diesel engine to output a power limited within a predetermined range when the deposition amount of the particulate matter becomes equal to or more than a third deposition amount threshold under a state where the displaying is made, the third deposition amount threshold being higher than the second deposition amount threshold.

11. The working machine according to claim 9, wherein the control unit further includes:
a third regeneration control mode for ordering the diesel engine to output a power limited within a predetermined range when the deposition amount of the particulate matter becomes equal to or more than a third deposition amount threshold under a state where the displaying is made, the third deposition amount threshold being higher than the second deposition amount threshold.

12. A working machine comprising:
an operator seat;
an exhaust gas cleaning device having a filter for catching a particulate matter included in an exhaust gas exhausted from a diesel engine; and
a control unit configured to:
control the operation of the diesel engine to combust and remove the particulate matter deposited in the filter of the exhaust gas cleaning device, and
confirm boarding to the operator seat,
permit a regenerating operation when confirming the boarding to the operator seat while the diesel engine is in operation, the regenerating operation combusting and removing the particulate matter, and
output a control signal to stop the diesel engine to an engine control unit when failing to confirm the boarding to the operator seat while the diesel engine is in operation, thereby stopping generation of the particulate matter.

13. The working machine according to claim 12, wherein the control unit outputs the control signal to stop the diesel engine when a state continues for a predetermined time, the state being that where the boarding to the operator seat is not confirmed while the diesel engine is in operation.

14. The working machine according to claim 12, wherein the control unit outputs the control signal to stop the diesel engine when a deposition amount of the particulate matter deposited in the filter is in an increasing tendency under a state where the boarding to the operator seat is not confirmed while the diesel engine is in operation.

15. The working machine according to claim 12, wherein the control unit includes an automatic regeneration mode for automatically performing the regenerating operation when the deposition amount of the particulate matter deposited in the filter is equal to or more than a predetermined value.

16. The working machine according to claim 15, wherein the control unit includes an output limitation mode for limiting an output of the diesel engine when the deposition amount is in the increasing tendency, compared to the deposition amount obtained before the automatic regeneration mode, under a state where the automatic regeneration mode is performed.

17. The working machine according to claim 12, wherein the control unit includes a regenerating operation help mode for informing that the speed of the diesel engine is increased as help for the regenerating operation.

18. The working machine according to claim 12, configured to be capable of restarting the diesel engine after the diesel engine is stopped by the control unit.

19. A working machine comprising:
an operator seat;
an exhaust gas cleaning device having a filter for catching a particulate matter included in an exhaust gas exhausted from a diesel engine; and
a control unit configured to:
control the operation of the diesel engine to combust and remove the particulate matter deposited in the filter of the exhaust gas cleaning device,
confirm boarding to the operator seat, and
automatically decrease the speed of the diesel engine when the boarding to the operator seat is not confirmed by the control unit while the diesel engine is in operation and additionally when the deposition amount of the particulate matter deposited in the filter is equal to or more than a predetermined value.

20. The working machine according to claim 19, wherein the control unit decreases the engine speed to zero when the deposition amount is equal to or more than a predetermined value under a state where the engine speed is an idling engine speed while the boarding to the operator seat cannot be confirmed.

21. The working machine according to claim 19, wherein the control unit gradually decreases the engine speed to an idling engine speed and stops the diesel engine to drop the engine speed to zero when the deposition amount is equal to or more than a predetermined value under a state where the engine speed is equal to or more than an idling engine speed while the boarding to the operator seat cannot be confirmed.

22. The working machine according to claim 19, wherein the control unit limits an output of the diesel engine, allowing the increasing and decreasing of the speed of the diesel engine, when the deposition amount of the particulate matter deposited in the filter is equal to or more than a predetermined value under a condition that the boarding to the operator seat is confirmed by control unit while the diesel engine is in operation.

23. The working machine according to claim 19, wherein the control unit informs, in the automatically-decreasing of the speed of the diesel engine, that the speed of the diesel engine is decreased.

* * * * *